United States Patent [19]
Mantani

[11] Patent Number: 5,808,591
[45] Date of Patent: Sep. 15, 1998

[54] IMAGE DISPLAY DEVICE, IMAGE DISPLAY SYSTEM AND PROGRAM CARTRIDGE USED THEREWITH

[75] Inventor: Yoshinobu Mantani, Kyoto, Japan

[73] Assignee: Nintendo Co., Ltd., Kyoto, Japan

[21] Appl. No.: 554,888

[22] Filed: Nov. 9, 1995

[30] Foreign Application Priority Data

Nov. 11, 1994 [JP] Japan .................................... 6-278010

[51] Int. Cl.[6] .............................. G06F 15/00; A63F 9/24
[52] U.S. Cl. .................................... 345/82; 345/7; 345/8; 463/43; 463/44; 359/212; 359/214; 359/630
[58] Field of Search ............................ 345/7, 8, 82, 169; 359/212, 214, 220, 223, 630; 463/30, 31, 34, 43, 44

[56] References Cited

U.S. PATENT DOCUMENTS

| | | | |
|---|---|---|---|
| Re. 34,161 | 1/1993 | Nakagawa et al. .................... | 463/44 X |
| 4,600,200 | 7/1986 | Oka et al. ................................ | 463/33 |
| 4,934,773 | 6/1990 | Becker ..................................... | 350/6.6 |
| 4,962,422 | 10/1990 | Ohtomo et al. . | |
| 5,003,300 | 3/1991 | Wells ....................................... | 340/705 |
| 5,184,830 | 2/1993 | Okada et al. .......................... | 463/44 X |
| 5,305,244 | 4/1994 | Newman et al. ..................... | 364/708.1 |
| 5,334,991 | 8/1994 | Wells et al. ............................ | 345/8 |
| 5,380,994 | 1/1995 | Ray ......................................... | 235/472 |
| 5,422,653 | 6/1995 | Maguire, Jr. . | |
| 5,476,010 | 12/1995 | Fleming et al. ......................... | 73/620 |
| 5,491,651 | 2/1996 | Janik ...................................... | 364/708.1 |
| 5,493,427 | 2/1996 | Nomura et al. . | |
| 5,523,886 | 6/1996 | Johnson-Williams et al. ......... | 359/464 |
| 5,599,232 | 2/1997 | Darling .................................... | 463/44 |

FOREIGN PATENT DOCUMENTS

| | | |
|---|---|---|
| A-0 301 801 | 2/1989 | European Pat. Off. . |
| 0 592 318 | 4/1994 | European Pat. Off. . |
| 0 595 705 | 5/1994 | European Pat. Off. . |
| 63-127777 | 5/1988 | Japan . |
| 63-314990 | 12/1988 | Japan . |
| A-63 306795 | 12/1988 | Japan . |
| 1-206798 | 8/1989 | Japan . |
| 2-42476 | 2/1990 | Japan . |
| 2-63379 | 3/1990 | Japan . |
| A 03 116093 | 5/1991 | Japan . |
| A-06038246 | 2/1994 | Japan . |
| A-06 238064 | 8/1994 | Japan . |

OTHER PUBLICATIONS

The Privite Eye, by Reflection Technology.

Primary Examiner—Raymond J. Bayerl
Assistant Examiner—Seth D. Vail
Attorney, Agent, or Firm—Nixon & Vanderhye P.C.

[57] ABSTRACT

A body device 2 is attachably/detachably equipped with a program cartridge. The program cartridge 4 stores a game program, image data and a column table. The body device 2 reads the game program from the game cartridge 4 and executes the game program, and reads and refers to the image data to display a stereoscopic image with parallax in left and right display systems. At this time, the body device 2 reads timing data from the column table in the program cartridge 4 to control light emitting intervals of each LED in the display units. Thus, the dot pitch of the image is corrected to appropriate widths.

16 Claims, 43 Drawing Sheets

PROGRAM MEMORY 41

| | |
|---|---|
| GAME PROGRAM | 411 |
| BG MAP | 412 |
| CHARACTER DATA | 413 |
| WORLD ATTRIBUTES | 414 |
| OBJ ATTRIBUTES | 415 |
| COLUMN TABLE | 416 |
| PARAMETERS | 417 |
| SHUT DOWN PROGRAM | 418 |
| OTHERS | 419 |

BACK-UP MEMORY 42

GAME DATA AT SAVE POINT
(VARIOUS VALUES INDICATING
STATE OF GAME)

WORK MEMORY 222

IMAGE WORK MEMORY 225

| 15 | 14 | 13 | 12 | 11 | 10 | 9 | 8 | 7 | 6 | 5 | 4 | 3 | 2 | 1 | 0 | |
|----|----|----|----|----|----|---|---|---|---|---|---|---|---|---|---|---|
| | | | | | | | JX(-7 << 383) | | | | | | | | | 1 |
| JLON | JRON | | | | | | JP(-256 << 255) | | | | | | | | | 2 |
| | | | | | | | JY(-7 << 223) | | | | | | | | | 3 |
| JPLTS | | JHFLP | JVFLP | | 0 | | JCA(11BITS = 2048) | | | | | | | | | 4 |

Fig. 17

| | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|
| 1 | LON | RON | BGM | SCX | | | SCY | | OVER | END | 0 | 0 | | BGMAP BASE | | | |
| 2 | GX (0 << 383) | | | | | | | | | | | | | | | | |
| 3 | GP (-256 << 255) | | | | | | | | | | | | | | | | |
| 4 | GY (0 << 223) | | | | | | | | | | | | | | | | |
| 5 | MX (0 << 4095) | | | | | | | | | | | | | | | | |
| 6 | MP (-256 << 255) | | | | | | | | | | | | | | | | |
| 7 | MY (0 << 4095) | | | | | | | | | | | | | | | | |
| 8 | W | | | | | | | | | | | | | | | | |
| 9 | H | | | | | | | | | | | | | | | | |
| 10 | PARAM_BASE | | | | | | | | | | | 0 | 0 | 0 | 0 | 0 | |
| 11 | OVERPLANE_CHARACTER | | | | | | | | | | | | | | | | |
| 12 | WRITING FORBIDDEN | | | | | | | | | | | | | | | | |
| 13 | WRITING FORBIDDEN | | | | | | | | | | | | | | | | |
| 14 | WRITING FORBIDDEN | | | | | | | | | | | | | | | | |
| 15 | WRITING FORBIDDEN | | | | | | | | | | | | | | | | |
| 16 | WRITING FORBIDDEN | | | | | | | | | | | | | | | | |

Fig. 18
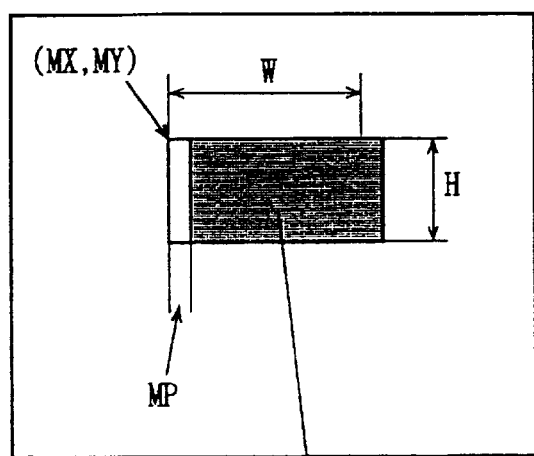
BG MAP
(MX,MY)
MP
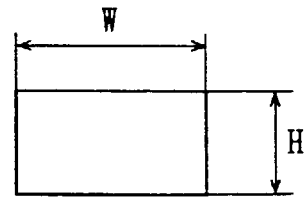
AREA TO BE DISPLAYED ON SCREEN
AREA ACTUALLY CUT OUT FROM BG MAP, SHIFTED BY PARALLAX AMOUNT MP
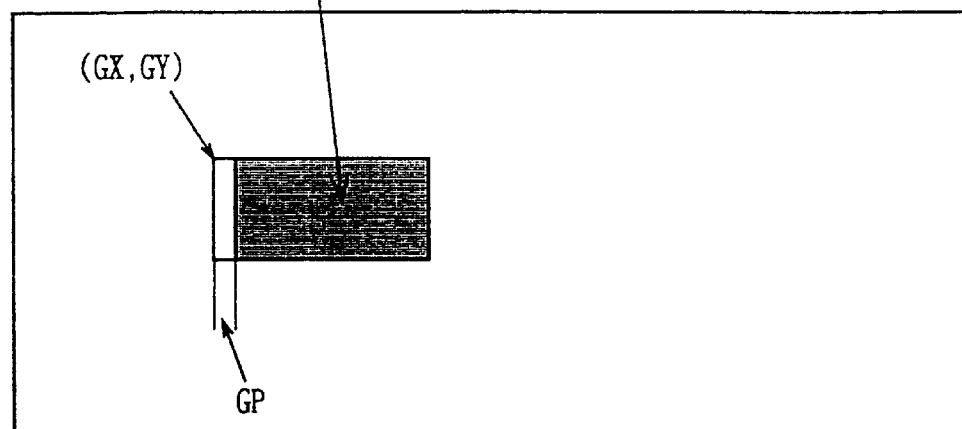
DISPLAYED IMAGE (LEFT OR RIGHT)
(GX,GY)
GP

DISPLAY PICTURE COORDINATES FOR LEFT EYE

DISPLAY PICTURE COORDINATES FOR RIGHT EYE

PICTURE DRAWING WORK OF NORMAL BG

PICTURE DRAWING WORK OF H-BIAS BG

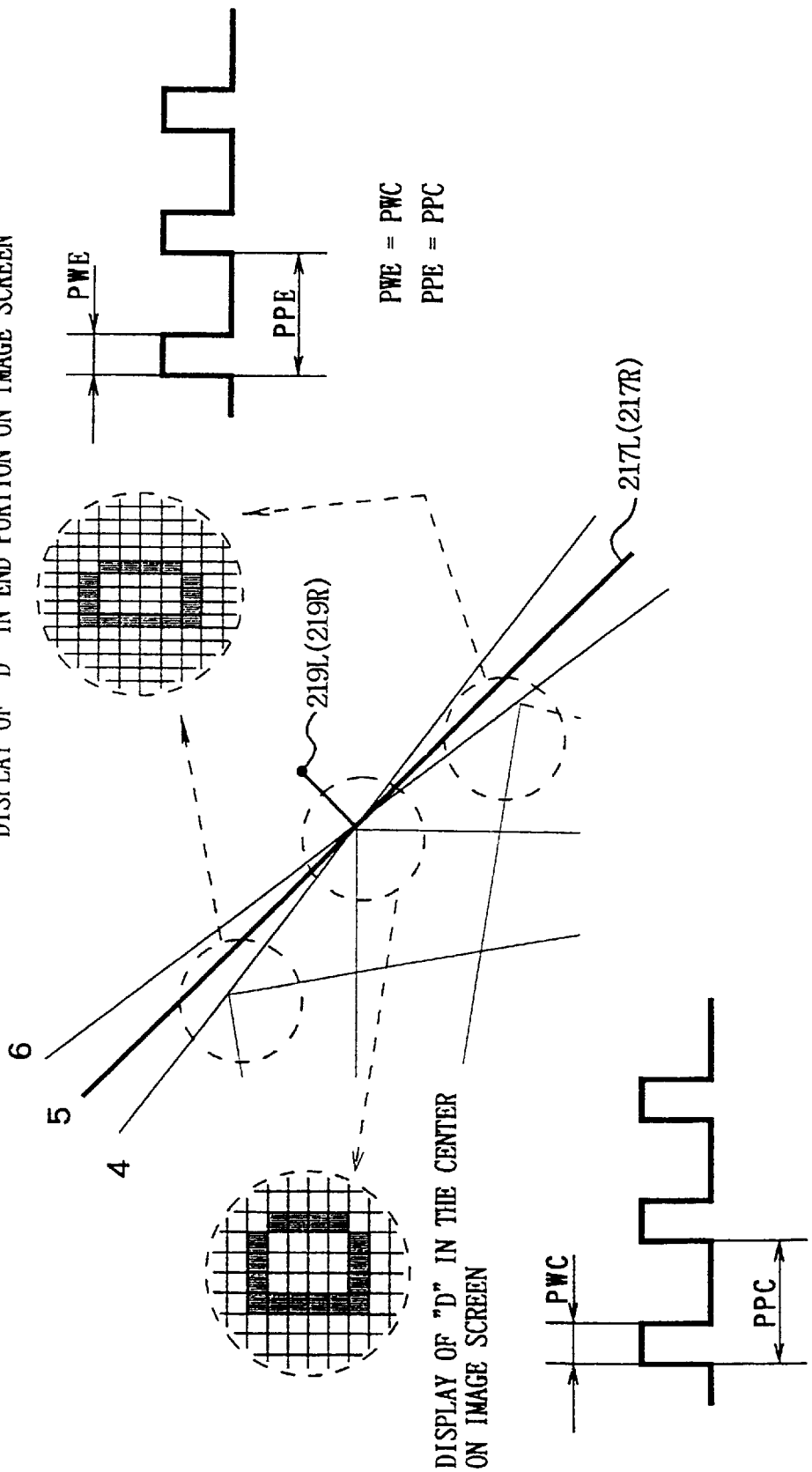

IMAGE DISPLAY DEVICE, IMAGE DISPLAY SYSTEM AND PROGRAM CARTRIDGE USED THEREWITH

BACKGROUND OF THE INVENTION

1. Field of the Invention

The present invention relates to image display devices, and more particularly to an image display device which is used in various electronic equipment with display units, such as electronic game devices, training devices, educational equipment, guiding devices, etc.

2. Description of the Background Art

Conventional devices for displaying images at a distance adjacent to the eyes of a user include the display system suggested by Reflection Technology in the United States, for example. (Refer to Japanese Patent Laying-Open No.2-42476, Japanese Patent Laying-Open No.2-63379) This display system is sold under the commercial name of "The Private Eye". This conventional display system includes an LED array with a plurality of LED (Light Emitting Diode) elements arranged in a vertical column, and display data is provided to this LED array sequentially for each column. The light in columns emitted from the LED array is reflected by a mirror reciprocatively moving at high speed and scanned to display a two-dimensional image.

However, the conventional display system operates such that each dot width of displayed images is always constant. Accordingly, the dot width could not be changed depending on displayed images. This is a serious problem especially when it is applied to a device used with plural kinds of program cartridges exchanged. For example, in the case of an electronic game device, it may be required to change the screen size among games for the stage effect, the dot widths must then be adjusted to appropriate values for each kind of game executed. Further, it is sometimes required to display special images by forcing uneven dot widths.

SUMMARY OF THE INVENTION

Accordingly, it is an object of the present invention to provide an image display device and an image display system with wide variety of image representation which is capable of freely changing the dot width according to displayed images.

It is another object of the present invention to provide a portable program cartridge connected to the image display device of the present invention to be used.

A first aspect of the present invention is directed to an image display device for displaying an image on the basis of given program data and image data, which includes:

an image display unit including a light emitting element array in which a plurality of light emitting elements are regularly arranged along a first direction, a mirror for reflecting light emitted from the light emitting element array so that it can be visually recognized by an eye of a user and reciprocatively moving at high speed in a certain range to project a planar image in a second direction almost perpendicular to the first direction, and a mirror driving circuit for causing the mirror to reciprocatively move;

a program data storing portion for storing the program data in a non-volatile manner; an image data storing portion for storing the image data in a non-volatile manner;

an image processing portion for producing display data corresponding to an image to be displayed by the image display unit on the basis of the program data stored in the program data storing portion and the image data stored in the image data storing portion;

a display data storing portion for temporarily storing the display data provided from the image processing portion;

a timing data storing portion for writably/readably storing timing data related to intervals of light emission of the light emitting element array;

an information processing portion which operates on the basis of the program data stored in the program data storing portion to cause the timing data storing portion to store arbitrary timing data prior to displaying an image; and a light emission driving portion for causing the light emitting element array to emit light on the basis of the timing data stored in the timing data storing portion and the display data stored in the display data storing portion.

According to the first aspect of the present invention, light emitted from the light emitting element array with a plurality of light emitting elements arranged along a first direction is reflected by a mirror which reciprocatively moves at high speed to scan it in a second direction almost perpendicular to the first direction, thereby to project a planar image in the field of view of a user. The timing data storing portion writably and readably stores timing data related to intervals for causing the light emitting element array to emit light. The timing data corresponds to the pitch among dots in the displayed picture. The information processing portion operates on the basis of the program data stored in the program data storing portion to have the timing data storing portion store arbitrary timing data prior to displaying an image. The light emitting element array is driven to emit light on the basis of the timing data stored in the timing data storing portion and the display data stored in the display data storing portion. Accordingly, before displaying an image, the timing data, i.e., the pitches among dots are set to arbitrary values. That is to say, according to the first aspect of the present invention, timing data defining the dot pitch can be set freely before displaying an image. As a result, the dot pitch can be changed in accordance with an displayed image.

A second aspect of the present invention is directed to an image display system including an image display device body for displaying an image on the basis of given program data and image data and a program cartridge attachably/detachably connected to the image display device body, wherein the image display device body includes;
an image display unit including a light emitting element array in which a plurality of light emitting elements are regularly arranged along a first direction, a mirror for reflecting light emitted from the light emitting element array so that it can be visually recognized by an eye of a user and reciprocatively moving at high speed in a certain range to project a planar image in a second direction almost perpendicular to the first direction, and a mirror driving circuit for causing the mirror to reciprocatively move, the program cartridge includes;
a program data storing portion for storing the program data in a non-volatile manner;
an image data storing portion for storing the image data in a non-volatile manner, and
a first timing data storing portion for storing in a non volatile manner timing data related to intervals of light emission of the light emitting element array, and the image display device body further includes;

an image processing portion for producing display data corresponding to an image to be displayed by the image display unit on the basis of the program data stored in the program data storing portion and the image data stored in the image data storing portion;

a display data storing portion for temporarily storing the display data provided from the image processing portion;

a second timing data storing portion for writably/readably storing timing data related to intervals of light emission of the light emitting element array;

an information processing portion which operates on the basis of the program data stored in the program data storing portion to read the timing data from the first timing data storing portion and cause the data to be stored into the second timing data storing portion prior to displaying an image; and a light emission driving portion for causing the light emitting element array to emit light on the basis of the timing data stored in the second timing data storing portion and the display data stored in the display data storing portion.

According to the above-described second aspect, the timing data is stored in a non-volatile manner in the first timing data storing portion in the program cartridge. The timing data stored in the first timing data storing portion is read prior to displaying an image and stored in the second timing data storing portion in the image display device body. As the program cartridge is detachably attached to the image processing device body, the timing data defining the dot pitch can be changed every time the program cartridge is exchanged, that is, every time the program data is changed.

According to the second aspect, in a preferred embodiment, two image display units are provided for the left eye and the right eye. Images with parallax are displayed in the left eye image display unit and the right eye image display unit. This enables display of a stereoscopic image. Furthermore, the light emission driving times of light emitting element arrays of the left eye and right eye image display units are shifted. This shifts image display timing in time in the left and right display units. As a result, the peak power consumption is distributed to be reduced and the maximum power consumption is reduced. Furthermore, as it is not necessary to transfer image data simultaneously to the left and right display units, load on the image display processing is reduced.

According to the above-described second aspect, in another preferred embodiment, the timing data stored in the second timing data storing portion is rewritten according to instructions from the program data stored in the program data storing portion. This forces the pitch between dots to be uneven, to display special images as waving, for example. The rewriting of the timing data is achieved by operating the timing data stored in the second timing data storing portion according to conversion expressions described on the program data to obtain new timing data and writing the operated new timing data into the second timing data storing portion, for example. Or, a third timing data storing portion may be provided in the program cartridge, and then timing data stored in the third timing data storing portion will be read out and written into the second timing data storing portion.

According to the above-described second aspect, in another preferred embodiment, the mirror is reciprocatively moved in a certain angle range and part of the certain angle range in which the angular velocity of the mirror is stable is used for image scanning. This reduces distortion in an image. Considering that the mirror may be shifted from an ideal pivot position, the first timing data storing portion in the program cartridge preferably stores timing data which can cover an angle range larger than the angle range used to scan the image, and the information processing portion reads all the timing data from the first timing data storing portion and causes it to be stored in the second timing data storing portion. More preferably, the image display device body further includes an offset amount detecting portion for detecting the a mount of offset with respect to an ideal reciprocative movement range of the mirror, and the light emission driving portion changes the range of the timing data referred to from the second timing data storing portion according to the amount of offset of the mirror detected by the offset amount detecting portion. Thus, the most suitable timing data can be used even if the mirror is shifted.

A third aspect of the present invention is directed to a program cartridge attachably/detachably connected to an image display device including an image display unit including a light emitting element array in which a plurality of light emitting elements are regularly arranged along a first direction, a mirror for reflecting light emitted from the light emitting element array so that it can be visually recognized by an eye of a user and reciprocatively moving at high speed in a certain range to project a planar image in a second direction almost perpendicular to the first direction, and a mirror driving circuit for causing the mirror to reciprocatively move, for displaying a certain image in the image display unit on the basis of given program data and image data, which includes:

a program data storing portion for storing the program data in a non-volatile manner;

an image data storing portion for storing the image data in a non-volatile manner; and a first timing data storing portion storing in a non-volatile manner timing data related to intervals of light emission of the light emitting element array; and the image display device further including a display data storing portion and a writable/readable second timing data storing portion, and by executing the program data stored in the program data storing portion and referring to the image data stored in the image data storing portion, generating display data corresponding to an image to be displayed by the image display unit, temporarily storing the generated display data in the display data storing portion, reading the timing data from the first timing data storing portion prior to displaying the image and storing the data into the second timing data storing portion, and causing the light emitting element array to emit light on the basis of the timing data stored in the second timing data storing portion and the display data stored in the display data storing portion.

As has been described above, the program cartridge according to the third aspect of the present invention stores the program data, the image data and the timing data in a non-volatile manner, and is attachably/detachably connected to the image display device. The image display device executes the program data stored in the program cartridge and refers to the image data to execute predetermined operations. That is to say, the image processing device generates display data corresponding to an image to be displayed by the image display unit, temporality stores the generated display data in the display data storing portion, reads the timing data from the program cartridge prior to displaying the image and stores the data in the second timing data storing portion, and causes the light emitting element array to emit light on the basis of the timing data stored in the second timing data storing portion and the display data stored in the display data storing portion.

These and other objects, features, aspects and advantages of the present invention will become more apparent from the following detailed description of the present invention when taken in conjunction of the accompanying drawings.

BRIEF DESCRIPTION OF THE DRAWINGS

FIG. 17 is a diagram showing an example of data format of world attributes.

FIG. 18 is a diagram showing the relation between a position at which a BG is cut out developed on the BG map and a position at which the BG is displayed developed on the display screen.

FIG. 40 is a diagram showing a letter "D" displayed in the center and in the end part on the image screen before correction.

DESCRIPTION OF THE PREFERRED EMBODIMENT

Human beings can see two pictures with parallax separately with left and right eyes and fuse the two pictures in the brain to sense the depth. An electronic game device of an embodiment described hereinafter is configured to display stereoscopic images to an observer by utilizing the image fusion action.

Generally speaking, a display screen for the game includes two general kinds of components. The first components include displayed objects having relatively large display areas and which do not move finely on the screen, such as mountains, rivers, forests, sky, buildings, etc. The second components include displayed objects having relatively small display areas and which move finely and rapidly on the screen, such as a hero, enemies, bullets, missiles, etc. In the electronic game device of the embodiment described hereinafter, displayed objects which belong to the first components are called backgrounds (referred to as BG, hereinafter) and displayed objects which belong to the second components are called objects (referred to as OBJ, hereinafter).

Figure 1:
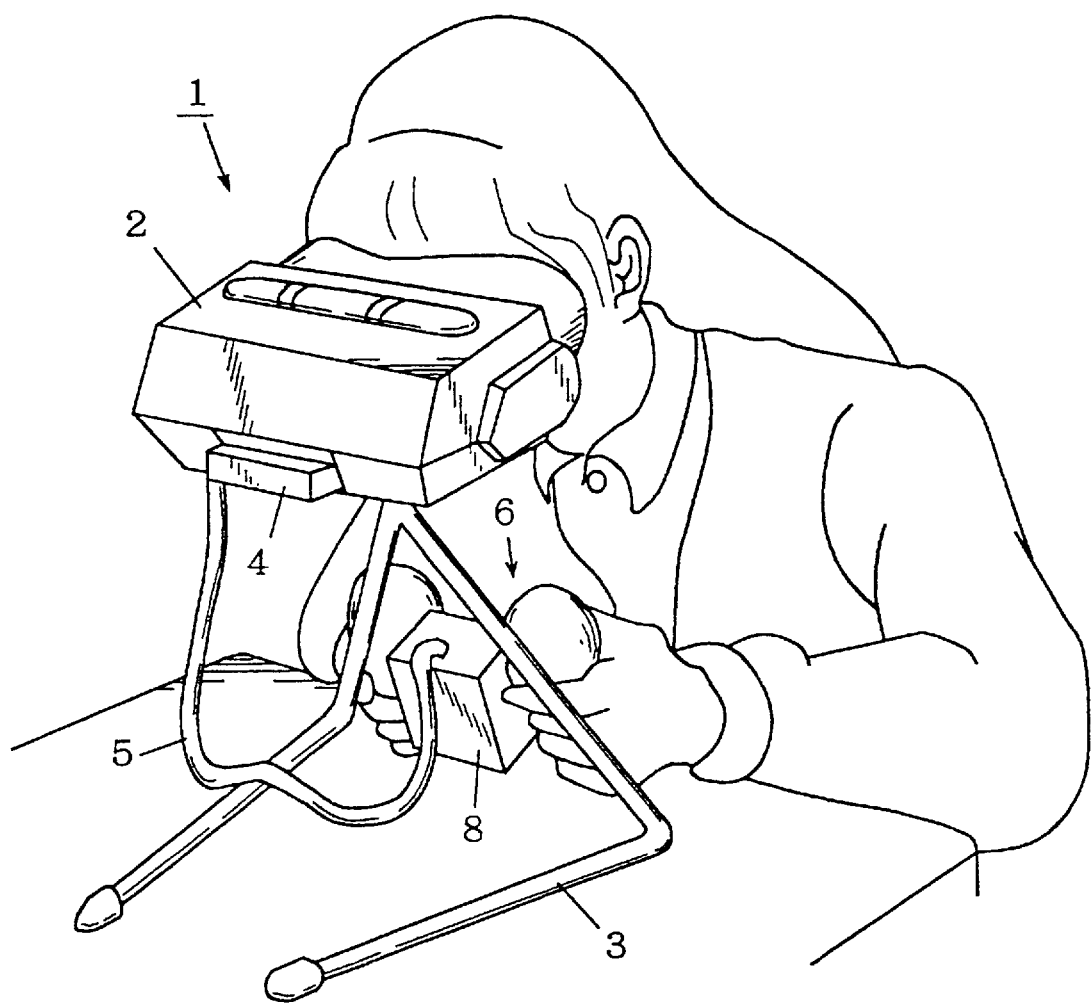
FIG. 1 is a perspective view showing an electronic game device in use according to an embodiment of the present invention.
Figure 2:
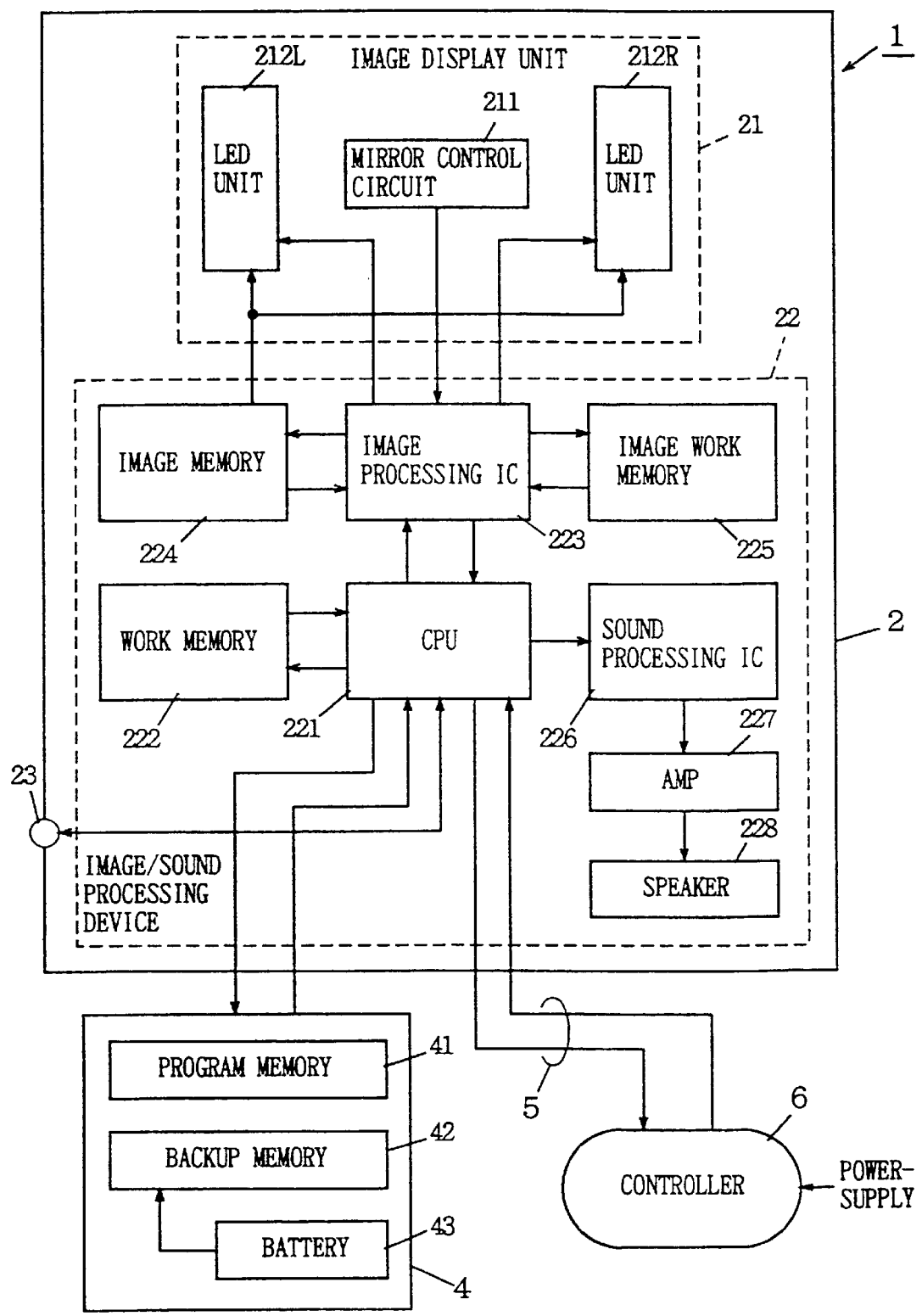
FIG. 2 is a block diagram showing the electric structure of the electronic game device according to the embodiment of the present invention.

FIG. 1 is a perspective view showing an electronic game device in use according to one embodiment of the present invention. FIG. 2 is a block diagram showing the electric structure of the electronic game device shown in FIG. 1. Referring to FIG. 1 and FIG. 2, the structure of this embodiment will be described below.

An electronic game device 1 includes a body device 2, a support stand 3 coupled to the bottom of the body device 2, a program cartridge 4 attached to the body device 2 in an attachable/detachable manner, and a controller 6 connected to the body device 2 through a cord 5. The body device 2 is supported on a desk or the like by the support stand 3. A player looks into the supported body device 2 to see a game display.

Figure 3:
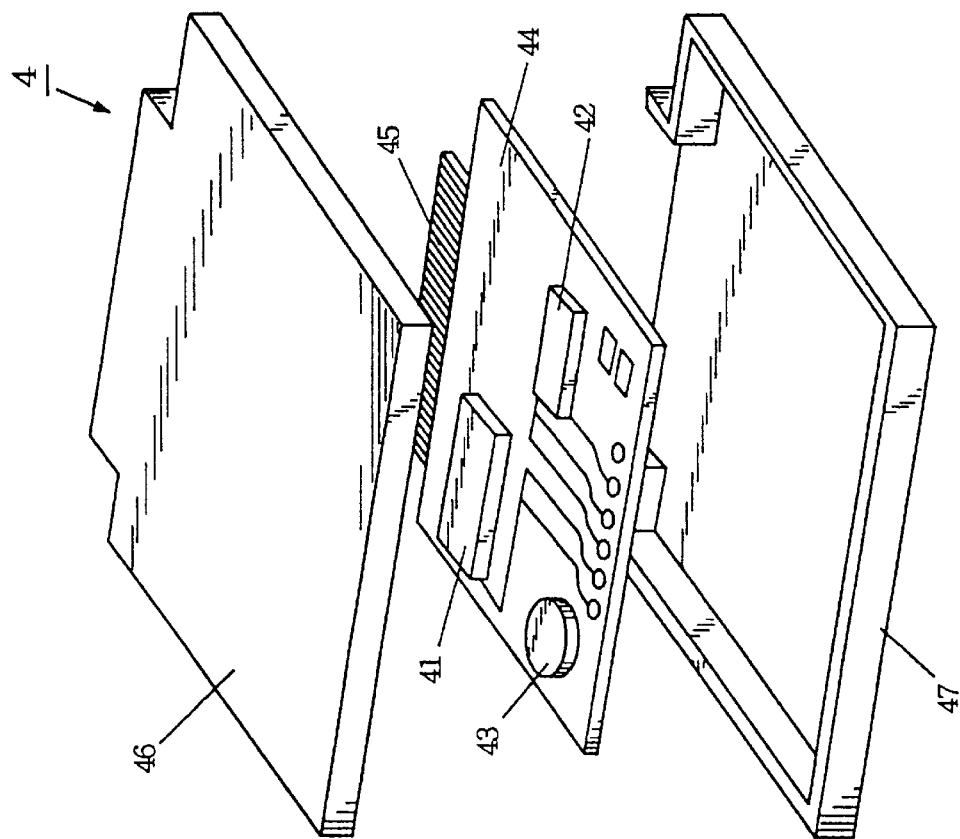
FIG. 3 is an exploded perspective view showing an example of the structure of the program cartridge 4 in FIG. 1.

The program cartridge 4 includes a program memory 41 formed of a nonvolatile storage medium, such as ROM and CD-ROM, a backup memory 42 formed of a rewritable storage element, such as RAM, and a battery 43 formed of a lithium battery or the like. As shown in FIG. 3, the program memory 41, the back-up memory 42 and the battery 43 are packaged on a substrate 44 having a terminal 45, for example. The substrate 44 is accommodated in a case formed of an upper housing 46 and a lower housing 47.

Preferably, the controller 6 is equipped with a battery box 8 which is attachable and detachable. This battery box 8 has a battery accommodated therein for supplying driving power to the body device 2. Accordingly, the electronic game device of this embodiment can be used in places where no commercial power is supplied (outdoors, on vehicles, etc.) When it is not driven with a battery, an AC adapter may be used to supply commercial power to the body device 2.

The body device 2 includes an image display unit 21, an image/sound processing device 22, and a transfer port 23. The image/sound processing device 22 includes a CPU 221, a work memory 222, an image processing IC 223, an image memory 224, an image work memory 225, a sound processing IC 226, an amp 227 and a speaker 228. The CPU 221 executes a game program stored in the program memory 41 of the program cartridge 4. The transfer port 23 is connected to the CPU 221.

Figure 4:
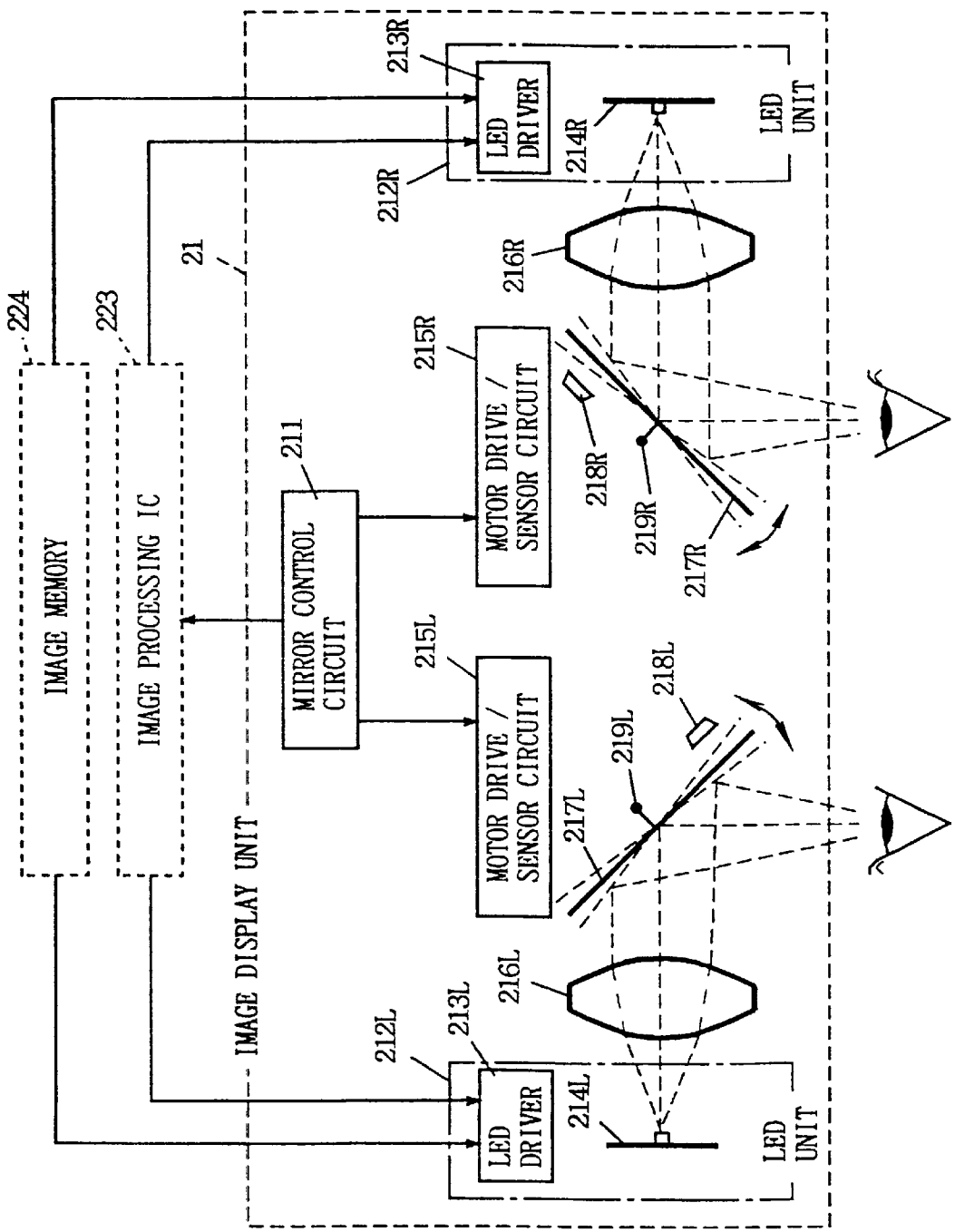
FIG. 4 is a diagram showing more detailed structure of the image display unit 21 in FIG. 2.

The image display unit 21 generally includes a mirror control circuit 211 and a pair of LED (light emitting diode) units 212L and 212R on the left and right. More detailed structure of the image display unit 21 is shown in FIG. 4. As shown in FIG. 4, the image display unit 21 further includes a pair of, left and right, motor drive/sensor circuits 215L and 215R, a pair of, left and right, lens systems 216L and 216R, a pair of, left and right, mirrors 217L and 217R and a pair of, left and right, voice coil motors 218L and 218R. The LED units 212L and 212R include LED drivers 213L and 213R and LED arrays 214L and 214R, respectively.

The image display unit 21 displays one picture with 384 dots in the X-axis direction (in the horizontal direction with respect to the visual field) and 224 dots in the Y-axis direction (in the vertical direction with respect to the visual field). Accordingly, the LED arrays 214L and 214R are formed of 224 LEDs placed in a row in the Y-axis direction, respectively. Light beams in columns emitted from the LED arrays 214L and 214R impinge upon the mirrors 217L and 217R through the lens systems 216L and 216R, respectively, and are reflected by the mirrors 217L and 217R, and then enter the left and right eyes of the player. The mirror control circuit 211 drives the voice coil motors 218L and 218R, using the motor d rive/sensor circuits 215L and 215R. Thus, the mirrors 217L and 217R reciprocatively pivot in a certain period about the supporting points 219L and 219R. As a result, the light beam in columns emitted from each LED array is scanned in the horizontal direction, respectively. The image processing IC 223 transfers image data for 384 columns from the image memory 224 to the LED driver 213L or 213R while the mirror 217L or 217R turns once. Accordingly, the player recognizes an image formed of 384 (transverse) ×224 (vertical) dots due to the after image phenomenon.

Figure 5:
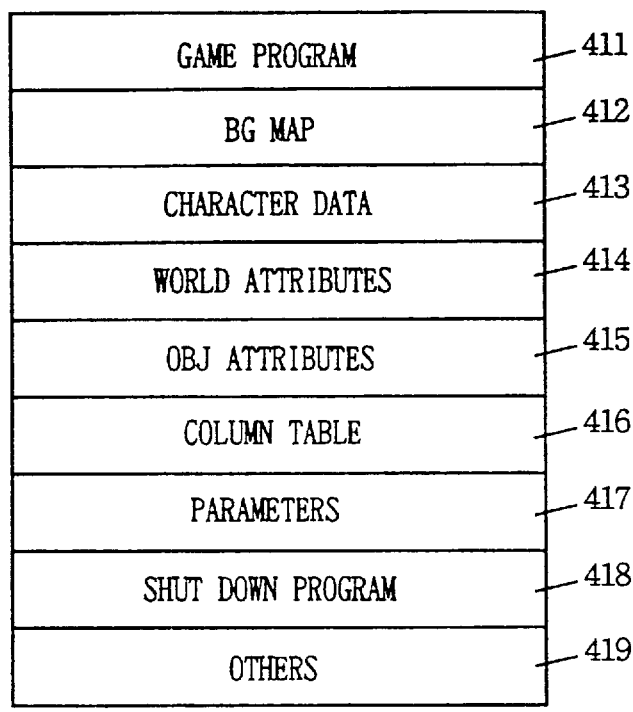
FIG. 5 is a diagram showing a memory map of the program memory 41 in FIG. 2.

FIG. 5 is a diagram schematically showing the structure of the program memory 41 in FIG. 2. In FIG. 5, the program memory 41 includes areas 411–419. The area 411 stores a game program. BG maps are stored in the area 412. In the BG maps, data for character codes (codes corresponding to character data shown below) for BG (background) display are described. A plurality (tens of thousands, for example) of character data are stored in the area 413. Each character data is 8×8 dot bit map data, by combining which character data all BG's and OBJ's (objects) are represented. One dot is represented with 2 bits to represent 4-gradation display. World attributes are stored in the area 414. As will be described later, the electronic game device of this embodiment forms one image by superposing 32 planes of worlds on the maximum. The world attributes are attribute information necessary to draw each world. OBJ attributes are stored in the area 415. The OBJ attributes are attribute information necessary to draw OBJ's. A column table is stored in the area 416. This column table includes timing information described therein for correcting unevenness of dot pitch in the X-axis direction caused by sine-wave vibration of the mirrors 217L and 217R in the image display unit 21. Stored in the area 417 are various parameters necessary to execute the game (e.g., parameters used in special display modes, such as H-bias, affine, etc.) A shut-down program is stored in the area 418. The shut-down program is a program for automatically shutting down the progress of the game to prevent accumulation of fatigue of the player when a certain time period passes after the game is started. The area 419 stores other data which are necessary to execute the game.

Figure 6:
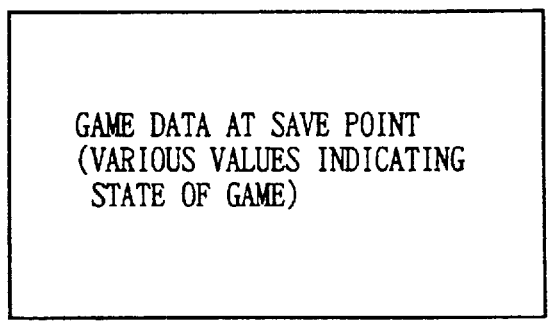
FIG. 6 is a diagram showing a memory map of the backup memory 42 in FIG. 2.

FIG. 6 is a diagram schematically showing structure of the back-up memory 42 in FIG. 2. In FIG. 6, game data (various values indicating states of the game) at each save point are stored in the back-up memory 42. The back-up memory 42 is formed of RAM and is backed up by the battery 43. Accordingly, the game data stored in the back-up memory 42 are held even after the power of the body device 2 is turned off.

Figure 7:
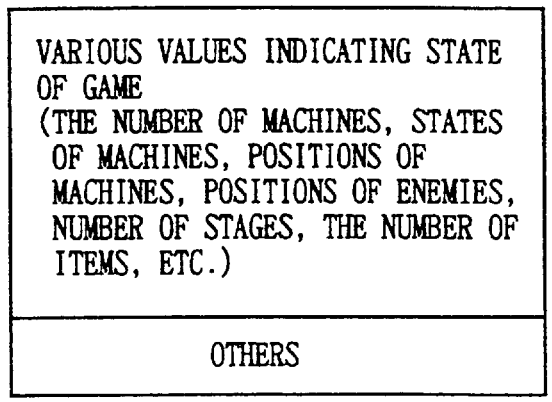
FIG. 7 is a diagram showing a memory map of the work memory 222 in FIG. 2.

FIG. 7 is a diagram schematically showing structure of the work memory 222 in FIG. 2. In FIG. 7, the work memory 222 stores various values indicating states of the game (the number of machines on the player's side, states of the player's machines, positions of the machines on the player's side, positions of enemies, a number of stages, the number of items, etc.) and other data.

Figure 8:
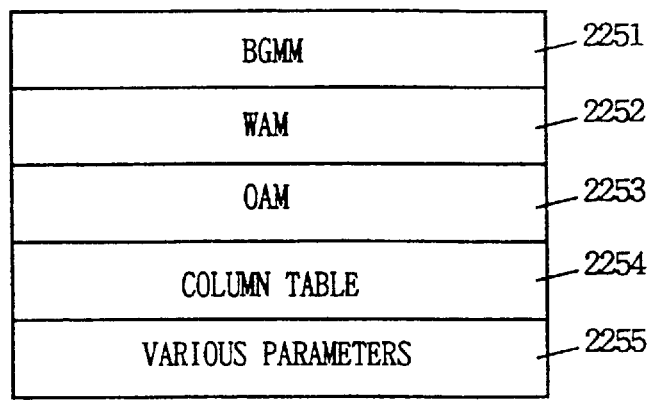
FIG. 8 is a diagram showing a memory map of the image work memory 225 in FIG. 2.

FIG. 8 is a diagram schematically showing the structure of the image work memory 225 in FIG. 2. In FIG. 8, the image work memory 225 includes areas 2251–2255. The area 2251 is used as a BGMM (BG map memory) for storing BG maps selectively read from the area 412 of the program memory 41 (refer to FIG. 5). The area 2252 is used as a WAM (World Attribute Memory) for storing world attributes for 32 worlds. The area 2253 is used as an OAM (OBJ Attribute Memory) for storing OBJ attributes selectively read from the area 415 of the program memory 41. Stored in the area 2254 is a column table read from the area 416 in the program memory 41. Stored in the area 2255 are various parameters necessary to execute the game (e.g., parameters used in special display modes, such as H-bias, affine, etc.)

Figure 9:
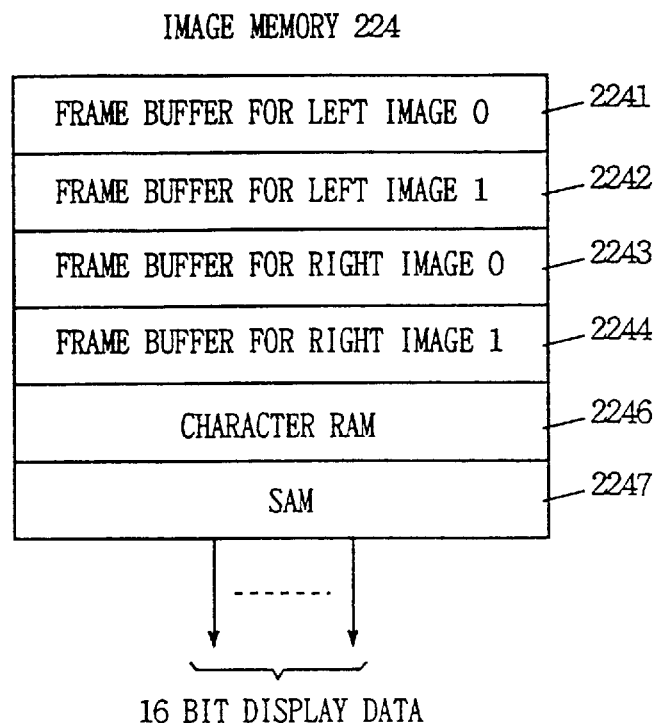
FIG. 9 is a diagram showing a memory map of the image memory 224 in FIG. 2.

FIG. 9 is a diagram schematically showing the structure of the image memory 224 in FIG. 2. In FIG. 9, the image memory 224 includes areas 2241–2247. The area 2241 is used as a frame buffer (0) for the left image. The area 2242 is used as a frame buffer (1) for the left image. The area 2243 is used as a frame buffer (0) for the right image. The area 2244 is used as a frame buffer (1) for the right image. Each frame buffer stores display data for one picture (display data of 384×224 dots, each bit having a depth of 2 bits). The area 2246 is used as a character RAM. Stored in the character RAM are the maximum of 2048 character data read from the area 413 of the program memory 41 (refer to FIG. 5). The area 2247 is used as a SAM (Serial Access Memory). Display data stored in each frame buffer are stored in the SAM 2247 by every four vertical columns (for every 224×4×2=1792 bits). The SAM 2247 outputs accumulated display data to the image display unit 21 by every 16 bits (8 dots).

Figure 10:
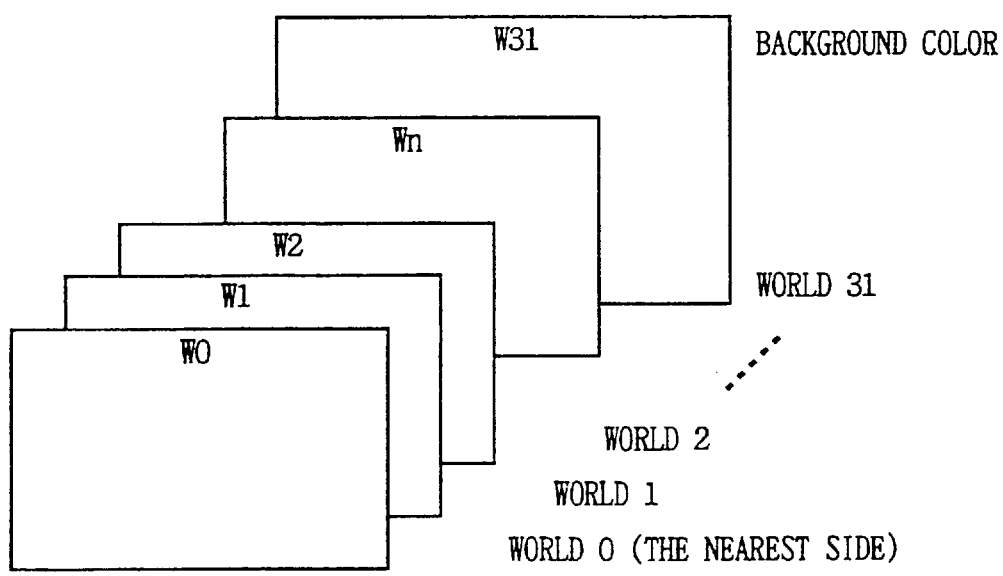
FIG. 10 is a schematic diagram for describing the concept of worlds.

Although this embodiment adopts the parallax providing method which is simplified to reduce the amount of information, it introduces the concept called worlds to obtain images with more sense of depth. The worlds mean virtual planes (W0–W31) formed of 32 layers for controlling picture drawing which exist from this side toward the depths on the screen as shown in FIG. 10. In this embodiment, the maximum of 32 planes of worlds can be set, and one BG, or OBJ's formed of characters up to 1024 can be placed in each plane. The image processing IC 223 (refer to FIG. 2) sequentially refers to attribute information (world attributes) set for each world from the deepest world W31 to perform picture drawing processing of each world to the image memory 224. That is to say, one image is formed by superposing the maximum of 32 planes of worlds.

In this embodiment, it is possible to determine the display priority order between BG/BG, OBJ/BG, OBJ/OBJ by setting the worlds. That is to say, a BG or an OBJ placed on a world on the relatively nearer side (with a smaller number) has a higher order of display priority than a BG or an OBJ on a world on the relatively deeper side (with a larger number). For example, a BG or an OBJ placed on the N-th world is written over a BG or an OBJ placed on the N+1-th world adjacent in the depth direction. Accordingly, if the BG or OBJ has an overlapping portion between adjacent worlds, the BG or OBJ on the deeper world is covered with the BG or OBJ on the nearer world in the overlapping portion and is not visible on the screen, unless the BG or OBJ on the nearer world has a transparent portion. The display priority order is set according to the write order of OBJ attributes on the OAM 2253 also between OBJ/OBJ placed on the same world, but the display priority order among worlds has a higher degree of priority.

In this embodiment, the BG and OBJ are displayed by different methods, considering differences in nature between the BG and the OBJ. The methods of displaying the BG and OBJ will now be described.

First, a description will be made on a method of displaying the BG. The BG is displayed by cutting a picture in a necessary area out of a BG map developed in the BGMM 2251 (refer to FIG. 8) and pasting the cut-out picture in an arbitrary position on the display screen. It is possible to cut out a picture in units of one dot in a range from the minimum of 1 (transverse)×8 (vertical) dots to the maximum of 384 (transverse)×224 (vertical) from the BG map. The coordinates at which cutting-out is started can also be specified in units of one dot in both X and Y coordinates.

Figure 11:
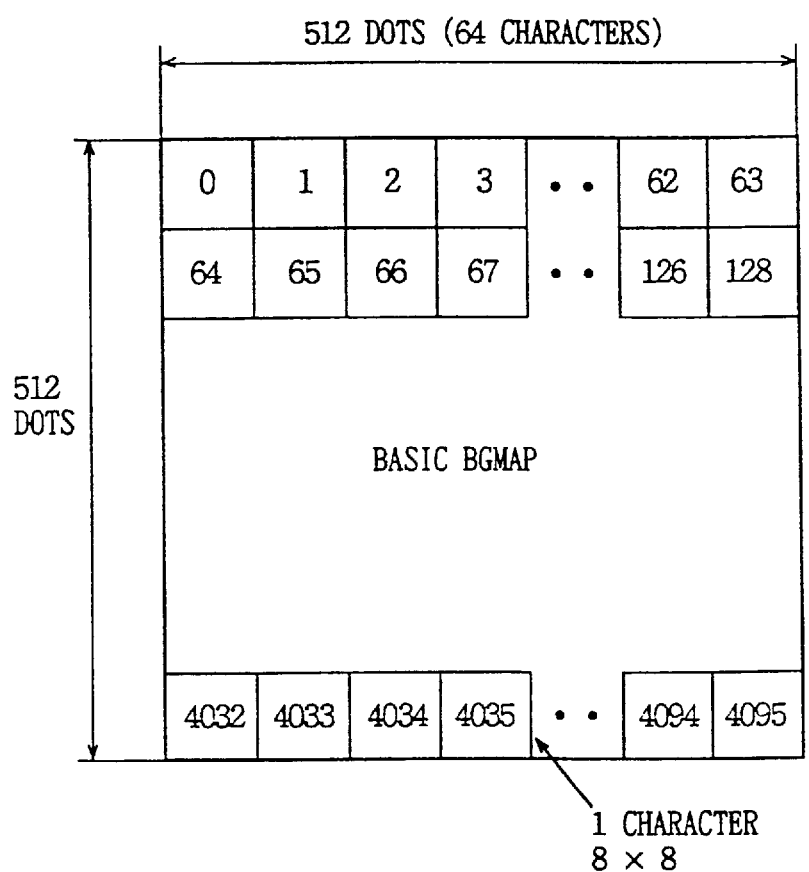
FIG. 11 is a schematic diagram of a basic BG map.
Figure 12:
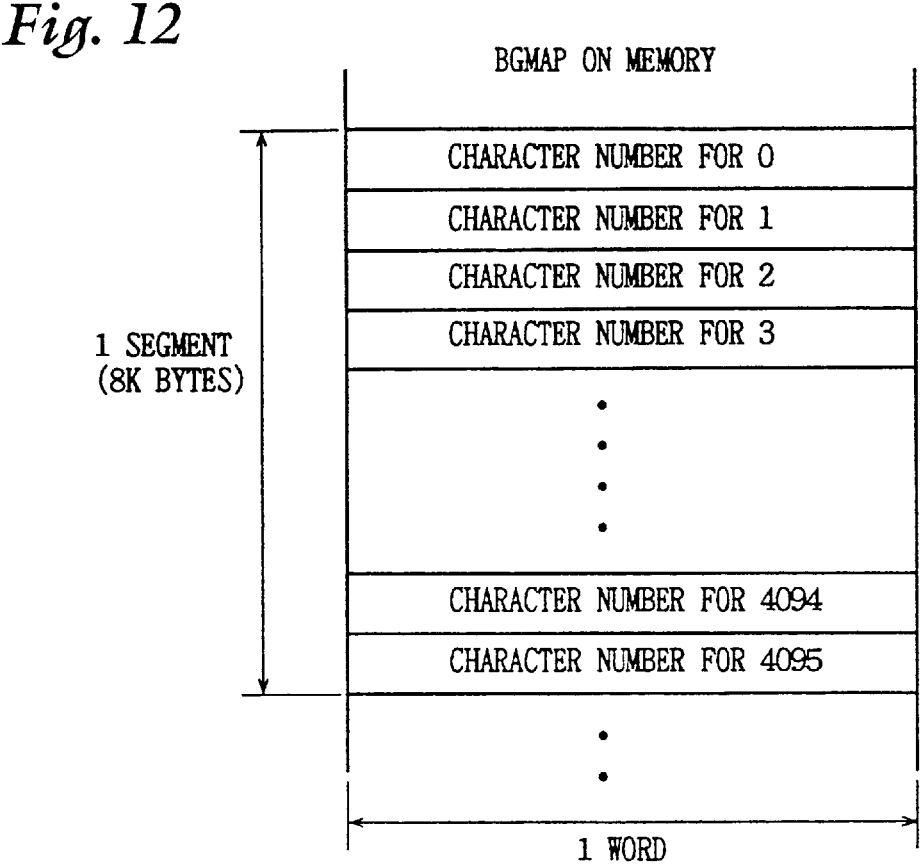
FIG. 12 is a diagram showing the structure of the BG map on the memory.

The BG map has a BG image for 512×512 dots as a basic unit, as shown in FIG. 11. In this embodiment, the basic unit of the BG is referred to as a segment. One segment is formed by collecting 64×64 character blocks of 8×8 dots, i.e. 4096. FIG. 11 schematically shows the BG map, and on the actual BGMM 2251, as shown in FIG. 12, numbers of the respective characters are stored in the order of the position numbers (0–4095) on the BG map in FIG. 11. The numbers are allotted to the respective characters on the character RAM 2246 in the image memory 224 (refer to FIG. 9). That is to say, the character RAM 2246 stores 2048 character data selectively transferred from the area 413 of the program memory 41 (refer to FIG. 5), each character data having a character number selected from 0 to 2047. Accordingly, on the BG map, the BG image is represented using the 2048 kinds of characters.

In this embodiment, the BGMM 2251 has an area which can store BG maps for 14 segments. Hence, the electronic game device of this embodiment can use the maximum of 14 BG maps to create one picture. It is also possible to handle a combination of a plurality of segments as one BG map. The maximum number of combinable segments is 8.

Figure 13:
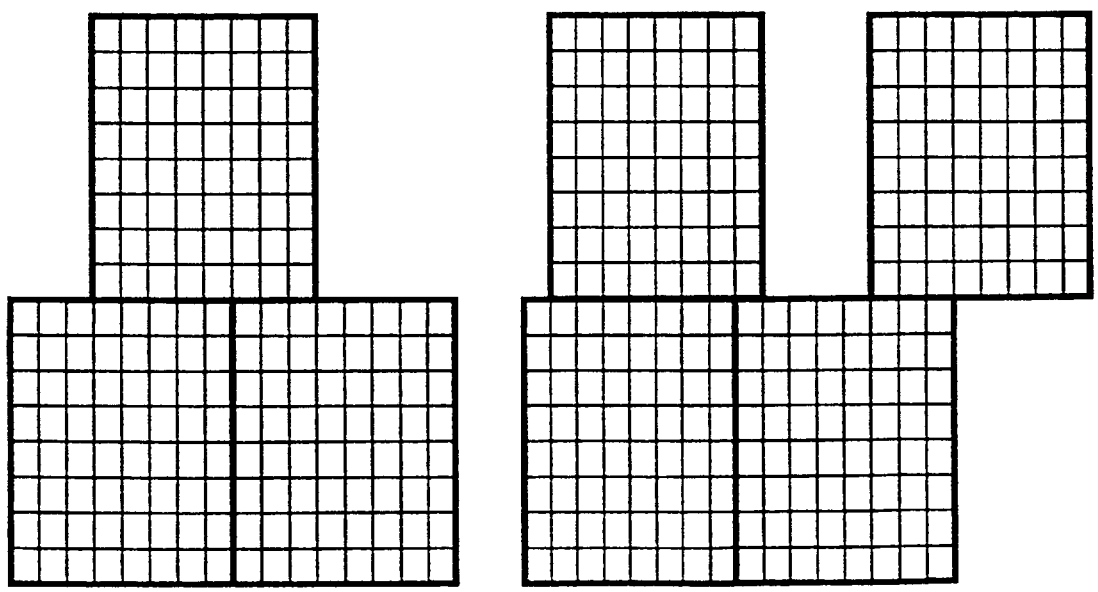
FIG. 13 is a diagram showing an example of OBJ created by combining character blocks.

Next, a method of displaying an OBJ will now be described. The OBJ is formed by freely combining 8×8 dots character blocks, as shown in FIG. 13. In other words, by well controlling display coordinates of selected character blocks, the selected character blocks are connected on the display screen. The maximum number of characters usable on one display screen is 1024. The 1024 characters are selected from the 2048 characters registered in the character RAM 2246 (refer to FIG. 9) of the image memory 224 and used.

The OBJs as displayed objects have a property that a large number of small objects are disposed discontinuously on the display screen. Accordingly, controlling coordinate positions of character blocks required for display and appropriately disposing the character blocks on the screen provide efficient use of memory. If the OBJ is to be displayed by cutting rectangular pictures out of the BG map and pasting them on the display screen, like the BG, a lot of undisplayed character blocks must be disposed on the map, which will consume memory capacity in vain. However, a basic size of the OBJ is rigidly 8×8 dots, and no objects smaller than that can be displayed. Also, when displaying an object larger than that, the size increases in units of 8 dots.

On the other hand, the BG has a large display area on the display screen and has a property that they are continuously disposed with few changes in state. Accordingly, the method of cutting out rectangular blocks from a previously prepared BG map and pasting them at arbitrary positions on the display screen is suitable. If coordinates of a BG are to be controlled for each display character, like the OBJ, attribute information increases so much that overload will be put on the picture drawing processing.

Figure 14:
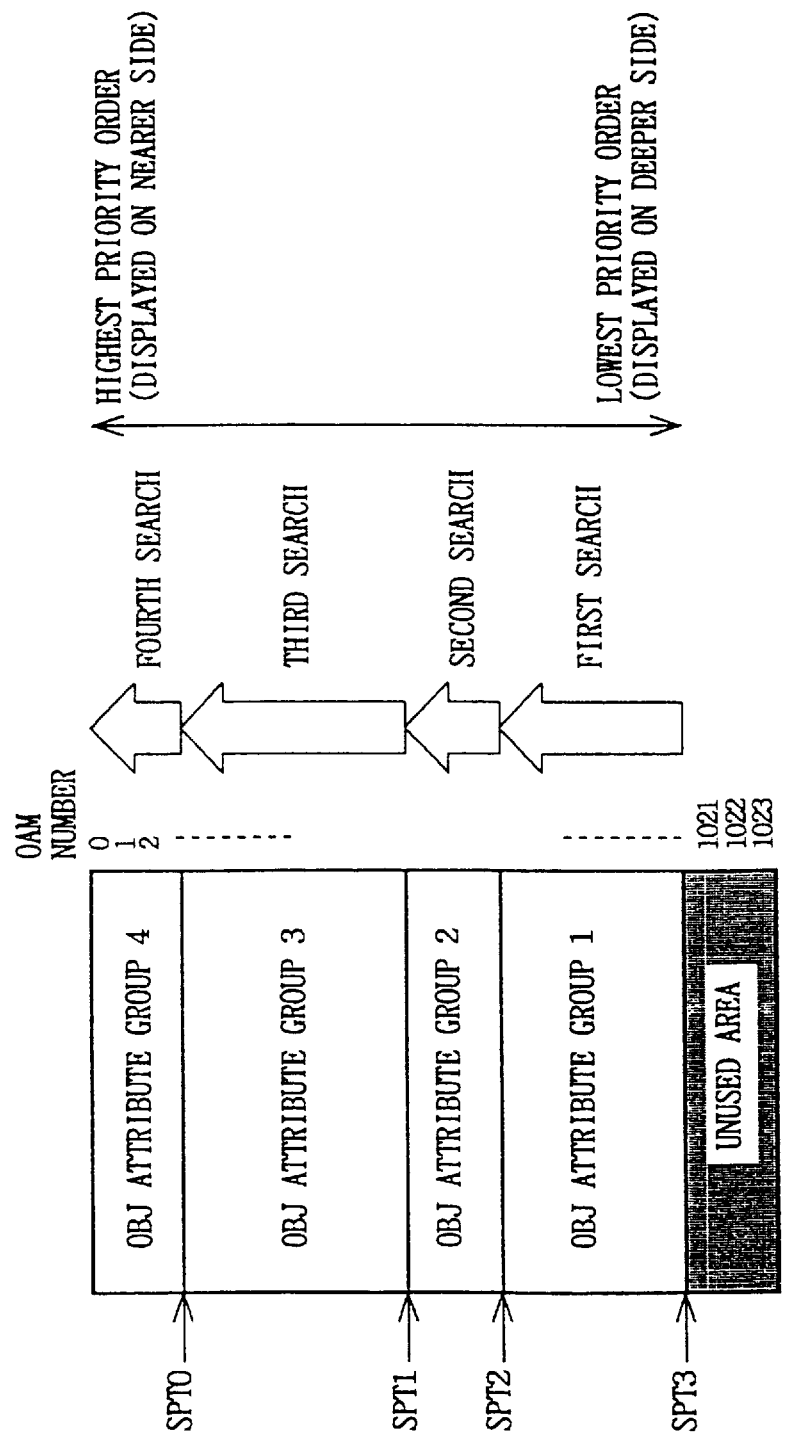
FIG. 14 is a schematic diagram for describing arrangement of OBJ attribute groups in the OAM and the order of searching them.

FIG. 14 schematically shows arrangement of OBJ attributes stored in the OAM 2253 (refer to FIG. 8). As stated before, the OBJ can be set in the maximum of four planes in the 32 worlds. Hence, OBJ attributes are registered while being divided into the maximum of four groups in accordance with planes in which they are set, as shown in FIG. 14. The image processing IC 223 (refer to FIG. 2) refers to the world attributes, and when it finds a world in which the OBJ is set, it refers to the OAM 2253 to draw the OBJ registered therein. The reference to the OAM 2253 is performed in the order starting from an OBJ registered in a position with a larger OAM number (0–1023), and a corresponding OBJ is drawn. An OBJ drawn later has a higher display priority order in the worlds. The boundaries between the four groups are specified by OBJ controlling registers SPT0, SPT1, SPT2 and SPT3 (not shown). Set in an OBJ controlling register SPTx (x=0–3) is an OAM number (0 to 1023) at a position with the lowest priority order (with a larger address) in each group. If the OAM number 1023 is set in the OBJ controlling register SPT3, no unused area exists in the OAM.

Figures 15, 16:
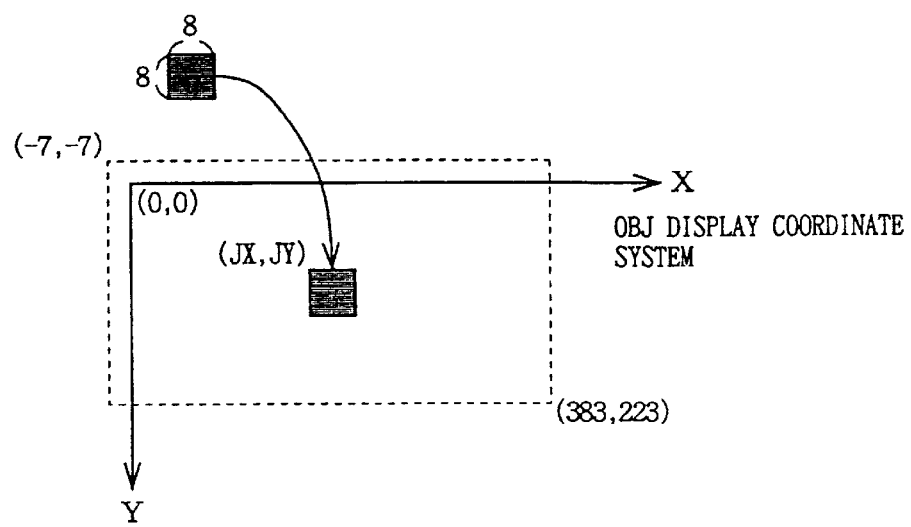
FIG. 15 is a diagram showing an example of data format of the OBJ attributes.
FIG. 16 is a diagram showing an OBJ display coordinate system on the display screen.
Figure 19A:
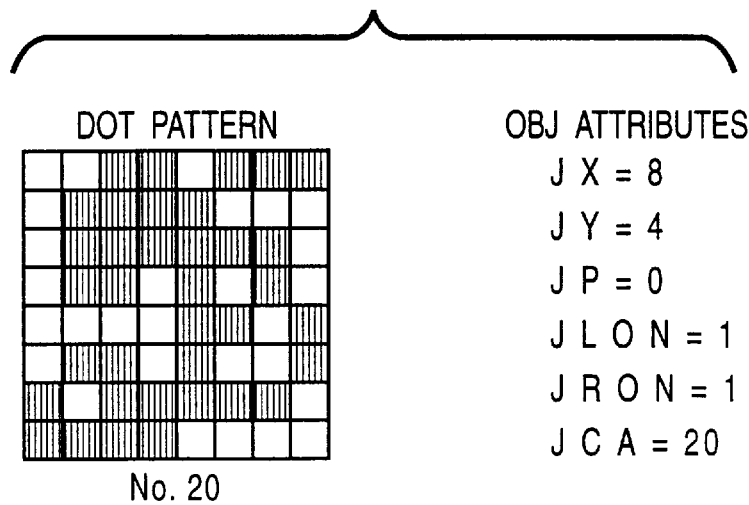
FIG. 19 is a diagram showing an example of character blocks and object attributes prepared to display a certain OBJ.
Figure 19B:
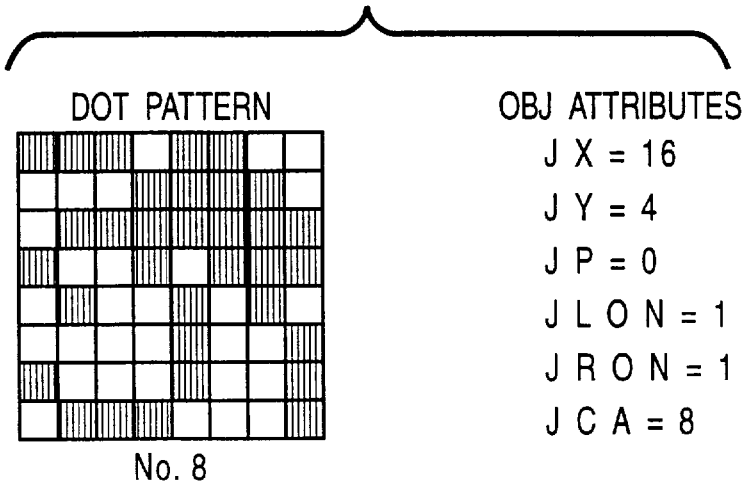
Figure 19C:
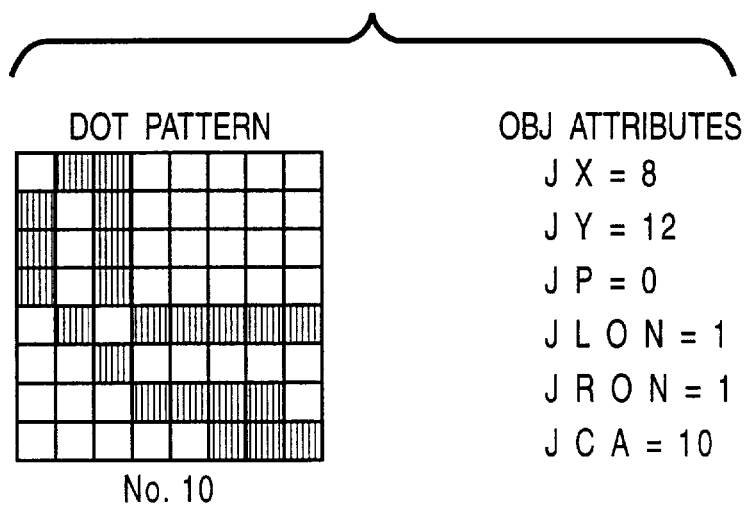
Figure 19D:
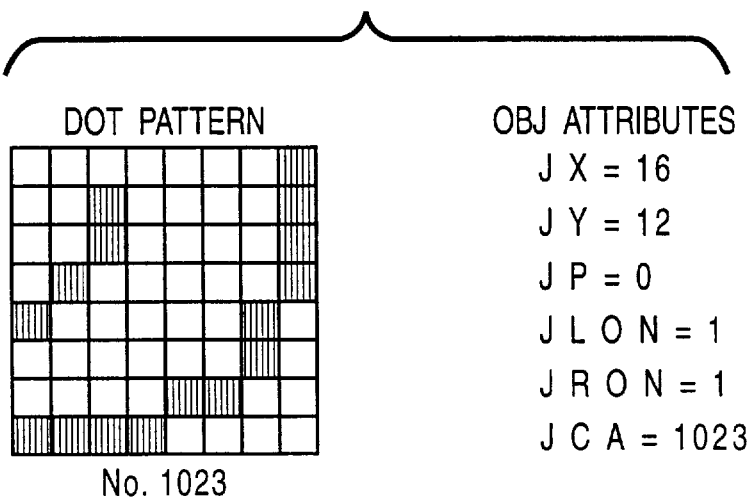

FIG. 15 is a diagram showing structure of the OBJ attributes for one character block written in the OAM 2253. The OBJ attributes are formed of four words (one word includes 2 bytes 16 bits). In FIG. 15, JX is a 16-bit integer with a sign (positive or negative), which indicates a display position (−7 to 383) of the OBJ in the X-axis direction on the display screen. JY is a 16-bit integer with a sign, which indicates a display position of the OBJ in the Y-axis direction (−7 to 223) on the display screen. JP is a 14-bit integer with a sign, which indicates the quantity of parallax (−256 to 255) in the coordinate system in which the OBJ is displayed. JLON is a 1-bit flag, which indicates whether the OBJ is to be displayed in the left screen or not. JRON is a 1-bit flag, which indicates whether the OBJ is to be displayed on the right screen or not. JCA is a 11-bit integer, which indicates a character number from 0 to 2047. Other attribute information in FIG. 15 have no direct relation with the present invention, so that a description thereof is not made herein.

FIG. 16 shows an OBJ display coordinate system in each frame buffer 2241–2244 (refer to FIG. 9) or on the display screen. The OBJ display coordinate system has an area from (0, 0) to (383, 223). The origin (0, 0) is chosen to be at the uppermost point on the left end on the display screen. On the other hand, the space represented by JX, JY of the OBJ attributes has an area from (−7, −7) to (383, 223). This is due to the fact that when a hero appears from the left end on the screen and walks to the right, for example, it is necessary to display the character so that the contents gradually appear on the left end on the screen. The same is true in the case where a hero appears from the upper end on the screen and walks downward. The image processing IC 223 of FIG. 2 reads character data corresponding to the JCA (character number) in the OBJ attributes of FIG. 15 from the character RAM of FIG. 9 and draws the read character data in a predetermined position or predetermined positions (the position defined by JX, JY, JP) on the frame buffer or buffers for the left image and/or the right image. At this time, the image processing IC 223 subtracts or adds the value of the parallax amount JP from or to the JX to determine the X coordinates of display on the left and right screens (i.e. the X coordinates of picture drawing in the right and left frame buffers). Concerning the JY, the quantity of parallax JP is not subtracted nor added. The description above can be represented in more detail using equations as;

$JXL = JX - JP$ ($JXL = X$ coordinate on the left screen)

$JXR = JX + JP$ ($JXR = X$ coordinate on the right screen)

$JYL = JYR = JY$ ($JYR$, $JYL = Y$ coordinate on the right and left screens)

FIG. 17 is a diagram showing the structure of world attributes for one world written in the WAM 2252 of FIG. 8. Now, the structure of the world attributes will be described referring to FIG. 17. As shown in FIG. 17, each world attribute is set on an attribute table of 16 words. The 32 worlds from W0 to W31 (refer to FIG. 10) can be set in the WAM 2252. By setting the world attributes, setting can be made as to whether a BG is to be drawn, an OBJ is to be drawn, a BG or an OBJ is to be drawn on both of the right and left screens, or to be drawn on one of them, etc. Either one of, 1: one BG (BG world)

2: one to 1024 OBJ(s) (OBJ world)

3: nothing (dummy world: nothing displayed)

4: controlling world (end world)

can be set in each world. As has been stated hereinabove, the image processing IC 223 of FIG. 2 draws pictures on worlds set in the order from an image existing in the deepest in the screen, as W31→W30→W29 . . . W0. The world W0 has the highest display priority order, followed by W1, W2 . . . W31. Depending on the software, when all the worlds are not required, controlling worlds can be set to efficiently draw required worlds only. For example, when three worlds are used, setting as follows is possible.

W31, W30, W29→used as worlds for picture drawing

W28→set as an end world

Setting as above allows the image processing IC 223 to skip processing for W28–W0 and the processing speed is increased. Of course, if the processing speed permits, the three worlds can be set on arbitrary worlds. In this case, unused worlds are set as dummy worlds.

In FIG. 17, the world attributes include attribute information GX, GY, GP for defining where in the display screen the BG image taken out of the BG map is to be displayed. The GX is a 16-bit integer with a sign (positive or negative), which indicates a position in the X-axis direction (0–383) in the coordinate system in which the BG is displayed. The GY is a 16-bit integer with a sign, which indicates a position in the Y-axis direction (0–223) in the coordinate system in which BG is displayed. The GP is a 16-bit integer with a sign, which indicates the quantity of parallax (−256 to 255) in the coordinate system in which the BG is displayed. The image processing IC 223 calculates coordinate positions for actual display on the display screen as;

X coordinate for the left eye (dstXL)=GX−GP

X coordinate for the right eye (dstXR)=GX+GP

The world attributes also include attribute information MX, MY, MP for defining a starting position of image data taken out from the BG map. The MX is a 16-bit integer with a sign (positive or negative), which indicates a position in the X-axis direction (0 to 4095) in the source coordinate system of the BG. The MY is a 16-bit integer with a sign, which indicates a position in the Y-axis direction (0 to 4095) in the source coordinate system of BG. The MP is a 16-bit integer with a sign, which indicates the quantity of parallax (−256 to 255) in the source coordinate system of the BG. The image processing IC 223 calculates a coordinate position of data actually taken out from the BG map as;

Y coordinate for the left eye (srcYL)=MY−MP

Y coordinate for the right eye (srcYR)=MY+MP

Furthermore, the world attributes include attribute information W, H for defining the BG size (window size) on the display screen. The W indicates the number of bits in the X-axis direction of the BG on the display screen. The H indicates the number of bits in the Y-axis direction of the BG on the display screen. For the left eye, the BG is cut out in the area of (srcXL, MY) to (srcXL+W, MY+H), and displayed from the position of (dstXL, GY) on the display screen. For the right eye, the BG is cut out in the area from (srcXR, MY) to (srcXR+W, MY+H) and displayed from the position of (dstXR, GY) on the display screen.

Furthermore, the world attributes include attribute information LON, RON for defining in which of the left image frame buffer (2241 or 2242) and the right image frame buffer (2243 or 2244) the BG image cut out from the BG map is to be drawn, or whether it is to be drawn in both, that is, for which of the left eye and the right eye it is to be displayed, or, whether it is to be displayed for both. The LON, RON are 1-bit flags, respectively, which indicate states below according to set values.

LON=0:not draw in the frame buffer for the left image

LON=1:draw in the frame buffer for the left image

RON=0:not draw in the frame buffer for the right image

RON=1:draw in the frame buffer for the right image

When the LON and RON are both 0, nothing is drawn on that world.

Furthermore, the world attributes include attribute information BGM for defining a display mode of the BG image. The BGM is formed of 2 bits and represents four modes below, according to the set values.

BGM=00 the normal BG display mode

BGM=01 the H-bias BG display mode

BGM=10 the affine BG display mode

BGM=11 the OBJ display mode

The normal BG display mode is a mode for displaying an usual BG image. The H-bias display mode is a mode for displaying a BG image with each line in the X-axis direction having offset for each line. The affine BG display mode is a mode for displaying a BG image while being enlarged/reduced/rotated. The OBJ display mode is a mode for displaying an OBJ, in which case the image processing IC 223 refers to the OBJ attributes set in the OAM 2253.

Furthermore, the world attributes include attribute information SCX, SCY for defining a screen size of the target BG map. The SCX is formed of 2 bits, and defines the size of the BG map in the X-axis direction as follows. The SCY is formed of 2 bits, and defines the size of the BG map in the Y-axis direction according to the set values as follows.

SCX: Screen Size X

| SCX = 00 | 512 dots (1 segment) |
| = 01 | 1024 dots (2segments) |
| = 10 | 2048 dots (4 segments) |
| = 11 | 4096 dots (8 segments) |

SCY: Screen Size Y

| SCY = 00 | 512 dots (1 segment) |
| = 01 | 1024 dots (2segments) |
| = 10 | 2048 dots (4 segments) |
| = 11 | 4096 dots (8 segments) |

A combination of the SCX and SCY above defines the size of one BG map combined in the range of 1 to 8 segments.

Moreover, the wold attributes include attribute information END for defining whether that world is a final world (an end world) or not. The END is a 1-bit flag, which defines two states below according to its set value.

END=0 The world processed this time is not a final world

END=1 The world processed this time is a final world

Furthermore, the world attributes include 4-bit attribute information BGMAP_BASE. A base address of the BG map, i.e. a number (0 to 13) of a head segment of the target BG map is set in the BGMAP_BASE.

Furthermore, the world attributes include attribute information PARAM_BASE. Base addresses of a parameter table in which parameters used in the H-bias BG display mode, the affine BG display mode are stored in the attribute information PARAM_BASE.

Other attribute information in FIG. 17 have no direct relation with the present invention, and therefore a description thereof is not made herein.

A picture registered on the BG map is cut out in an arbitrary size (1×8 to 384×224) from an arbitrary position according to setting in the world attributes and drawn. When the normal BG display mode is set in the attribute information BGM, the parallax quantity MP is referred to when cutting out the picture from the BG map, in addition to the quantity of parallax GP on the display screen. The quantity of parallax MP is for considering that different areas of a picture are seen through the left eye and the right eye if the cut out BG is supposed as a window. As shown in FIG. 18, a picture is cut out from a position (MX±MP, MY) which is shifted from the cut-out start point (MX, MY) by the quantity of parallax MP in the X-axis direction. Also, on the display screen, the picture cut out from the BG map is displayed being shifted by the quantity of parallax GP in the X-axis direction from the display start point (GX, GY).

Now, the area 412 in the program memory 41 stores a large number of BG maps which are necessary to configure all the BGs appearing in the game. When the displayed contents change considerably as the game progresses (e.g., when a stage or a scene changes), BG maps required for the BG to be displayed in that stage or scene (the maximum of 14 segments) are selected from the area 412 and transferred to the BGMM 2251.

Stored in the area 414 in the program memory 41 are a plurality of world attributes required to draw initial images of stages and scenes where displayed contents considerably change. When the stage or scene changes, world attributes necessary to draw an initial image of that stage or scene are selected from the area 414 and transferred to the BGMM 2251. The world attributes set in the BGMM 2251 are rewritten by the CPU 221 and used according to the game program till the next change of stage or scene comes.

The present embodiment adopts two kinds of newly developed parallax providing methods to display stereoscopic images with a less amount of information. Basically, an attempt is made to reduce the amount of information by producing two pictures provided with parallax from one picture. The novel methods of providing parallax adopted in this embodiment will now be described.

First, the method of providing parallax for the OBJ will be described. Generally, the OBJ is provided with parallax by displaying the same picture on the screens on both sides while shifted by a distance corresponding to the parallax quantity JP in the opposite directions along the X axis (horizontally).

Figure 20:
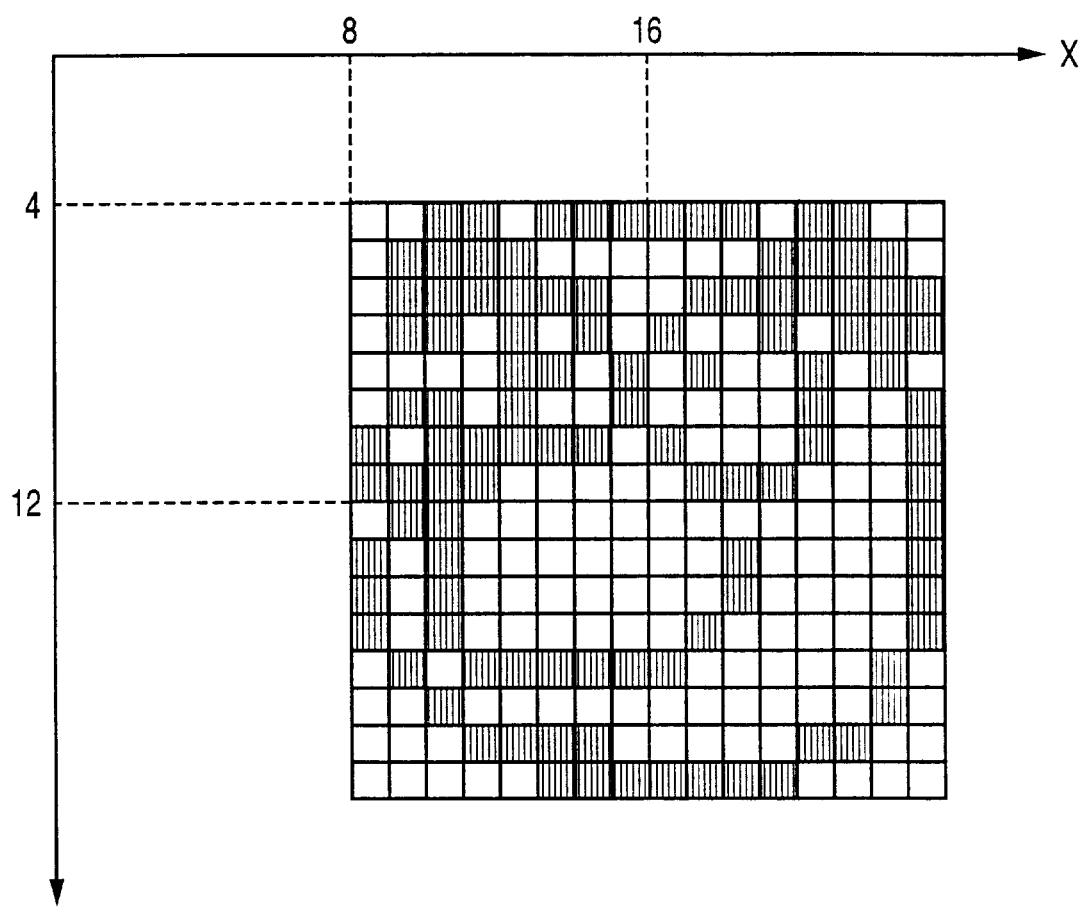
FIG. 20 is a diagram showing an OBJ without parallax displayed using the character blocks in FIG. 19.
Figure 21A:
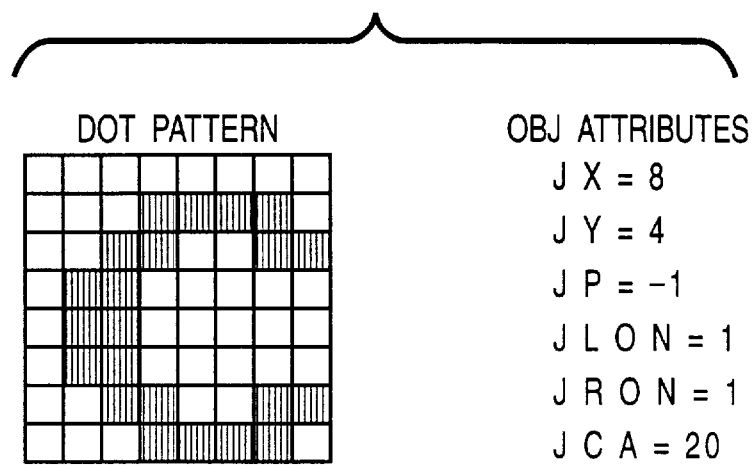
FIG. 21 is a diagram showing examples of character blocks prepared to display a plurality of OBJs with parallax to each other.
Figure 21B:
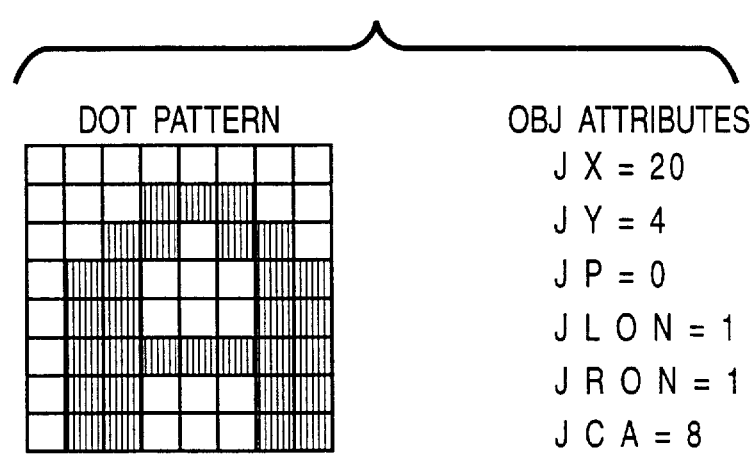
Figure 21C:
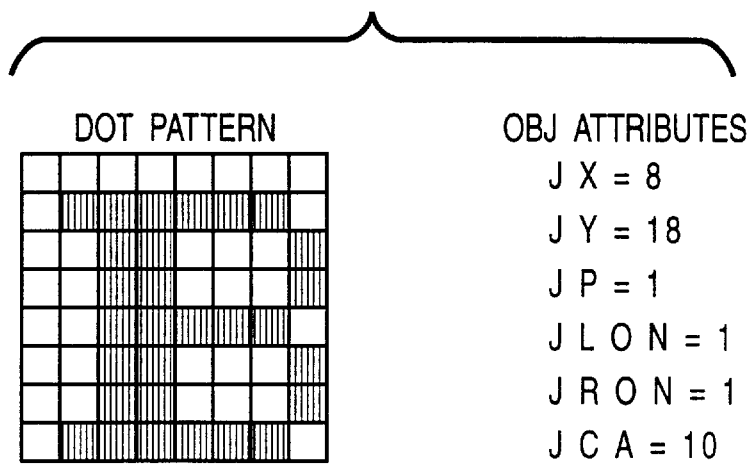
Figure 21D:
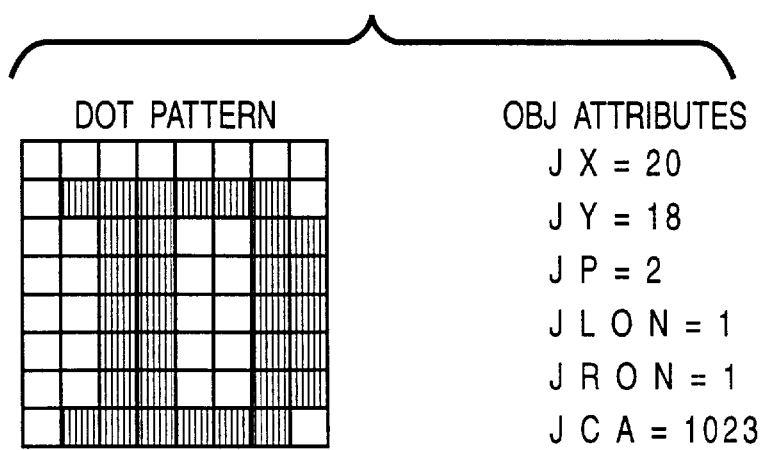

Now, suppose that an OBJ is displayed using four characters having dot patterns as shown in FIG. 19(*a*)–(*d*). The respective characters (*a*)–(*d*) are provided with character numbers (JCA) 20, 8, 10, 1023, respectively. The respective characters (*a*)–(*d*) are set with OBJ attributes as shown on the right side of the dot patterns, respectively. In the case of FIG. 19, as the quantities of parallax JP of the respective characters are 0, the characters are displayed at the positions themselves defined with (JX,JY) on the display screen. Accordingly, an OBJ as shown in FIG. 20 appears on the display screen.

Figure 22A:
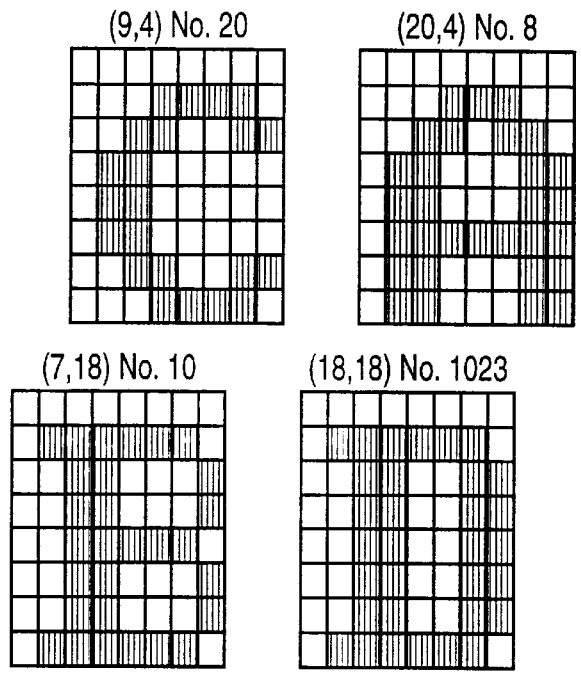
FIG. 22 is a diagram showing the character blocks shown in FIG. 21 displayed on the left eye screen and the right eye screen according to the respective OBJ attributes.
Figure 22B:
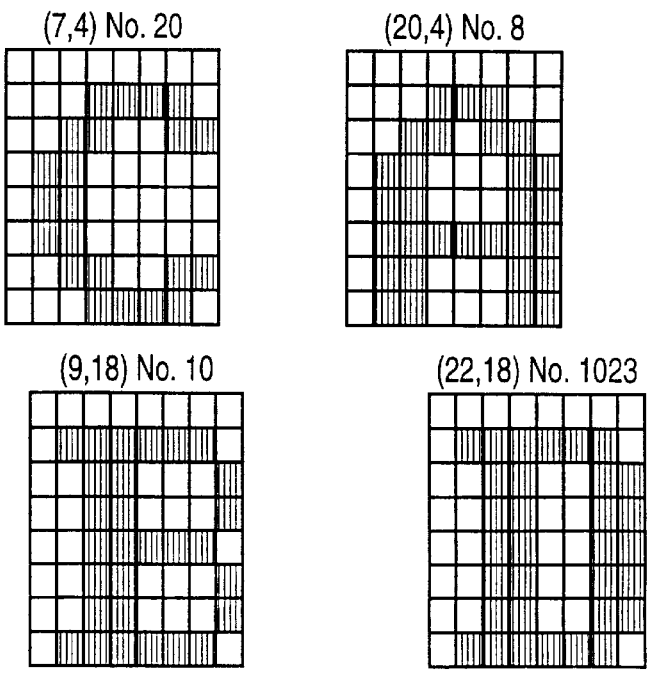
Figure 23:
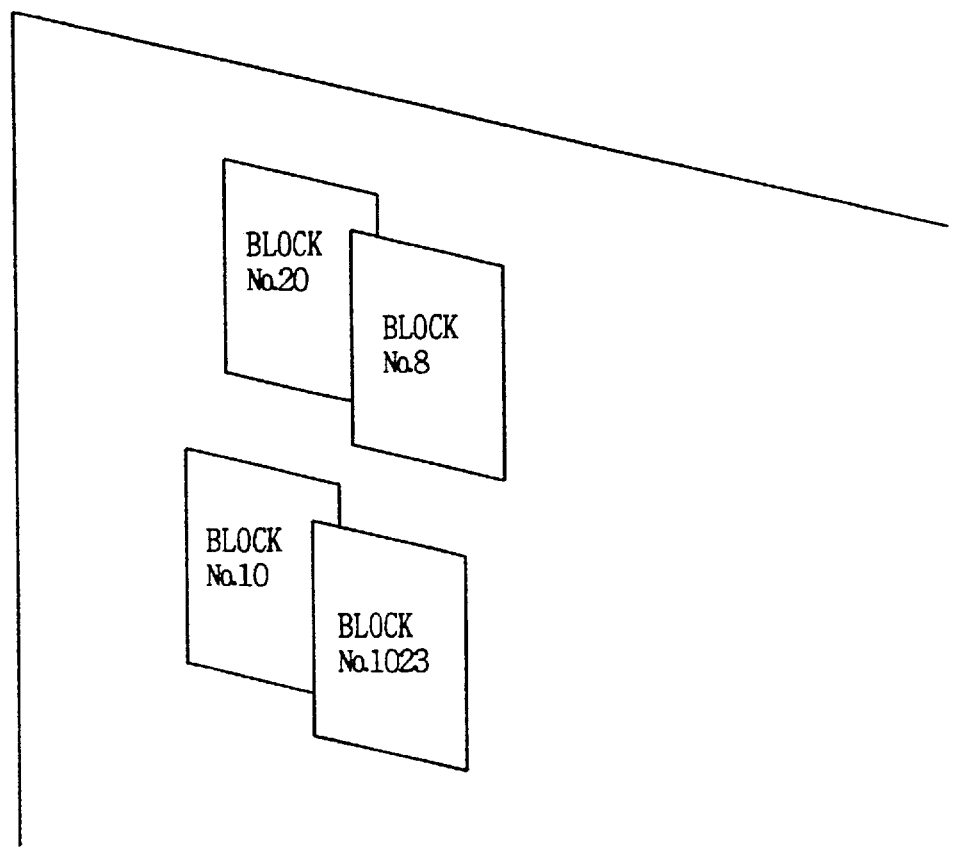
FIG. 23 is a schematic diagram for describing the stereoscopic sense when the left and right images shown in FIG. 22 are seen at the same time.

On the other hand, as shown in FIG. 21 (*a*)–(*d*), when parallax is set to the respective characters, the characters are displayed with display positions in the X-axis direction being sifted as (JX–JP) on the left screen (refer to FIG. 22(*a*)), and sifted as (JX+JP) on the right screen (refer to FIG. 22(*b*). In this way, as the display positions in the X-axis direction are shifted in the opposite directions by a distance corresponding to the quantity of parallax JP on the left and right screens, the object looks as if it were protruding or distant. If the images shown in FIG. 22(*a*) and (*b*) are seen with the left and right eyes, respectively, they are seen in the order of the block with the character number 20, the block with the character number 8, the block with the character number 10 and the block with the character number 1023 from this side, as shown in FIG. 23.

Figure 24:
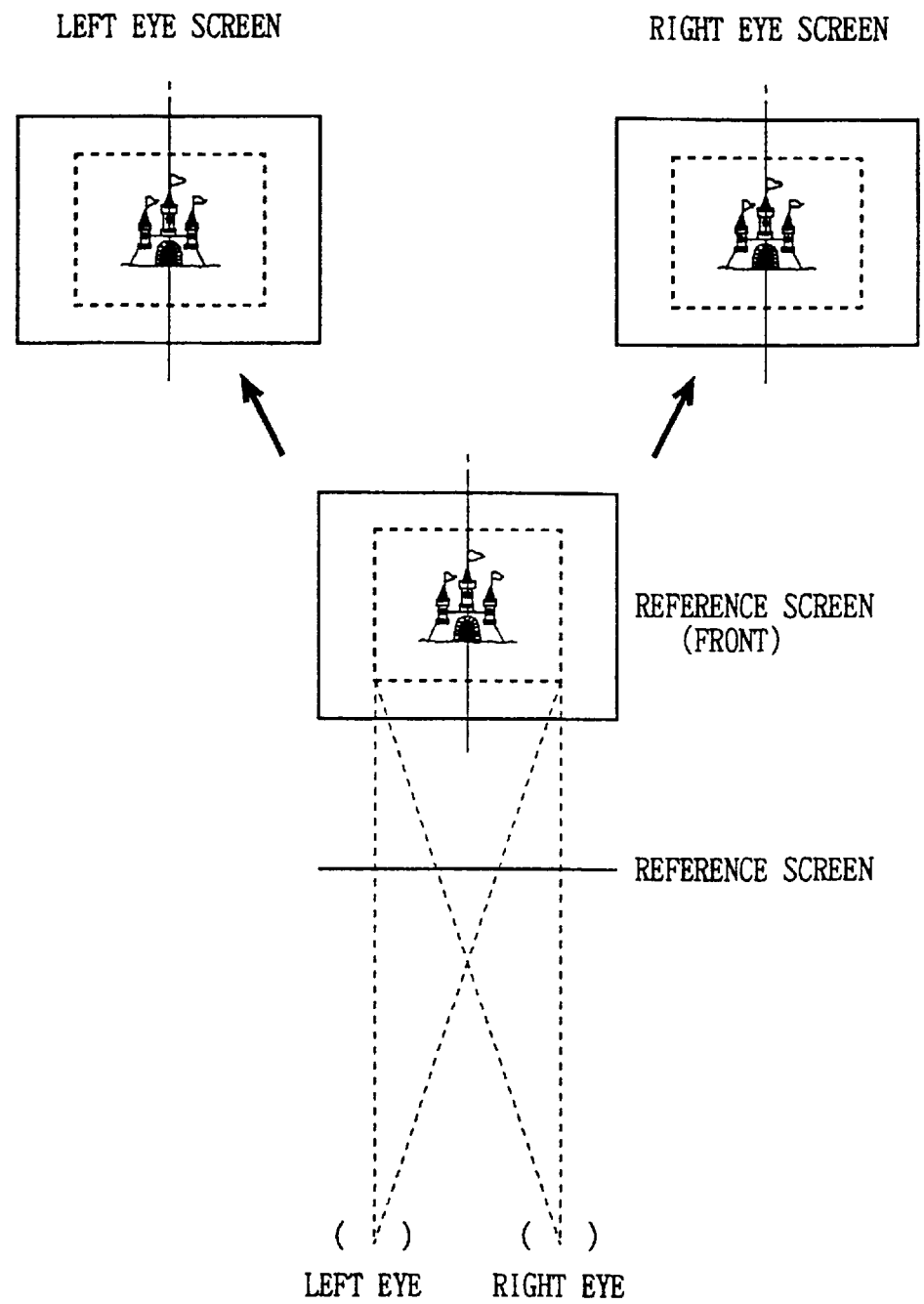
FIG. 24 is a diagram showing a BG displayed on the left and right screens when parallax on the screen is 0.
Figure 25:
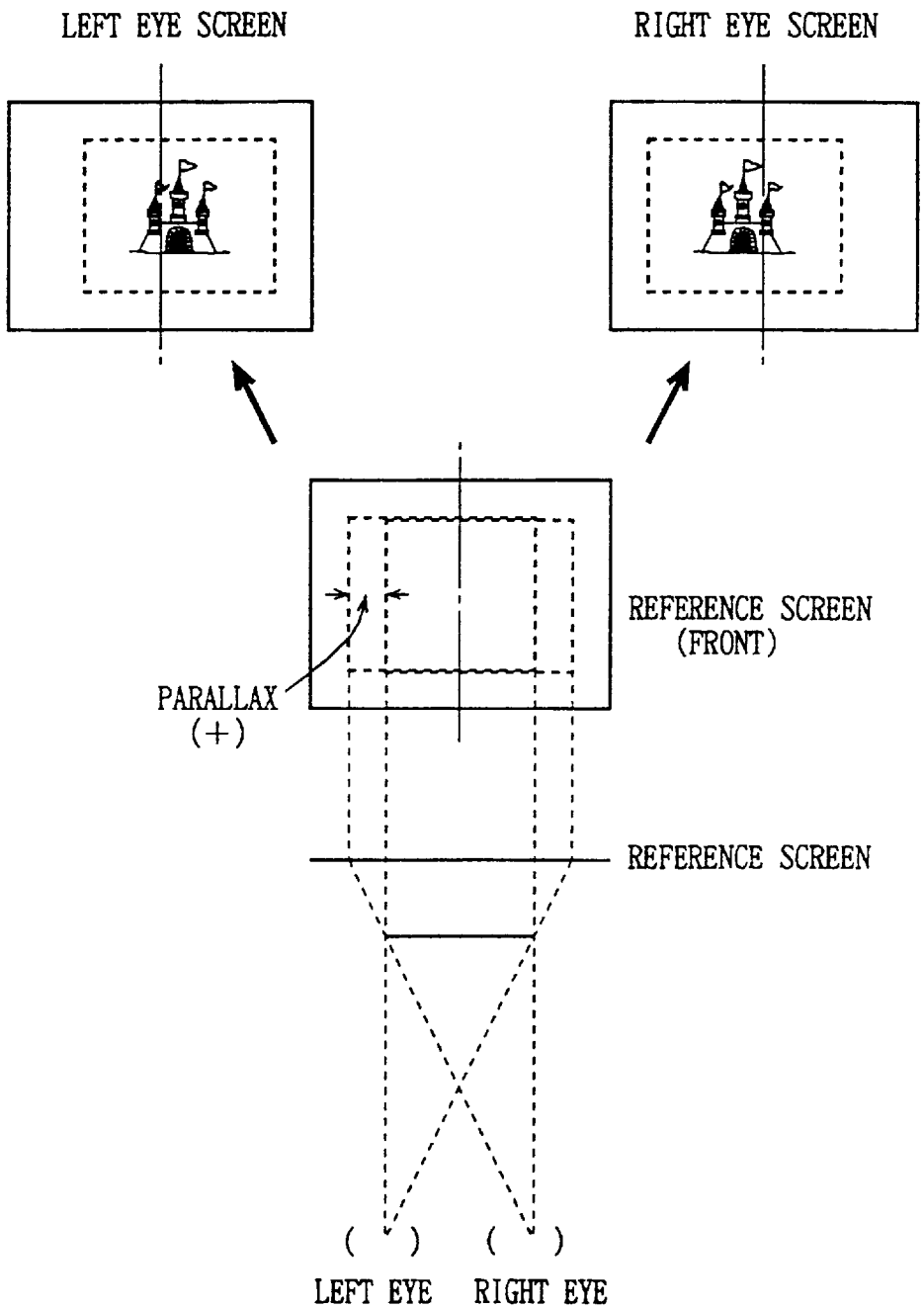
FIG. 25 is a diagram showing a BG displayed on the left and right screens when parallax on the screen is −.
Figure 26:
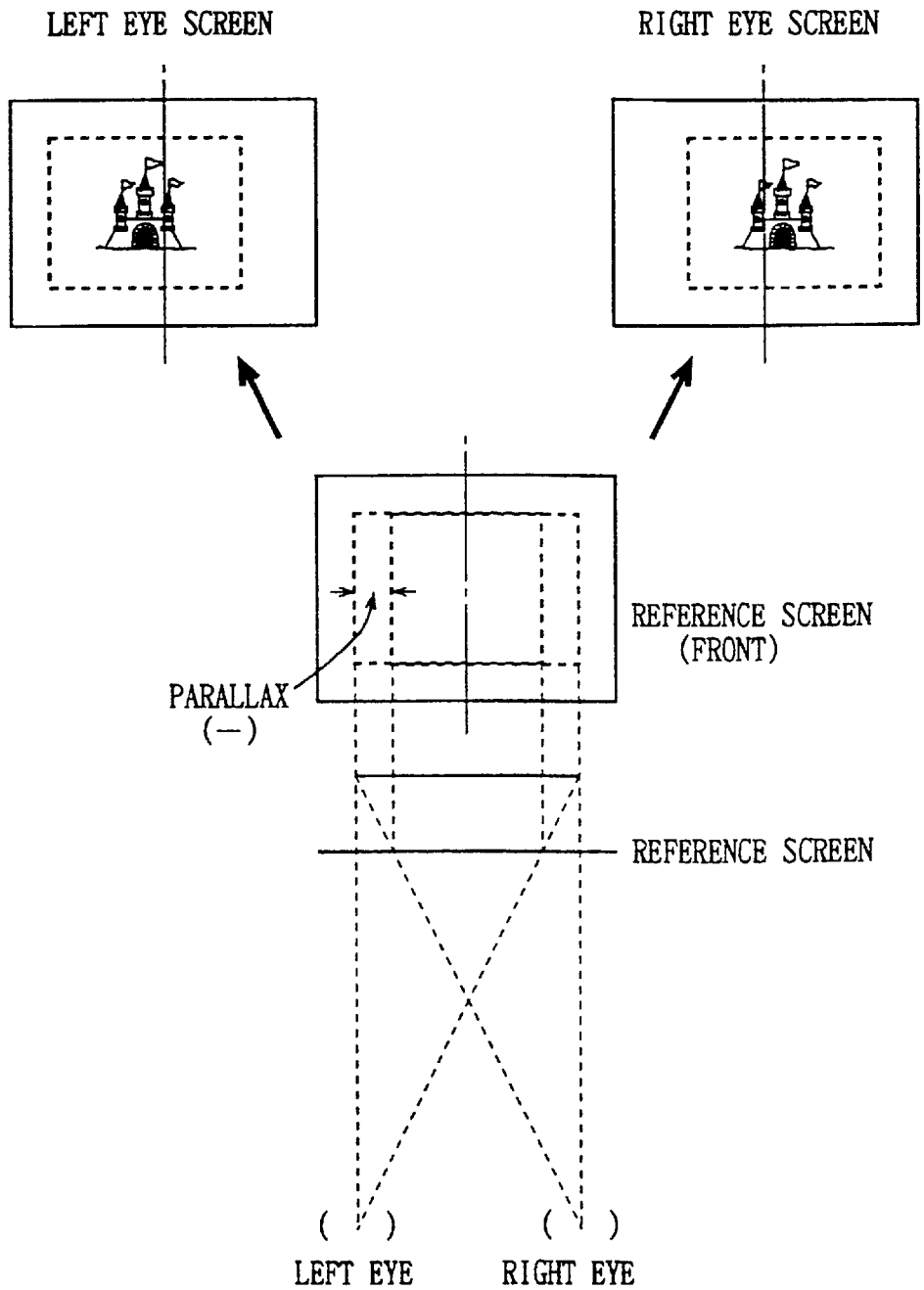
FIG. 26 is a diagram showing a BG displayed on the left and right screens when parallax on the screen is +.

Describing the relation between the quantity of parallax and the perspective, if the quantity of parallax is 0, a player will feel as if the OBJ exists on the reference screen, as shown in FIG. 24. If the quantity of parallax is positive, the player will feel as if the OBJ exists closer than the reference screen, as shown in FIG. 25. If the quantity of parallax is negative, the player will feel as if the OBJ exists deeper than the reference screen, as shown in FIG. 26.

Next, the method of providing parallax for the BG will be described. In this embodiment, two kinds of parallax providing methods are used for the BG.

The first method of providing parallax to BG is the same parallax providing method the same as that for the OBJ. That is to say, a picture cut out from a BG map is shifted by a distance corresponding to the quantity of parallax GP (refer to FIG. 17) in the opposite directions along the X axis (horizontal) and displayed on both screens, thereby providing the parallax.

Figure 27:
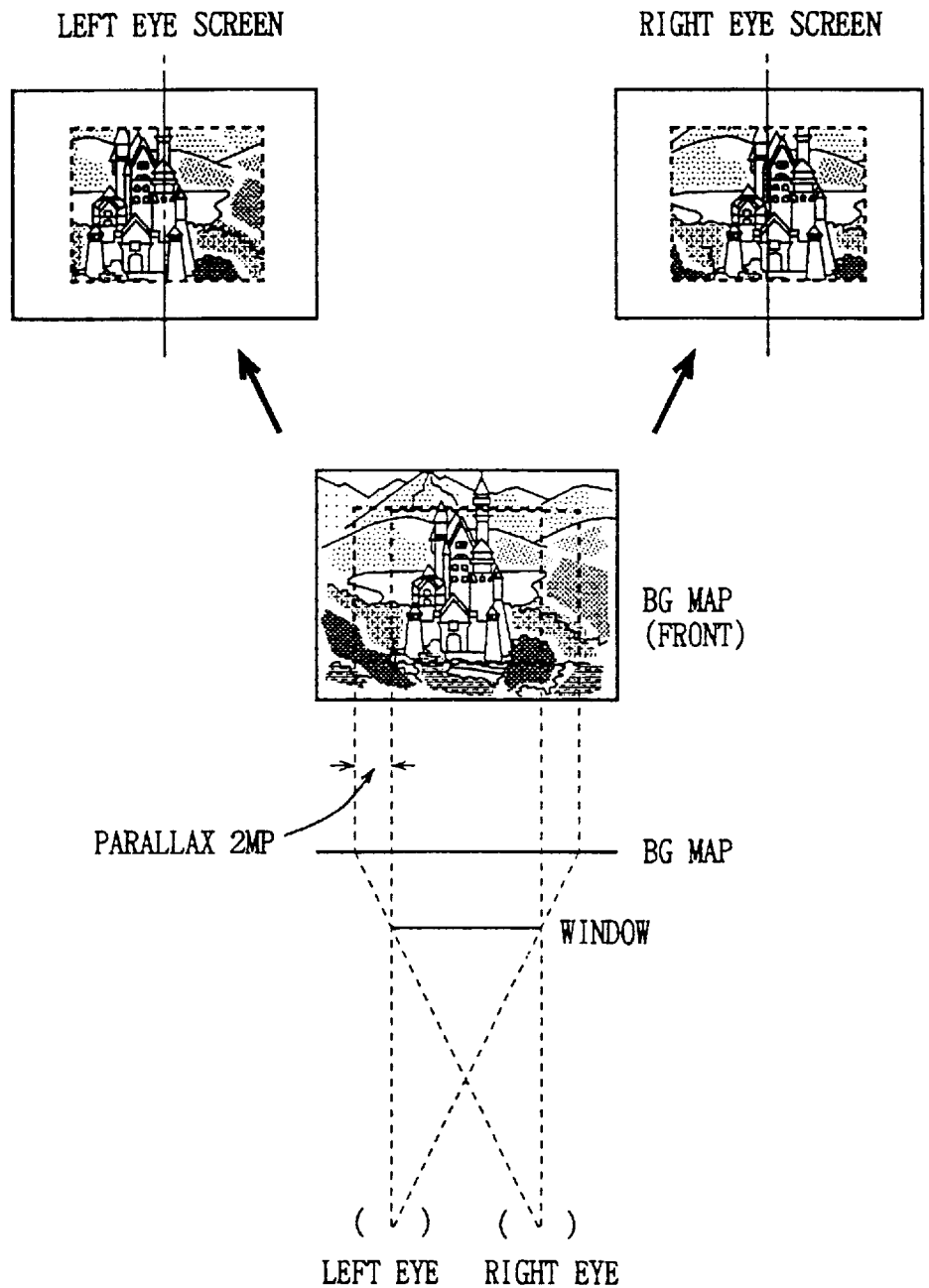
FIG. 27 is a diagram showing a BG cut out from the BG map and the BG displayed on the left and right screens when parallax MP is provided on the BG map.

The second parallax providing method for the BG is made according to an idea opposite to the first parallax providing method. That is to say, left and right pictures are cut out from a BG map while being shifted by a distance corresponding to the quantity of parallax MP in the opposite directions along the X axis and the cut out two pictures are displayed at the same positions on the left and right screens, thereby to provide parallax. (Refer to FIG. 27) In this case, the quantity of parallax GP on the screen may be set to 0. This second method of providing parallax is used to display a distant object seen through a window, for example. As shown in FIG. 27, the left eye and the right eye will see different areas when seeing a distant scene through a window. This second method of providing parallax is effective when the distant object seen through the window is larger than the size of the window frame, however, and the first method of shifting coordinates on the display side may be used when the displayed object is smaller than the size of the window frame. The second method of providing parallax is also effective when cutting out of a BG map and displaying a BG image with full size (384×224 dots) because the four ends of the display screen can be regarded as a window.

Furthermore, the parallax may be provided using both the first parallax providing method and the second parallax providing method. Such a parallax providing method is used to display a distant object seen through a window and display also the window itself on the nearer or deeper side, for example.

Figure 28:
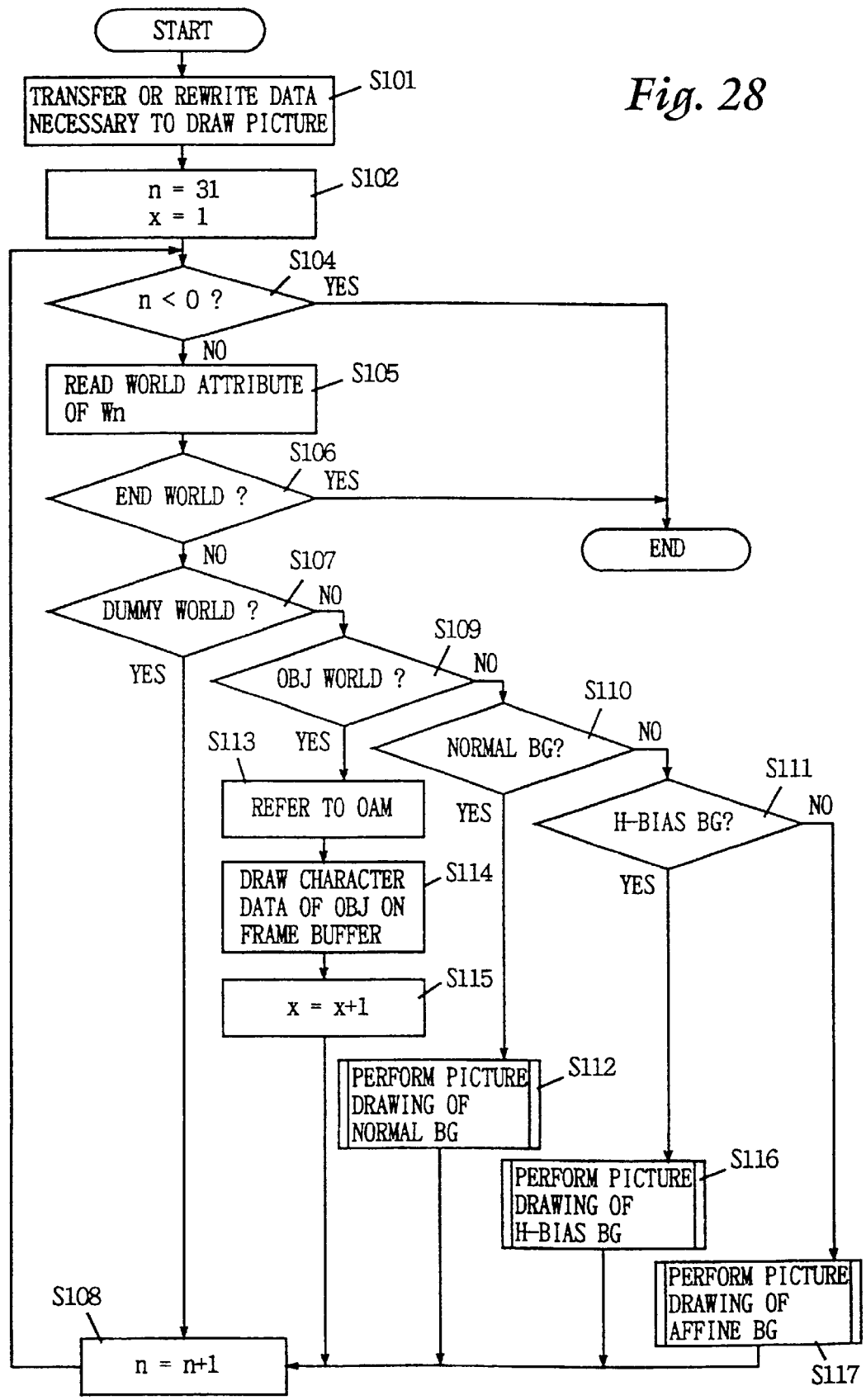
FIG. 28 is a flow chart showing picture drawing operation in the embodiment of the present invention.
Figure 29:
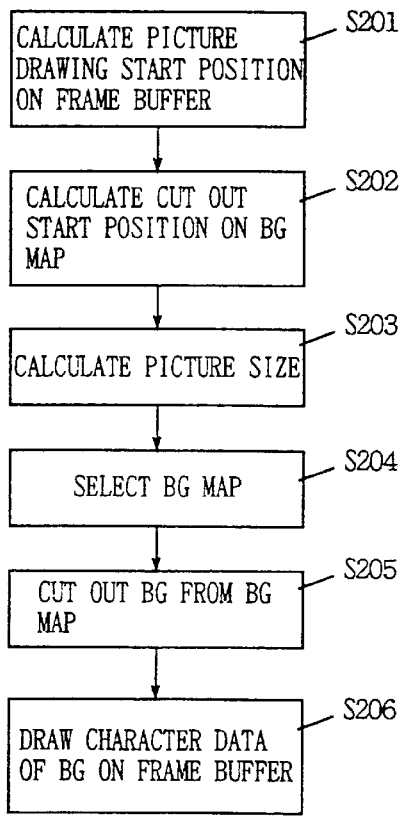
FIG. 29 is a flow chart showing details in the subroutine step S112 in FIG. 28.
Figure 30:
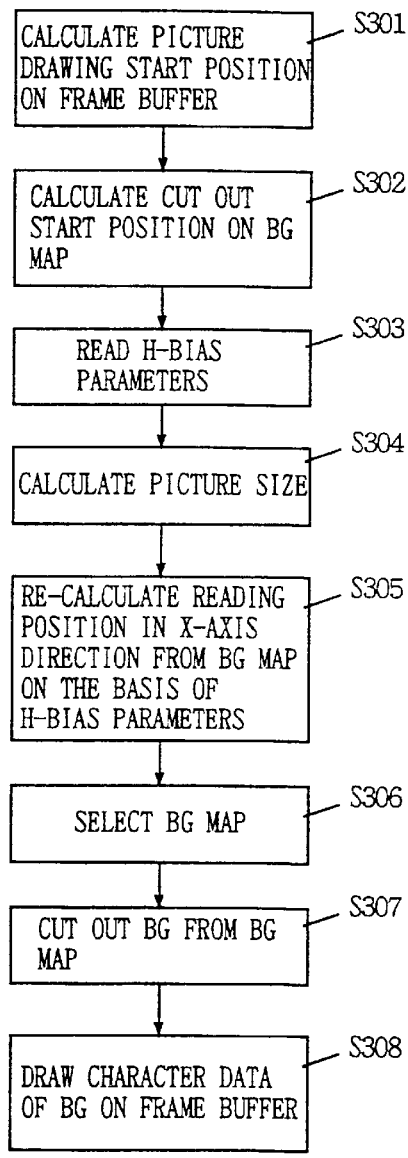
FIG. 30 is a flow chart showing details of the subroutine step S116 in FIG. 28.
Figure 31:
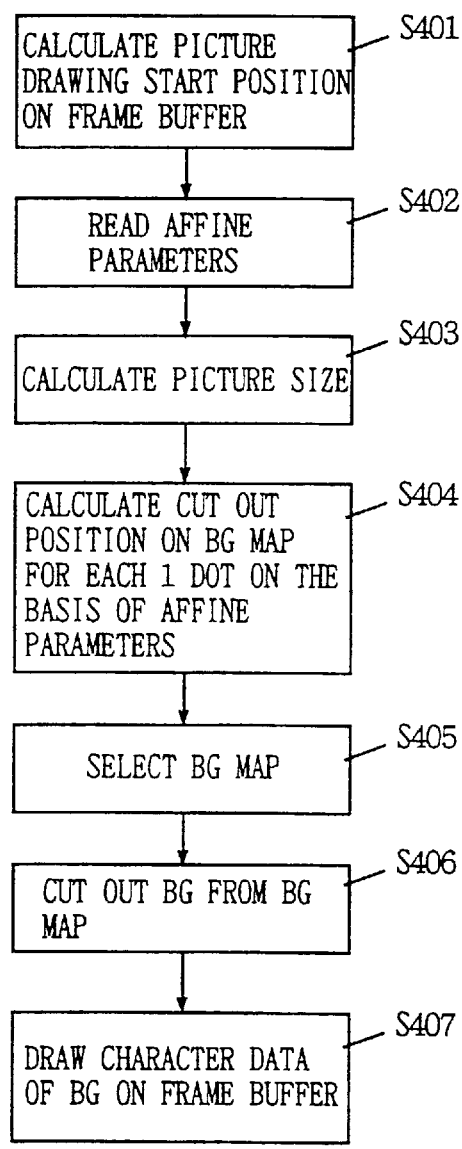
FIG. 31 is a flow chart showing details of the subroutine step S117 in FIG. 28.

FIG. 28 is a flow chart showing picture drawing operation in this embodiment. FIG. 29–31 are flow charts showing details of respective subroutine steps in FIG. 28. Referring to FIG. 28 to FIG. 31, the picture drawing operation performed in the image/sound processing device 22 of this embodiment will now be described.

First, the CPU 221 transfers or rewrites data necessary for picture drawing. (Step S101) That is to say, the CPU 221 refers to the program memory 41 in the program cartridge 4 when the power-supply is turned on or when stages or scenes are switched where the displayed contents considerably change to transfer required BG maps, world attributes, H-bias parameters, affine parameters, etc. to the image work memory 225 and transfer required character data etc. to the image memory 224. When the displayed contents do not considerably change from the preceding image, the CPU 221 rewrites the world attributes, the OBJ attributes, the H-bias parameters, the affine parameters, etc. stored in the image work memory 225 according to the game program stored in the program memory 41.

Next, the image processing IC 223 sets 31 in a counter n and sets 1 in a counter x. (Step S102) The counter n is a counter for counting numbers of worlds subject to the processing, which is configured to be able to count negative values. The counter x is a counter for counting the order of OBJ worlds subject to the processing. Next, the image processing IC 223 determines whether the counted value of the counter n is smaller than 0 or not. If the counted value of the counter n is 0 or above, the image processing IC 223 reads world attributes of a world Wn corresponding to the counted value of the counter n from the image work memory 225. (Step S105)

Next, the image processing IC 223 determines whether the world Wn to be processed this time is an end world or not. (Step S106) This determination is made on the basis of the attribute information END (refer to FIG. 17) included in the world attributes. If the world Wn is not an end world, the image processing IC 223 makes a determination as to whether that world Wn is a dummy world (world where no display is made; LON=0, RON=0) or not. (Step S107) If the world Wn is a dummy world, the image processing IC 223 reduces the counted value of the counter n by 1 (Step S108)

and returns to the operation in the Step S104. If the world Wn is not an end world nor a dummy world, the image processing IC 223 determines whether that world Wn is an OBJ world, a normal BG world, or an H-bias BG world. (Steps S109–S111) This determination is made on the basis of the attribute information BGM included in the world attributes.

First, processing when the world Wn is a normal BG world will be described. In this case, the image processing IC 223 performs picture drawing work of a normal BG on the basis of the various kinds of attribute information set in the world attributes. (Step S112) Details in this subroutine processing in this Step S112 are shown in FIG. 29. FIG. 18 schematically shows the principle of this picture drawing work. Referring to FIG. 29 and FIG. 18, the image processing IC 223 calculates positions for starting picture drawing on the left and right frame buffers (refer to FIG. 9) on the basis of the attribute information GX, GY, GP (the X coordinate position, the Y coordinate position, the quantity of parallax on the display coordinate system of BG) set in the world attributes. (Step S201) Next, the image processing IC 223 calculates a position for starting cutting out the BG from the BG map on the basis of the attribute information MX, MY, MP (the X-coordinate position, the Y-coordinate position and the quantity of parallax on the source coordinate system of BG) set in the world attributes. (Step S202) Next, the image processing IC 223 calculates a cut-out size of the BG from the BG map on the basis of the attribute information W, H (the dot size in the X-axis direction and the dot size in the Y-axis direction on the source coordinate system of BG) set in the world attributes. (Step S203) Next, the image processing IC 223 selects a necessary BG map from a plurality of BG maps in the BGMM 2251 (refer to FIG. 8) on the basis of the attribute information BGMAP_BASE set in the world attributes. (Step S204) Next, the image processing IC 223 cuts out BG data (a character number in this stage) from a predetermined area (an area obtained by the calculations in Steps S202, S203) on the selected BG map. (Step S205) Next, the image processing IC 223 reads the character data corresponding to the cut out character number from the character RAM 2246 (refer to FIG. 9) and draws picture in a predetermined area (the area with the picture drawing starting position calculated in Step S201) on the frame buffers 2241, 2243 (or 2242, 2244). (Step S206)

Next, a description is made on the processing when the world Wn is an OBJ world. In this case, the image processing IC 223 refers to OBJ attributes in a group corresponding to the counted value of the counter x in the OAM 2253 (refer to FIG. 8). (Step S113; refer to FIG. 14) Next, the image processing IC 223 reads corresponding character data from the character RAM 2246 on the basis of the character number JCA set in the referred OBJ attributes (refer to FIG. 1 5) and draws the read character data in a predetermined area (an area with the picture drawing starting position defined with JX, JY, JP) on the frame buffers 2241, 2243 (or 2242, 2244). (Step S114) Next, the image processing IC 223 adds 1 to the counted value of the counter x. (Step S115)

Next, processing in the case where the world Wn is an H-bias BG world will be described. In this case, the image processing IC 223 performs picture drawing processing of the H-bias BG on the basis of the attribute information set in the world attributes and the H-bias parameters stored in the area 2255 in the image work memory 225. (Step S116) Details of the subroutine processing of this Step S116 are shown in FIG. 30. Referring to FIG. 30, the image processing IC 223 calculates picture drawing staring positions on the left and right frame buffers (refer to FIG. 9) on the basis of the attribute information GX, GY, GP set in the world attributes. (Step S301) Next, the image processing IC 223 calculates the cut-out starting position of the BG from the BG map on the basis of the attribute information MX, MY, MP set in the world attributes. (Step S302) Next, the image processing IC 223 reads necessary H-bias parameters from the area 2255 in the image work memory 225 on the basis of the attribute information PARAM_BASE set in the world attributes. (Step S303) Next, the image processing IC 223 calculates a cut-out size of the BG from the BG map on the basis of the attribute information W, H set in the world attributes. (Step S304)

Next, the image processing IC 223 re-calculates a read position in the X-axis direction from the BG map on the basis of the H-bias parameters read in Step S303. (Step S305) Here, if the X coordinates referred to when actually reading the source data of the BG map are taken as BGXL, BGXR, the H-bias parameters for the left screen are taken as HOFSTL and the H-bias parameters for the right screen are taken as HOFSTR, then the calculating processing of

BGXL=MX−MP+HOFSTL

BGXR=MX+MP+HOFSTR are performed in Step S305. The H-bias parameters HOFSTL and HOFSTR are 16-bit integers with signs (−512 to 511) indicating the quantity of offset in the X-axis direction. In this embodiment, as offset in each transverse line is possible, it is necessary to have the H-bias parameters for the lines in the horizontal direction of the BG. For example, when opening a full size BG, a parameter table as large as 224×2=448 words must be set in the area of the image work memory 225.

Next, the image processing IC 223 selects a required BG map from the plurality of BG maps in the BGMM 2251 (refer to FIG. 8) on the basis of the attribute information BGMP_BASE set in the world attributes. (Step S306) Next, the image processing IC 223 cuts out BG data (a character number in this stage) from a certain area (the area obtained by the calculations in the Steps S302, S304, S305) on the selected BG map. (Step S307) At this time, the BG data are read from a position shifted from an original read position in the X-axis direction (MX±MP) by the values of HOFSTL, HOFSTR. Next, the image processing IC 223 reads character data corresponding to the cut out character number from the character RAM 2246 (refer to FIG. 9) and performs picture drawing processing in a certain area (an area with a picture drawing starting position calculated in the Step S301) on the frame buffers 2241 and 2243 (or 2242, 2244). (Step S308)

Next, processing in the case in which the world Wn is not an OBJ world, a normal BG world, nor an H-bias BG world, i.e. when it is an affine BG world will be described. In this case, the image processing IC 223 performs picture drawing work of the affine BG on the basis of the various kinds of attribute information set in the world attributes and the affine parameters stored in the area 225 of the image work memory 225. (Step S117) Details in a subroutine processing in this step S117 are shown in FIG. 31. Referring to FIG. 31, the image processing IC 223 calculates picture drawing starting positions on the left and right frame buffers on the basis of the attribute information GX, GY, GP set in the world attributes. (Step S401) Next, the image processing IC 223 reads required affine parameters from the area 2255 of the image work memory 225 on the basis of the attribute information PARAM_BASE set in the world attributes. (Step S402) Next, the image processing IC 223 calculates the display size of the BG from the BG map on the basis of the attribute information W, H set in the world attributes. (Step S403) Next, the image processing IC 223 calculates a cut-out position on the BG map for each one dot on the basis of the read affine parameters. (Step S404) Accordingly, the attribute information MX, MY, MP in the world attributes are not used in this affine BG picture drawing mode.

Next, the image processing IC 223 selects a required BG map from the plurality of BG maps in the BGMM 2251 on the basis of the attribute information BGMAP_BASE set in the world attributes. (Step S405) Next, the image processing IC 223 cuts out BG data (a character number in this stage) from a certain area (the area obtained by the calculation in Step S404) on the selected BG map. (Step S406) Next, the image processing IC 223 reads the character data corresponding to the cut out character number and draws picture in a certain area (the area determined in Step S403, with the picture drawing starting position calculated in Step S401) on the frame buffers 2241, 2243 (or 2242, 2244). (Step S407)

The character data is alternately drawn to the two sets of frame buffers (the set of 2241, 2243 and the set of 2242, 2244). While the character data is drawn to one set, the display image data stored in the other set is read, and provided to the LED units 21 2L and 21 2R through the SAM 2247 and displayed.

As has been stated hereinabove, this embodiment is directed to a dual scanner system (a system which is seen with both eyes), wherein one-dimensional LED arrays 214L, 214R (with LEDs arranged in a vertical column for 224 dots, respectively) are made to emit light at appropriate timing in synchronization with vibration of the mirrors 217L, 217R, which is seen by a player through the mirrors 217L, 217R. Thus, the player sees as if a piece of screen were formed on each side due to the after image effect of the eyes. To make the game stereoscopic, different images with parallax (images with different data on the left and the right) must be displayed on the left and right display systems. However, it is difficult from the point of processing ability to simultaneously transfer different image data to the display systems on both sides with a single image processing IC 223. Also, if different images are displayed at the same time on the left and right display systems, the peak consumption power increases to increase the maximum power consumption. Accordingly, in this embodiment, considering reduction of load on the image processing IC, distribution of the peak power consumption, etc., the display periods on the left and right display systems are shifted from each other so that they do not overlap.

Figure 32:
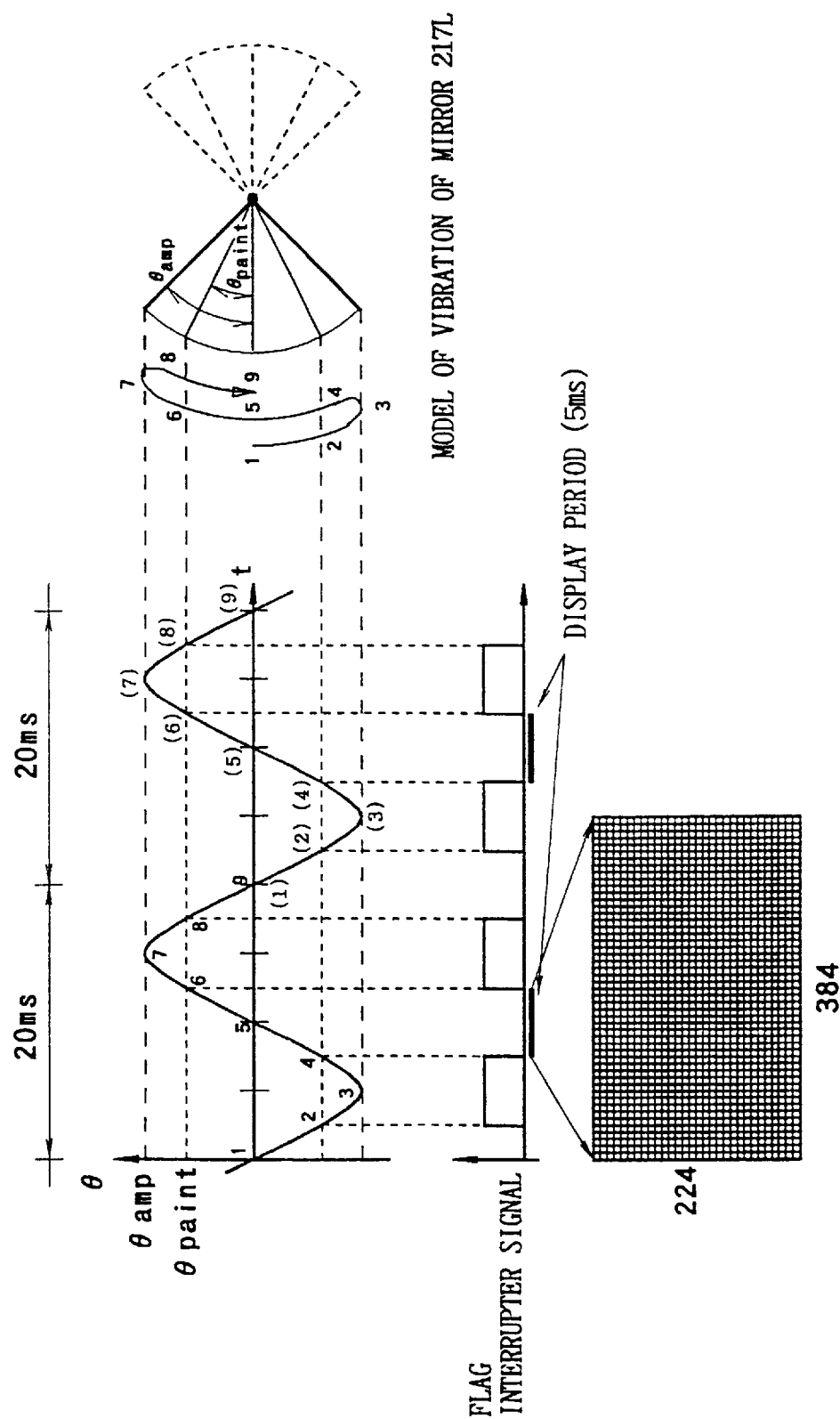
FIG. 32 is a diagram showing the relation between the vibration phase of the mirror and the display timing in the display system on the left side.
Figure 33:
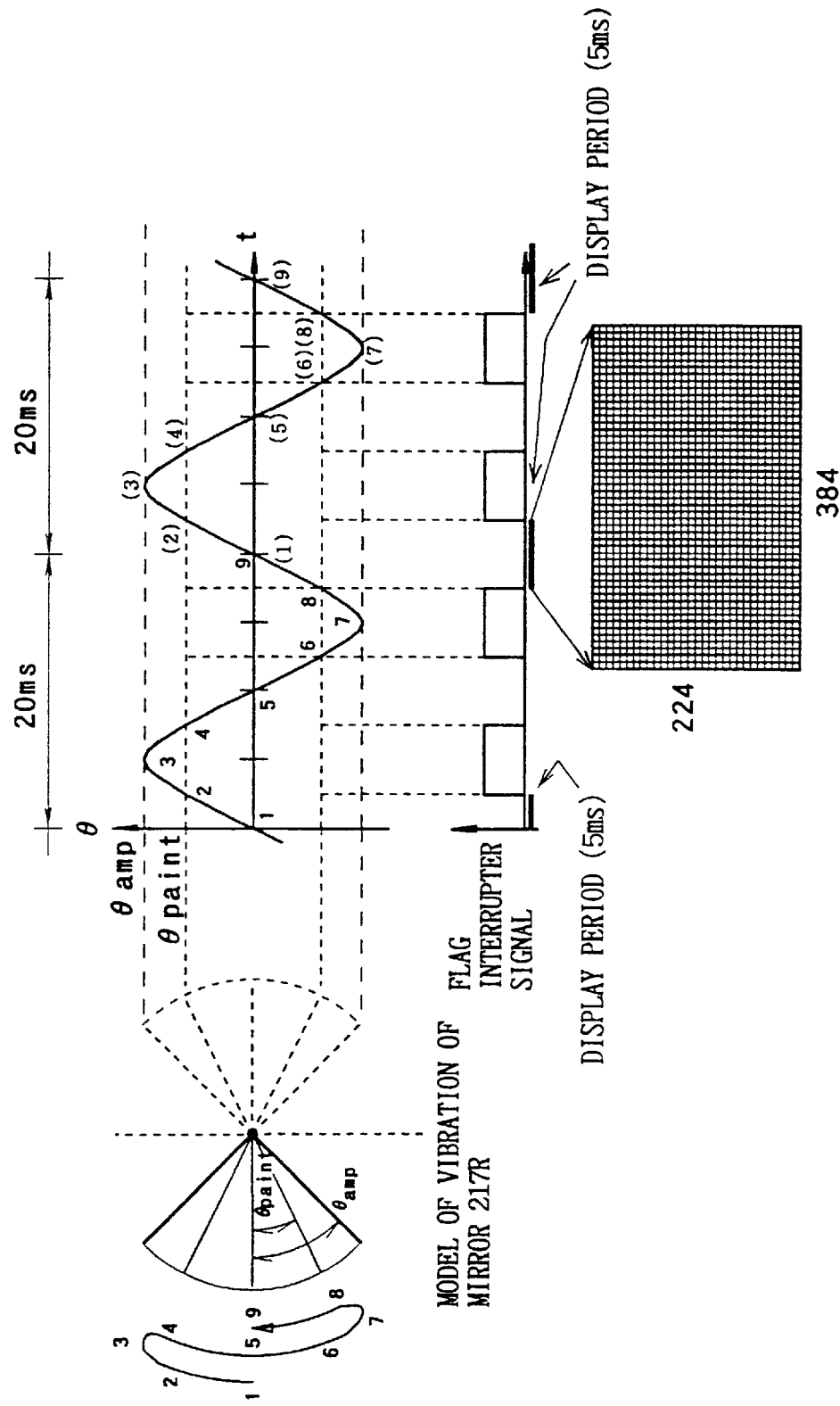
FIG. 33 is a diagram showing the relation between the vibration phase of the mirror and the display timing in the display system on the right side.

FIG. 32 and FIG. 33 show the relation between the vibration phase of the mirror and the display timing in the left and right display systems, respectively. If the vibration frequency of each mirror 217L and 217R is 50 Hz (one period is 20 ms), the abscissa shows a time and the ordinate shows the vibration angle, movements of the mirrors 217L and 217R are sine-wave vibrations shown in FIG. 32 and FIG. 33, respectively. The left and right mirrors vibrate in synchronization with each other, but their phases are shifted by 180° so that the left and right image display periods will not overlap. If one period 20 ms is equally divided into eight, the movement of the mirrors and the sine wave correspond as the numbers 1 to 9 in FIG. 32 and FIG. 33. When it vibrates repeating the movement from 1 to 9, the angular velocity of the mirror is not constant. However, when it moves from 4 to 6, or 8 to (2), the angular velocity is relatively stable. Display by the LED array is made in the period from 4 to 6 in the left display system, and in the period from 8 to (2) in the right display system to lessen distortion in the vicinity of left and right ends of the screen.

The display period corresponds to ¼ of the period, which is about 5 ms. The number of dots of the LED array is 224. As the LED arrays 214L and 214R light 384 times with appropriate timing in the above display period, screens with transverse 384×vertical 224=86016 dots are formed in the left and right display systems. The screen is called an image screen.

Figure 34:
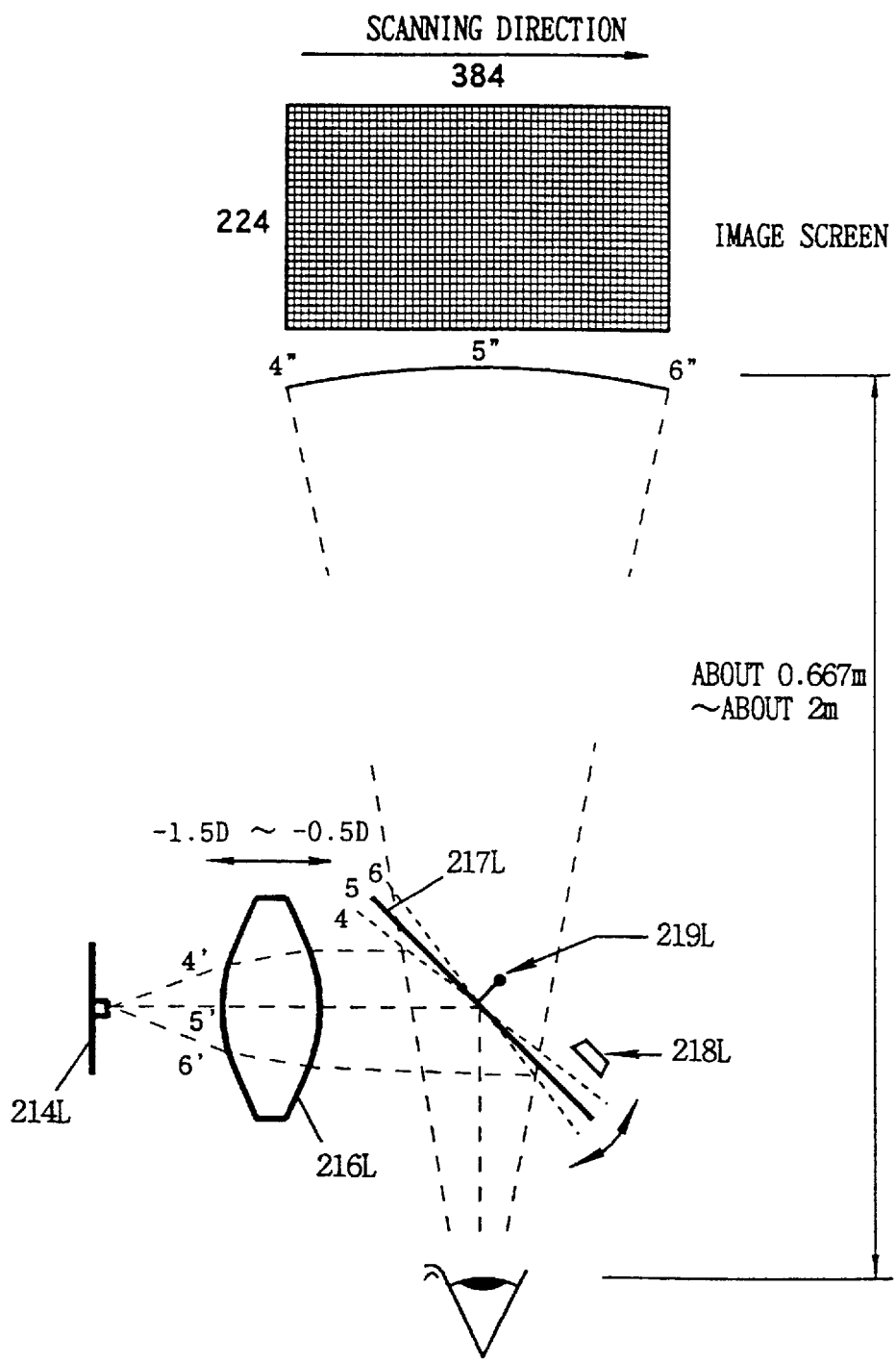
FIG. 34 is a diagram showing a position where the image screen is projected in the display system on the left side.

FIG. 34 shows a position where the image screen is projected in the left display system by way of example. In FIG. 34, numbers 4, 5 and 6 correspond to the position members in FIG. 32. The LED array 214L is turned on when the angular velocity of the mirror 217L is relatively stable, as stated above, so that the image screen will be scanned while the mirror 217L moves form 4 to 6. When the position of the mirror 217L is at 4, the light of the LED array 214L passes through the lens 216L at the position of 4' and draws an image screen at the position of 4". It is the same when the mirror 217L moves to the positions 5, 6, and it draws the image screen at 5", 6". Accordingly, the direction of scanning the screen is from the left to the right. Since human visibility (so called visual acuity) individually differs, it is necessary to move the lens 216L to focus upon the screen. This is referred to as visibility adjustment. Some kinds of positions of the lens for visibility adjustment are prepared. For example, if the lens 216L is moved to the position −1D, the image screen is seen about one meter distant. Although FIG. 34 shows the display system on the left side, it is the same in the display system on the right side, and the scanning direction of the screen is also from the left to the right.

Figure 35:
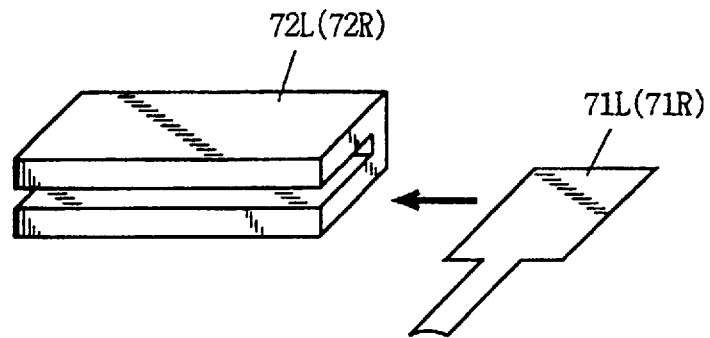
FIG. 35 is a diagram showing a photointerrupter and a flag.

The mirrors 217L, 217R are vibrated by the motor drive/sensor circuits 215L, 215R, respectively. The periods, amplitudes, phase, offset, etc. of the vibration of the mirrors can be detected with signal output from the motor drive/sensor circuits 215L and 215R. This signal is called a flag signal, which is generated by a flag 71L (or 71R) passing through a photointerrupter 72L (or 72R), as shown in FIG. 35. On the basis of the flag signal, the mirror control circuit 211 performs servo control for forming a stable screen (correction, stabilization of vibration of the mirrors) or informs the image processing IC 223 of timing for image display (in FIG. 32, the position of 4 is an image display start timing).

Figure 36:
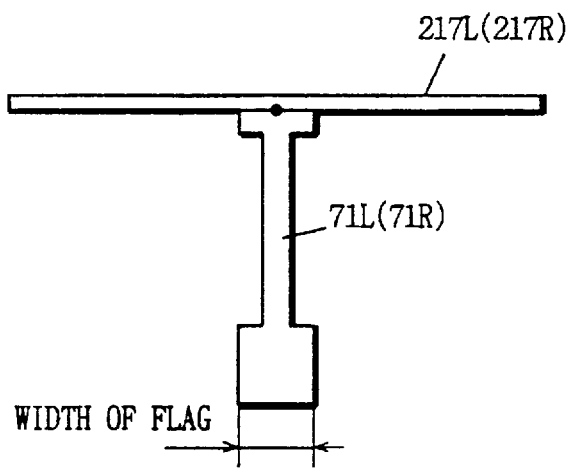
FIG. 36 is a diagram showing the flag attached to the mirror.

As shown in FIG. 36, the flag 71L (or 71R) is a small piece made of resin attached to the mirror 217L (or 217R) for light shielding of the photointerrupter. The width of the flag is selected so that the period in which the flag shields the photointerrupter and the image display period correspond to each other. Thus, the number of vibrations of the mirrors, disorder of the amplitude, offset, phases of the mirrors and the image display start timing can be detected from the output waveform of the photointerrupter.

Figure 37:
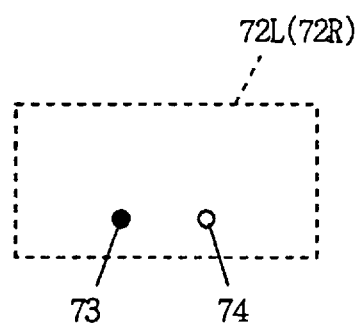
FIG. 37 is a diagram showing two interrupters provided in the photointerrupter.

The photointerrupter 72L (or 72R) has two sets of interrupters 73 and 74 inside, as shown in FIG. 37. Each interrupter includes a set of a light emitting element and a light receiving element disposed to face each other at a certain interval, and passage of the flag between the light emitting element and the light receiving element shields the light receiving element and its output falls from a high level to a low level. Detection output of one interrupter (flag interrupter) 73 is used to detect a position of the flag, and detection output of the other interrupter (direction interrupter) 74 is used to detect a direction of movement of the flag. Accordingly, the space between the interrupters 73 and 74 is selected smaller than the width of the flag.

Figure 38A:
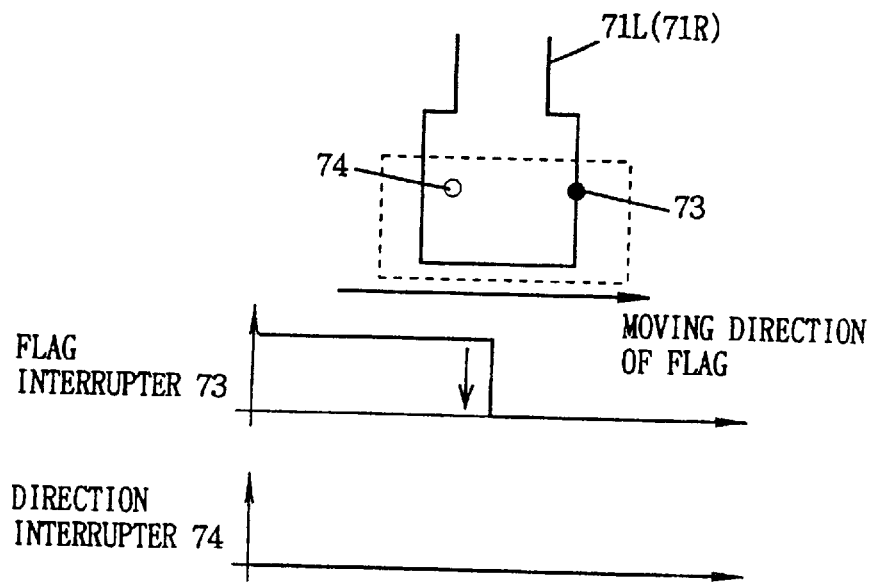
FIG. 38 is a diagram showing the relation between an output state of the photointerrupter and a moving direction of the flag when an output of the flag interrupter falls.
Figure 38B:
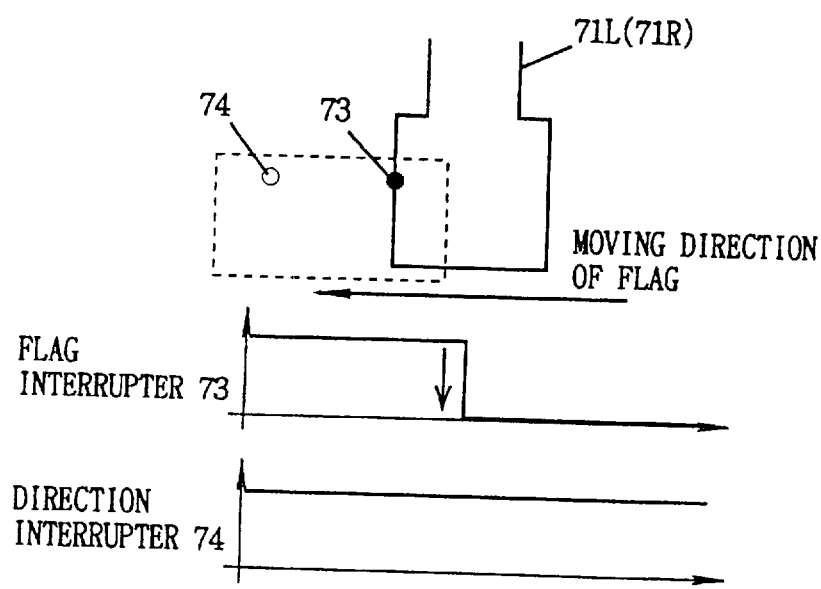
Figure 39A:
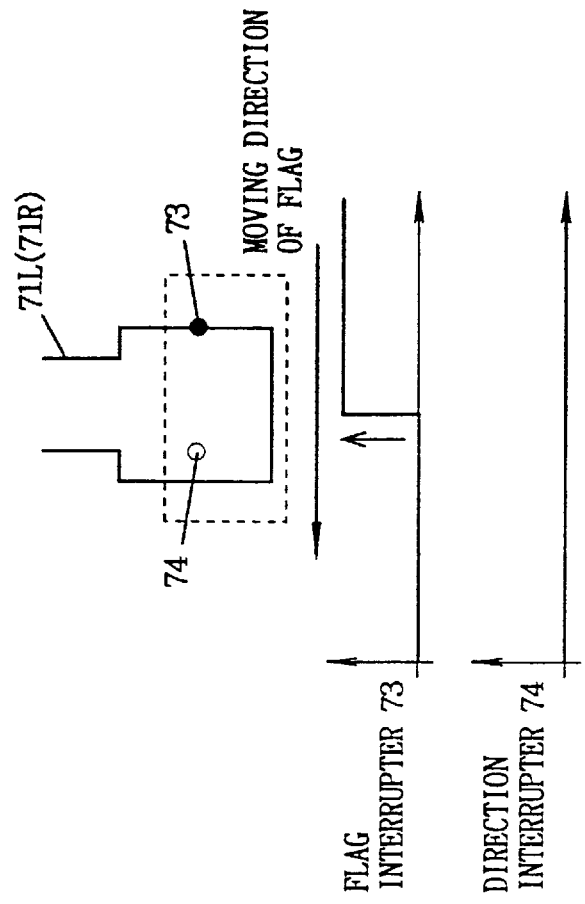
FIG. 39 is a diagram showing the relation between an output state of the photointerrupter and a moving direction of the flag when an output of the flag interrupter rises.
Figure 39B:
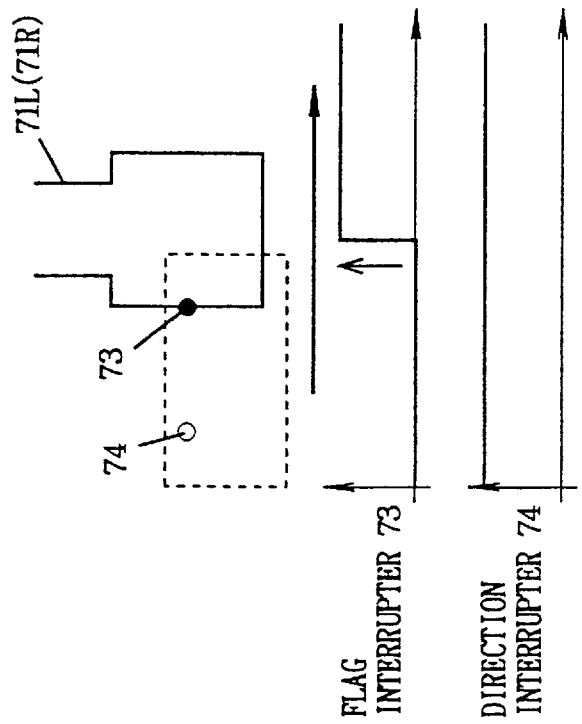

FIG. 38 and FIG. 39 show the relation between the output state of the photointerrupter and the direction of movement of the flag. FIG. 38 shows the direction detection when the output of the flag interrupter 73 falls, and FIG. 39 shows the direction detection when the output of the flag interrupter 73 rises. As shown in FIG. 38(*a*), if the output of the flag interrupter 73 falls when the output of the direction interrupter 74 is at a low level, it is determined that the moving direction of the flag is from the left to the right. As shown in FIG. 38(*b*), if the output of the flag interrupter 73 falls when the output of the direction interrupter 74 is at a high level, it its determined that the moving direction of the flag is from the right to the left. Also, as shown in FIG. 39(*a*), if the output of the flag interrupter 73 rises when the output of the direction interrupter 74 is at a high level, it is determined that the moving direction of the flag is from the left to the right. Further, as shown in FIG. 39(*b*), if the output of the flag interrupter 73 rises when the output of the direction interrupter 74 is at a low level, it is determined that the moving direction of the flag is from the right to the left.

As described above, screen display is made in a period in which the angular velocity of the mirrors is stable in this embodiment. More strictly, however, the angular velocity of the mirrors (scan speed) is not constant even in this period. Therefore, correction is needed.

A vertical line of the image screen is referred to as a column, and there are 384 columns in total. The column width (a space between vertical lines) on the image screen depends on the timing of lighting the LED. FIG. 40 shows a letter "D" displayed in the center and in an end portion on the image screen. If the timing pitch of lighting the LED array is the same in the center and the end on the image screen, it looks as if it were shrunken in the lateral direction in the end portion or, on the other hand, it looks as if it were elongated in the lateral direction in the center. This is due to the fact that the timing of turning on the LED is made with the same timing pitch, though the angular velocity (scan speed) of the mirror at 5 is faster than the angular velocity (scan speed) at 4, 6. That is to say, in FIG. 40, the timing pitch PPC of lighting the LED array in the center of the image screen is equal to the timing pitch PPE in the end portion.

Figure 41:
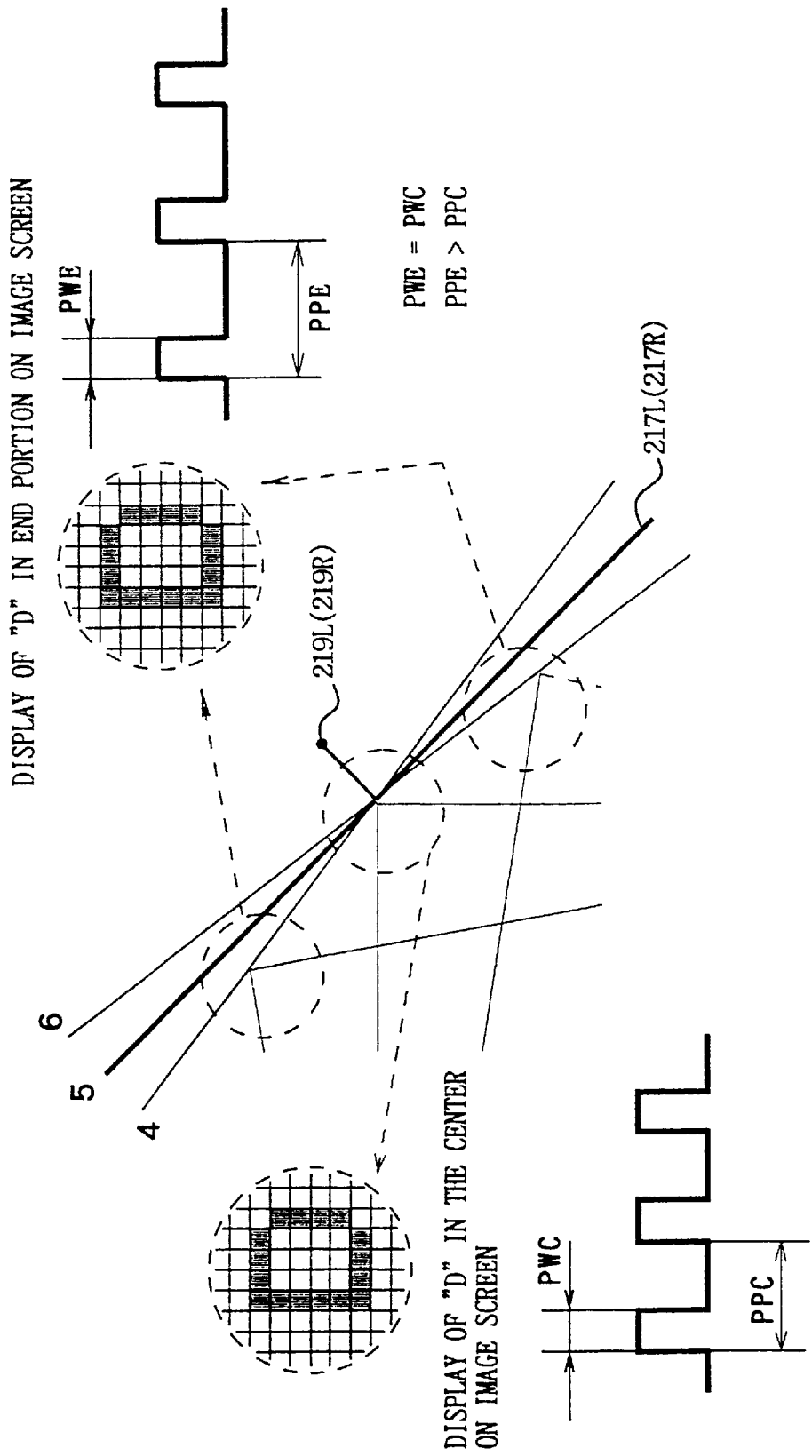
FIG. 41 is a diagram showing a letter "D" displayed in the center and in the end part on the image screen after correction.

It is necessary to change the LED light emitting timing pitch according to the scanning speed to display figures, letters, etc. without distortion with the same column width in the center and in the end portion on the image screen. That is to say, as shown in FIG. 41, correction is needed to make the LED light emitting timing pitch PPC shorter as it is closer to the center of the image screen and to make the timing pitch PPE longer as it gets closer to the end portion. This allows equal scan of widths of respective columns. The LED light emitting pulse width (PWC, PWE) is made constant in the case of the same luminance to make brightness in the end portion and in the center on the image screen uniform.

A table storing timing data for correcting the LED lighting timing pitch is called a column table. This column table is stored in the area 416 of the program memory 41 (refer to FIG. 5), which is transferred to the area 2254 in the image work memory 225 in the body device according to the program when the power is turned on. The image processing IC 223 controls the LED lighting timing referring to the column table developed in the image work memory 225. The start address of the column table is transferred as 8-bit serial data from the mirror control circuit 211 which controls movement of the mirrors.

The column table includes extra timing data for about 68 columns×2, supposing offset of the mirror, or external disorder, as well as the timing data for 384 columns. In this embodiment, the LED lighting timing pitch can be set for every 4 columns. Accordingly, if 4 columns are taken as 1 entry, the number of entries of the column table is 17+96+17=130 (=520 columns).

Figure 42:
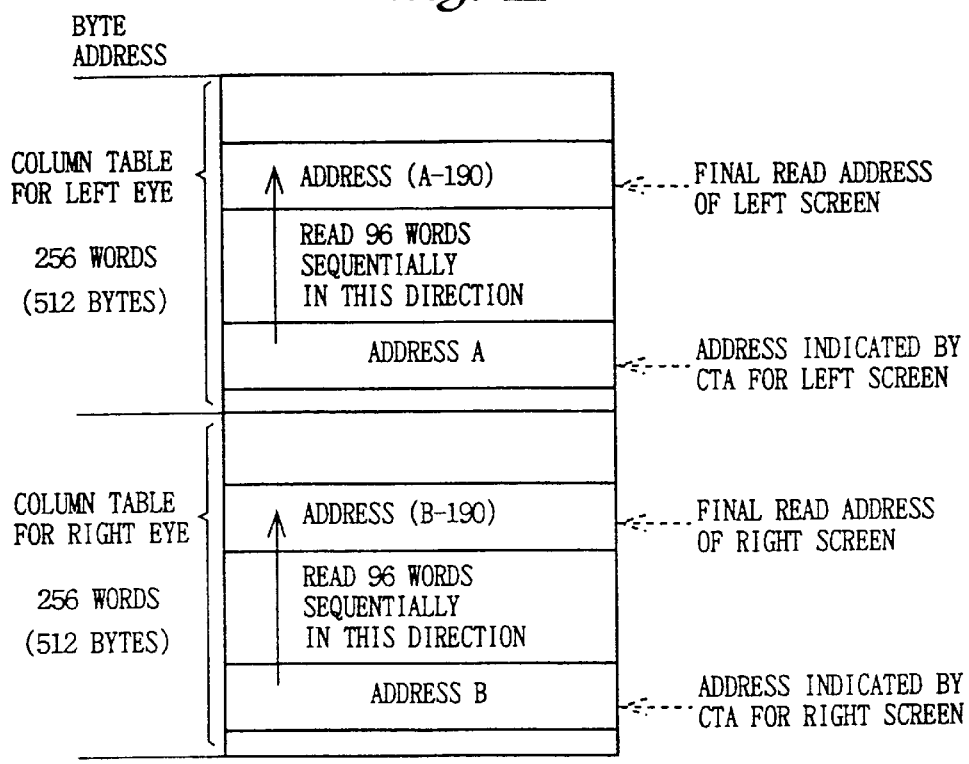
FIG. 42 is a diagram showing arrangement in a column table on the image work memory.
Figure 43:
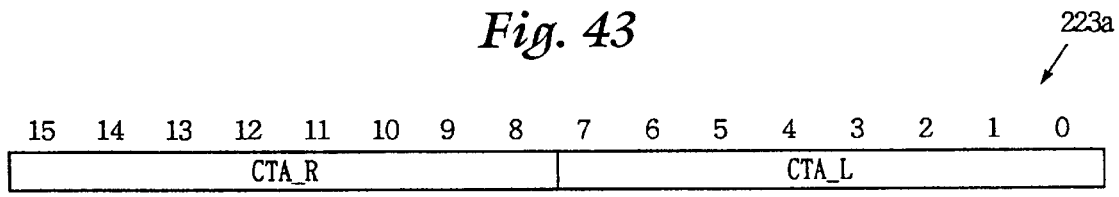
FIG. 43 is a diagram showing a register for storing the column reference start address CTA provided in the image processing IC.
Figure 44:
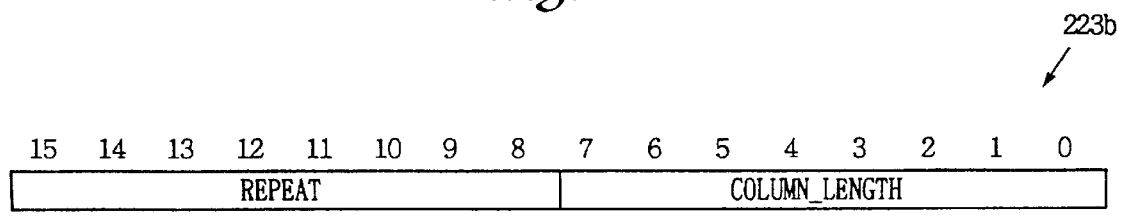
FIG. 44 is a diagram showing a register for storing timing data provided in the image processing IC.

FIG. 42 shows arrangement in the column table on the image work memory 225. As shown in FIG. 42, the column table is allocated on the image work memory 225 as a 512-word data array. The image processing IC 223 receives the column table reference start address CTA from the mirror control circuit 211. This column table reference start address CTA is automatically transferred from the mirror control circuit 211 when display on the left screen is started (when L_SYNC rises) as 8-bit data corresponding to those for the left eye and the right eye. The transferred column table reference start address CTA is set in a register 223*a* in the image processing IC 223 (refer to FIG. 43). In FIG. 43, the CTA_L is a column table reference start address for the left and the CTA_R is a column table reference start address for the right. The image processing IC 223 reads the timing data COLUMN_LENGTH from a corresponding entry in the column table on the basis of the column table reference start address CTA set in the internal register 223*a* and sets it in the internal register 223*b* (refer to FIG. 44). The timing data COLUMN_LENGTH is a numerical value defining one column time with resolution of 200 ns. The reading of the timing data from the column table is made once for 4 columns. It is made 96 (=384/4) times respectively for the left eye and the right eye in one display frame period, 192 times in total.

In FIG. 42, for example, if the timing data is read from the address A in the column table for the left eye (an address indicated by the column table reference start address for the left CTA_L) when starting left screen display, and then, the timing data is read out in the order from addresses (A-2), (A-4), . . . in byte address. As stated above, this reading is made once for 4 column time, 96 (=384/4) times for the left eye and the right eye, respectively, in one display frame period. The final read address for the left screen is the address (A-95×2)=(A-190). Similarly, timing data of the address B-address (B-190) are read from the column table for the right eye.

This embodiment also has a function of special display, such as waving the display screen, by rewriting the timing data in the column table into special data string according to instructions from the game program.

Next, display operation in this embodiment will be described. When the power is turned on into the body device 2 through the controller 6, the CPU 221 activates the game program and transfers the column table stored in the program memory 41 of the program cartridge 4 to the area 2254 in the image work memory 225. Now, if the game has already started, the left and right mirrors 217L and 217R are vibrating with the period of 20 ms in synchronization with the synchronous clock FCLK produced from an internal oscillator (not shown) in the mirror control circuit 211. At this time, the flags 71L and 71R pass in the photointerrupters 72L, 72R (refer to FIG. 35) and then 2-bit flag signals are provided from the photointerrupters 72L and 72R to the motor drive/sensor circuits 215L and 215R, respectively. In the 2-bit flag signal, one bit is an output signal of the flag interrupter 73, and the other bit is an output signal of the direction interrupter 74 (refer to FIG. 37). The motor drive/sensor circuits 215L and 215R shape the waveforms of the provided flag signals and then outputs them to the mirror control circuit 211.

The mirror control circuit 211 determines the moving direction of the flag on the basis of a combination of the logic states of the 2 bits included in the flag signal. (Refer to FIG. 38 and FIG. 39) Further, considering the result of the determination, the mirror control circuit 211 detects timing of starting a display period of the left screen (refer to FIG. 32) and the timing of starting a display period of the right screen (refer to FIG. 33). At this time, the mirror control circuit 211 raises the left display start signal L_SYNC in response to the detection of the timing of starting the display period of the left screen and raises the right display start signal R_SYNC in response to the detection of the timing of starting the display period of the right screen. The mirror control circuit 211 also generates low order 8-bit data CTA (CTA_L and CTA_R) of the column table reference start address in response to the detection of the timing of starting the display period of the left and right screens.

Figure 45:
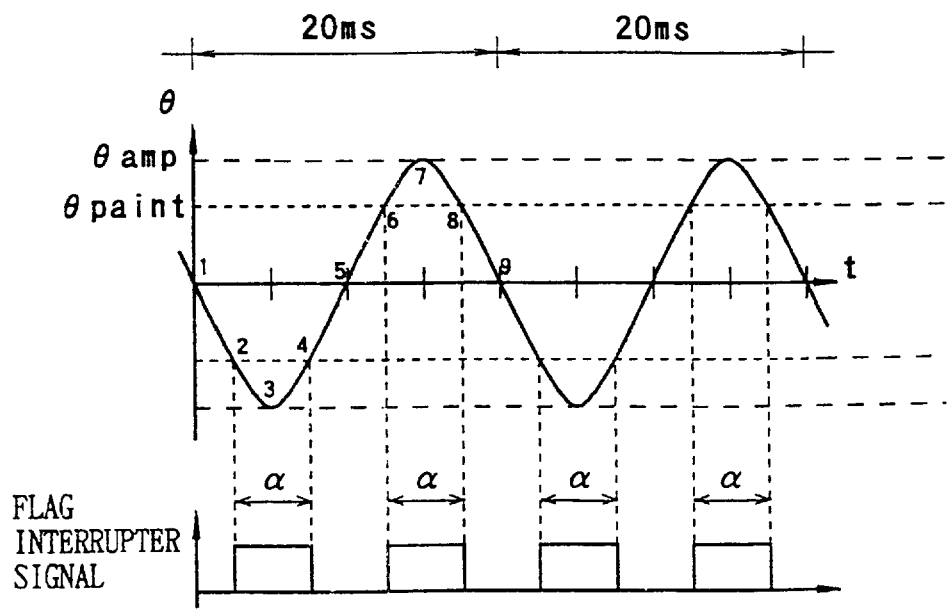
FIG. 45 is a diagram showing the relation between the vibration phase of the mirror and a flag interrupter signal when the mirror has no offset.
Figure 46:
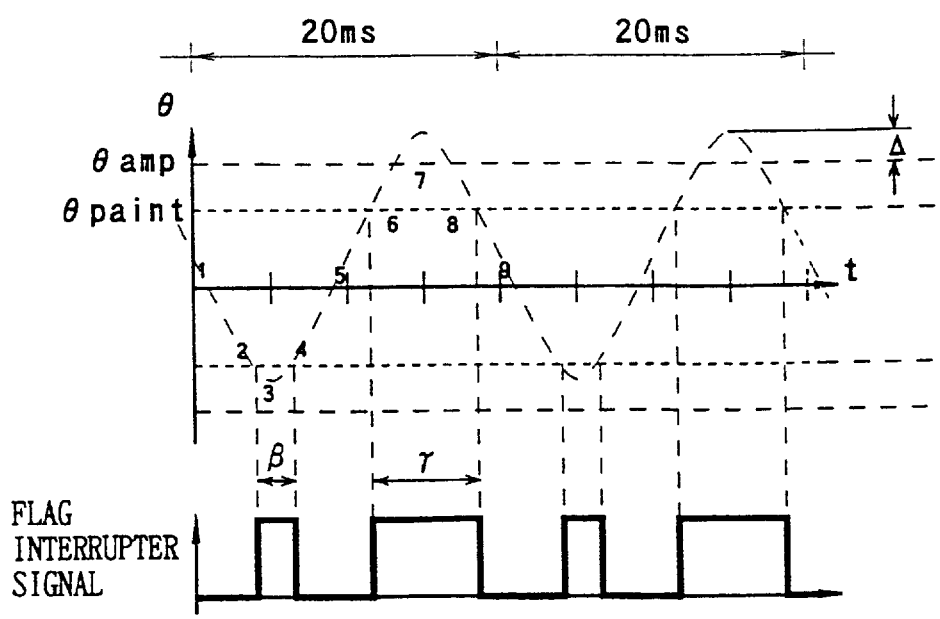
FIG. 46 is a diagram showing the relation between the vibration phase of the mirror and a flag interrupter signal when the mirror has offset.

Now, a method of generating the column table reference start address CTA will be described. FIG. 45 shows the relation between the vibration phase of the mirror without offset and the output signal of the flag interrupter 73 (referred to as a flag interrupter signal, hereinafter). FIG. 46 shows the relation between the vibration phase of the mirror with offset and the flag interrupter signal. The offset of the mirror is caused by errors in assembling, external disorder, (for example, when the game device is used being inclined) ,etc. If the mirror has no offset, the pulse widths a of the high level portions of the flag interrupter signal are equal every time, as shown in FIG. 45. On the other hand, when the mirror has offset, the pulse widths of the high level portions of the flag interrupter signal have different values for the first and last pulse widths (the pulse width β from 2 to 4 and the pulse width y from 6 to 8) in one period (20 ms), as shown in FIG. 46. Here, the ratio of the pulse widths of the high level portions in one period (β/γ) corresponds to the quantity of offset Δ of the mirror. The column table reference start address must be changed in accordance with this quantity of offset Δ. This is due to the fact that the vibration phase (angle range) of the mirror used to display images differs between when the mirror has offset and when it has no offset. Accordingly, the mirror control circuit 211 operates a ratio between pulse widths of the high level portions in the display period immediately before and obtains the column table reference start address CTA on the basis of the result of this operation. Conversion from the ratio of pulse widths into the column table reference start address CTA may be achieved by using a conversion table, or may be achieved by calculation.

The synchronous clock FCLK, the left display start signal L_SYNC and the right display start signal R_SYNC are provided from the mirror control circuit 211 to the image processing IC 223. Further, from the mirror control circuit 211 to the image processing IC 223, after the left display start signal L_SYNC is provided, the column table reference start address for the left, CTA_L, is provided, and then the column table reference start address CTA_R for the right is provided. The image processing IC 223 controls the left and right LED drivers 213L and 213R on the basis of these signals and column table reference start addresses provided from the mirror control circuit 211.

Figure 47:
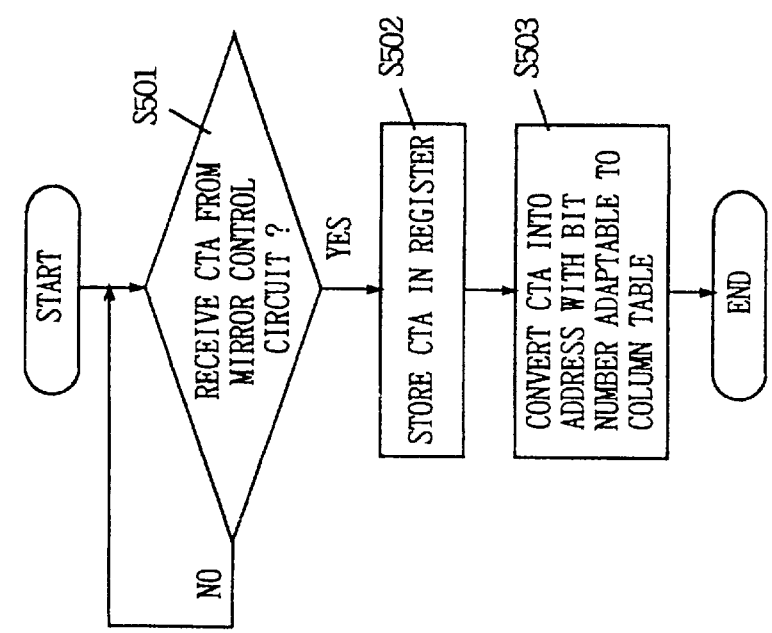
FIG. 47 is a flow chart showing the operation when the image processing IC receives serial data from the mirror control circuit.

FIG. 47 shows operation when the image processing IC 223 receives the serial data from the mirror control circuit 211. Referring to FIG. 47, receiving each 8-bit serial data, i.e. the column table reference start addresses CTA_L and CTA_R from the mirror control circuit 211 (Step S501), the image processing IC 223 stores the column table reference start addresses CTA_L and CTA_R into predetermined areas in the register 223a (refer to FIG. 43), respectively. (Step S502) Next, the image processing IC 223 adds a predetermined number of offset bits to the column table reference start address CTA_L or CTA_R stored in the register 223a to convert the column table reference start address CTA_L or CTA_R into an address with the number of bits adaptable to the addressing of the column table. (Step S503)

Figure 48:
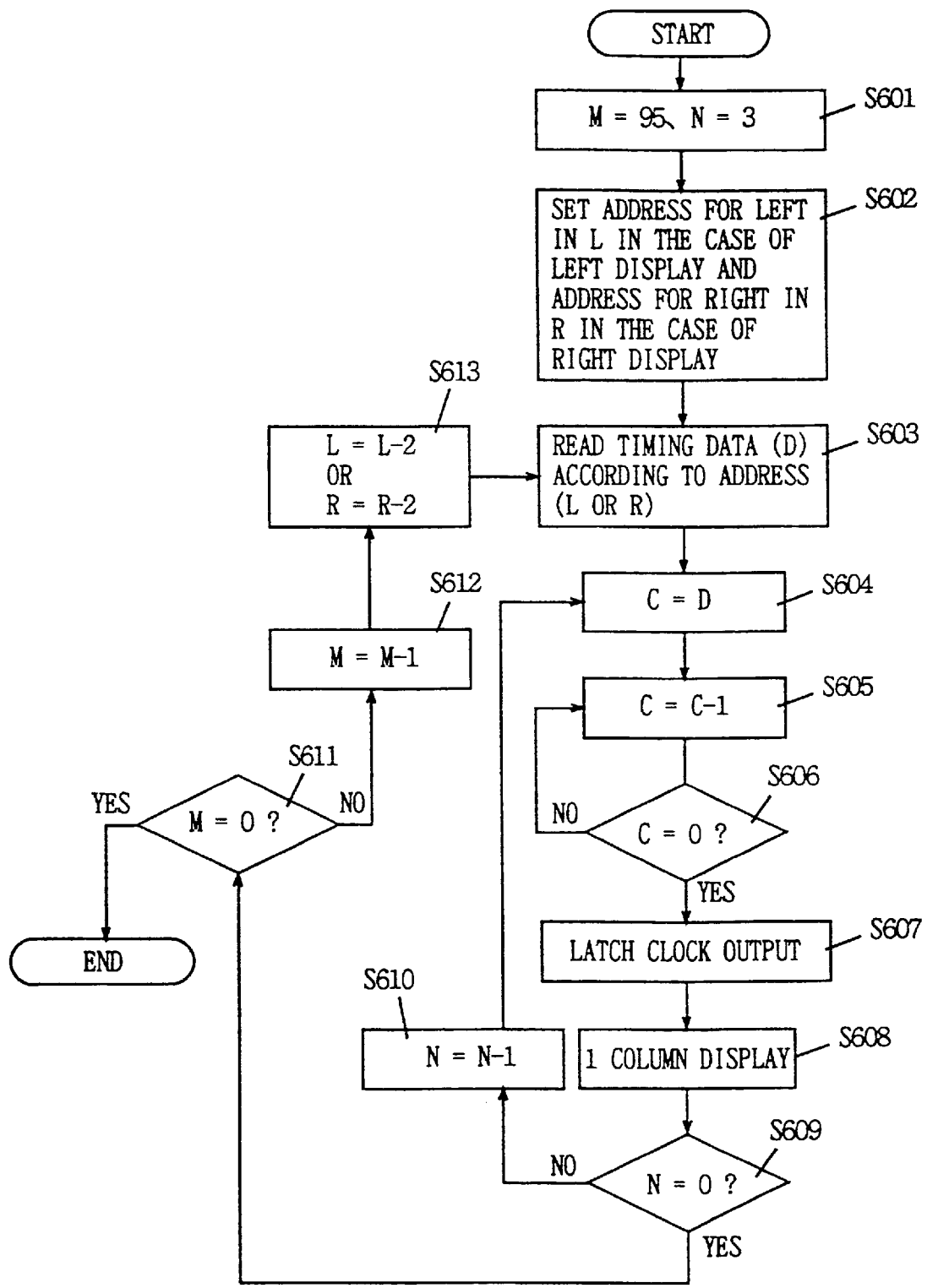
FIG. 48 is a flow chart showing the operation when the image processing IC reads timing data from the column table and displays image data.

The image processing IC 223 starts reading the timing data from the column table according to the column table reference start address for the left or the right obtained in the step S503. FIG. 48 shows the operation when the image processing IC 223 reads the timing data from the column table. Referring to FIG. 48, the image processing IC 223 first sets initial values in the counters M and N. (Step S601) The counter M is a counter for counting columns of 384 on the screen for every 4 columns, and the initial value set therein is 95. This initial value 95 is based on 384/4=96. The counter N is a counter for counting four columns corresponding to one count value of the counter M, and the initial value set therein is 3. Next, the image processing IC 223 sets the column table reference start address for the left or the right obtained in the Step S503 into an internal register L or R (not shown). (Step S602) That is to say, the image processing IC 223 sets the column table reference start address for the left into the register L when displaying a left image (when the left display start signal L_SYNC rises) and sets the column table reference start address for the right into the register R when displaying a right image (when the right display start signal R_SYNC rises).

Next, the image processing IC 223 reads timing data D from a corresponding address in the column table (stored in the area 2254 in the image work memory 225) according to the column table reference start address set in the register L or R. (Step S603) Next, the image processing IC 223 sets the read timing data D into a down counter C. (Step S604) Next, the image processing IC 223 decrements the down counter C by 1. (Step S605) Decrement of the down counter C is made periodically, which is made every 200 ns in this embodiment. When the count value of the down counter C becomes 0 by decremented, i.e. when a carry signal is outputted from the down counter C, the image processing IC 223 outputs a latch clock. (Step S607) This latch clock is provided to the LED driver 212L or 212R.

Figure 49:
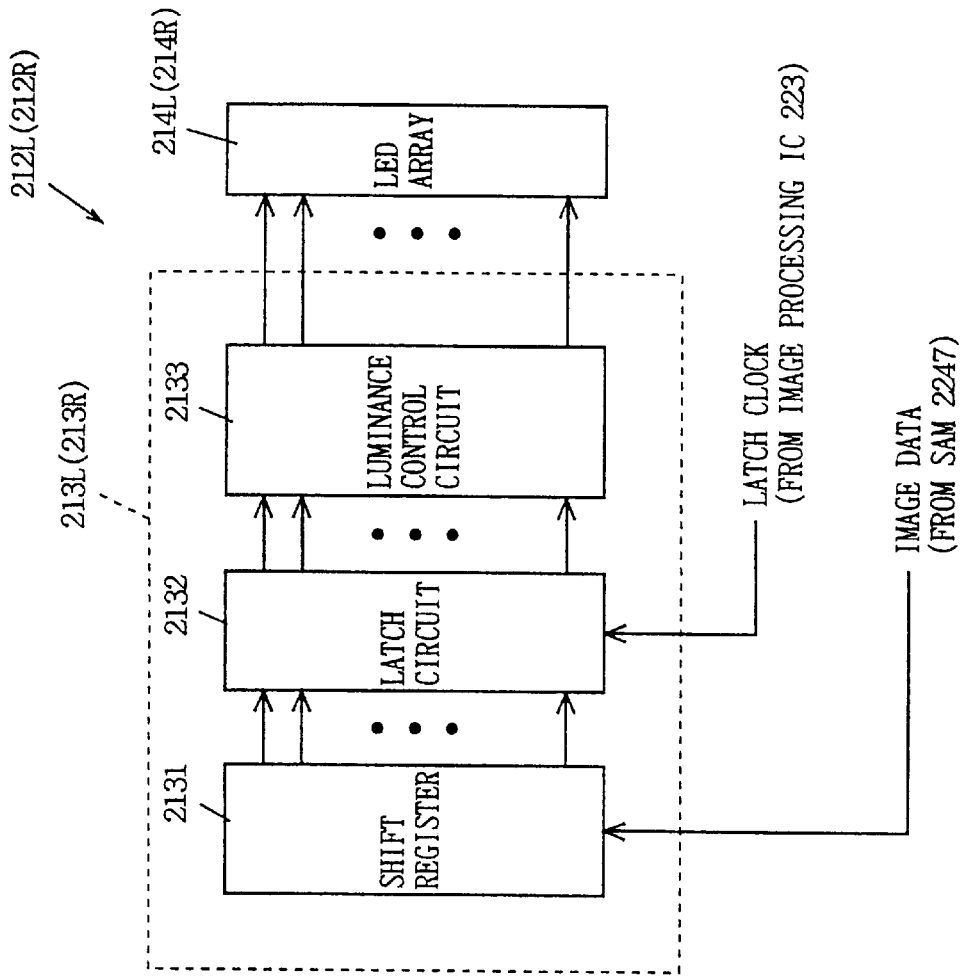
FIG. 49 is a block diagram showing more detailed structure of the LED unit.

Now, the LED drivers 212L and 212R include a shift register 2131, a latch circuit 2132 and a luminance control circuit 2133, as shown in FIG. 49. The shift register 2131 can accumulate image data transferred from the SAM 2247 (refer to FIG. 9) for one column (for 224 dots; 224×2=448 bits). The latch circuit 2132 latches the accumulated data of the shift register 2131 in response to the latch clock from the image processing IC 223. The luminance control circuit 2133 controls ON and OFF and luminance of each LED in the LED array 214L or 214R on the basis of the image data latched in the latch circuit 2132.

The latch clock from the image processing IC 223 is provided to the LED driver 212L or 212R, and then the image data for 1 column accumulated in the shift register 2131 is latched in the latch circuit 2132 and the LED array 214L or 214R is turned on by the luminance control circuit 2133. As a result, display for vertical one column is made on the left or right screen. (Step S608) At this time, the image processing IC 223 causes image data for the next column to be transferred from the SAM 2247 to the shift register 2131.

By the way, in this embodiment, 2-bit data is used for 1 dot for image display, so that gradation representation at only 4 levels are originally possible. In this embodiment, however, by enabling the correspondence relation between the digital values represented by 2-bit data and luminance of each LED (lighting period) to be freely changed according to instructions on the game program, the number of gradations substantially representable can be increased considerably. For example, if the luminance of the LED is adjustable in the range from 0 to 30, the luminance control circuit 2133 makes the luminance value 0 (off the LED) when the 2-bit digital value is "00", makes the luminance value 1–10 when it is "01", makes the luminance value 11–20 when it is "10", and makes the luminance value 21–30 when it is "11". Instructions for setting the correspondence relation between each digital value "01", "10", "11" and the luminance value of the LED are described on the game program. The CPU 221 changes the luminance value set in a register (not shown) in the image processing IC 223 in a time series manner according to the instructions from the game program. In this embodiment, the correspondence relation can be changed for every 4 columns. As a result, although the representable number of gradations is 4 in the range of 4 columns, the number of representable gradations considerably increases in the entire screen. In this embodiment, the correspondence relation can be changed also screen by screen. This increases the number of usable gradations between different screen images. As is clear from the description above, the number of representable gradations increases according to the speed of the clock signal for turning on/off the LED in this embodiment. As a result, a wide variety of gradation representation is enabled with a less amount data.

Next, the image processing IC 223 determines whether the count value of the counter N is 0 or not. (Step S609). If the count value of the counter N is not 0, as display of image data for 4 columns has not been finished, the image processing IC 223 decrements the counter N by 1. (Step S610) Then, the image processing IC 223 repeats the operations in Steps S604 to S610. When display of image data for 4 columns has been finished and the count value of the counter N becomes 0, the image processing IC 223 determines whether the count value of the counter M is 0 or not. (Step S611) If the count value of the counter M is not 0, as display of image data for one screen has not been finished, the image processing IC 223 decrements the counter M by 1. (Step S612) Next, the image processing IC 223 decrements the column reference start address for the left or the right stored in the register L or R by 2 addresses in byte address. (Step S613) Thus, timing data for the next column in the column table becomes an object of reading. Subsequently, the image processing IC 223 repeats the operations in the Steps S603 to S613. When display for one screen is finished, the count value of the counter M becomes 0 and the image processing IC 223 finishes reading timing data from the column table.

Figure 50:
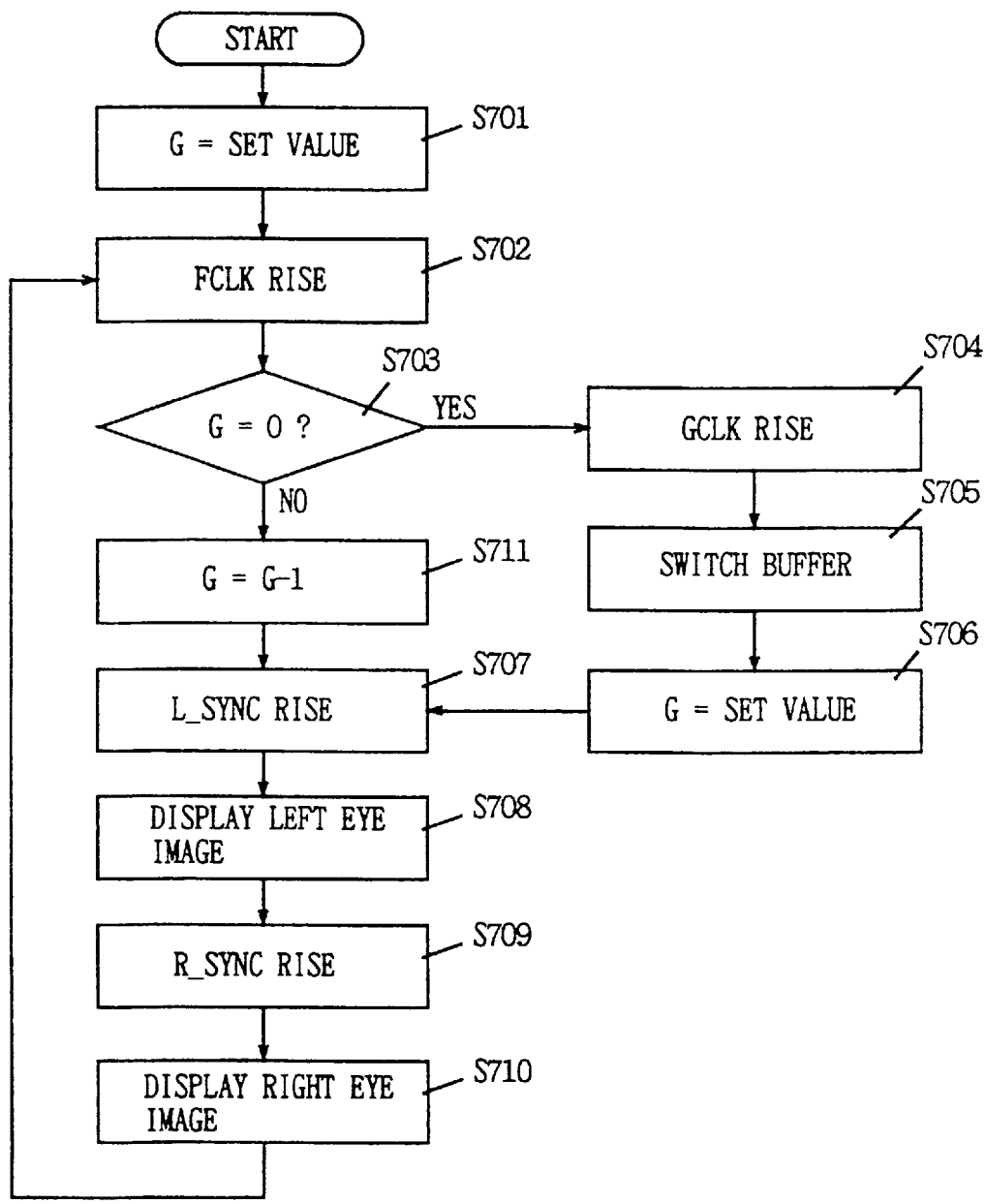
FIG. 50 is a flow chart showing the operation of the entire display system.

Next, referring to the flow chart in FIG. 50, and the timing charts in FIG. 51 and FIG. 52, operation of the entire display system will be described. First, the image processing IC 223 sets an initial value in the counter G. (Step S701 in FIG. 50) The set value in the counter G corresponds to the number of display frames included in one game frame. At the initial setting, a value determined in correspondence with the initial screen (0, for example) is set in the counter G. Next, the synchronous clock FCLK from the mirror control circuit 211 rises. (Step S702) Accordingly, the image processing IC 223 determines whether the count value of the counter G is 0 or not. (Step S703) Now, if the count value of the counter G is 0, the image processing IC 223 raises the game clock GCLK. (Step S704) Next, the image processing IC 223 switches a frame buffer subject to display. (Step S705) For example, if the frame buffers 2241, 2243 were selected and image data accumulated therein were transferred to the image display unit 21 and displayed in the previous time, the image processing IC 223 selects the frame buffers 2242, 2244 as objects of display in this time. Conversely, if the frame buffers 2242, 2244 were selected as objects of display in the previous time, the image processing IC 223 selects the frame buffers 2241, 2243 as objects of display this time. First, frame buffers determined by default (the frame buffers 2241, 2243, for example) are selected. Next, the image processing IC 223 sets a certain value in the counter G. (Step S706) Usually, 0 is set in the counter G. When picture drawing work with heavy load is made in the next game frame, a value of 1 or above is set in the counter G according to the degree of the load. The determination as to whether the load of picture drawing is heavy or not depends on the game program, and it follows instructions from the CPU 221.

Next, the left display start signal L_SYNC from the mirror control circuit 211 rises. (Step S707) Then, the image processing IC 223 performs display processing for the left eye image. (Step S708) That is to say, the image processing IC 223 reads the column table reference start address CTA_L for the left transmitted from the mirror control circuit 211 (refer to FIG. 47), and reads timing data in order from a corresponding address in the column table. (Refer to FIG. 48) At this time, latch pulse is outputted from the image processing IC 223 at time intervals defined by each read timing data. Accordingly, the width of each column displayed in the LED unit 212L is changed according to the timing data described in the column table and correction is made so that each column has a uniform width. In this embodiment, however, correction of the column width is made for every 4 columns to reduce the load on processing by the image processing IC 223. Next, the right display start signal R_SYNC from the mirror control circuit 211 rises (Step S709), and then display processing for the right eye image is performed by the image processing IC 223. (Step S710) In this display processing of the image for the right eye, almost the same processing as the display processing of the image for the left eye in Step S708 is performed.

Figure 51:
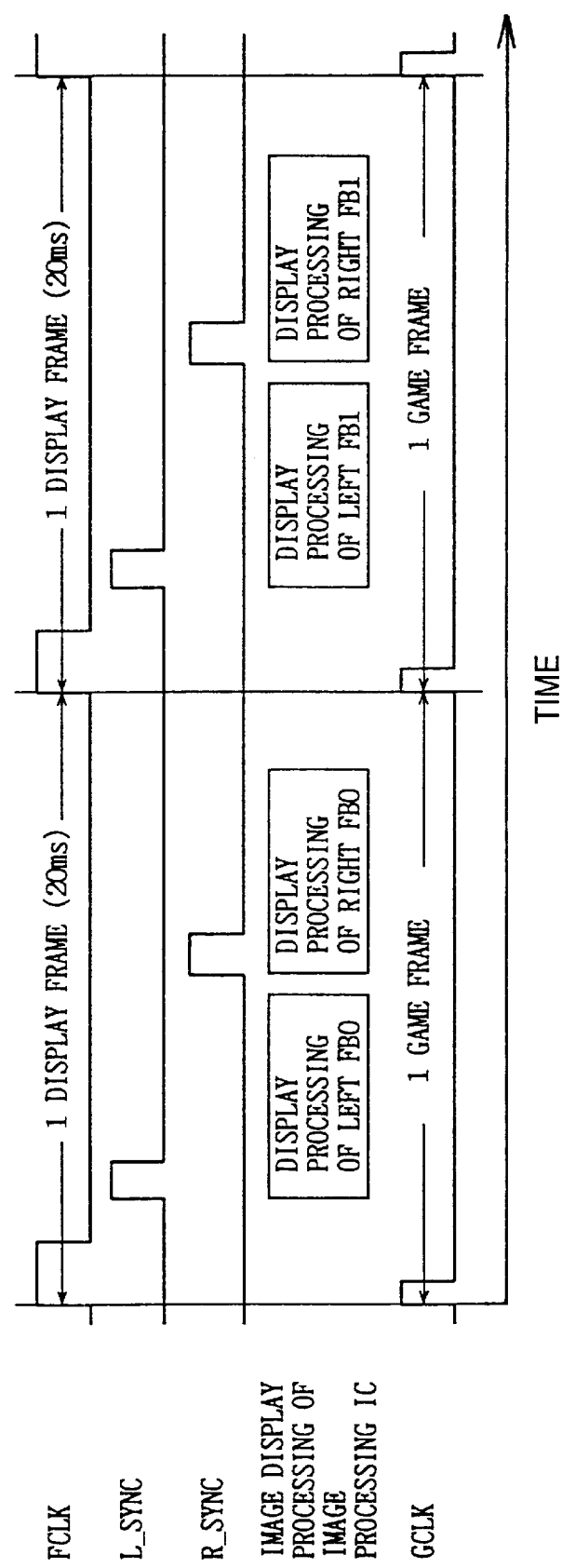
FIG. 51 is a timing chart showing the operation of the entire display system when one display frame is included in one game frame.
Figure 52:
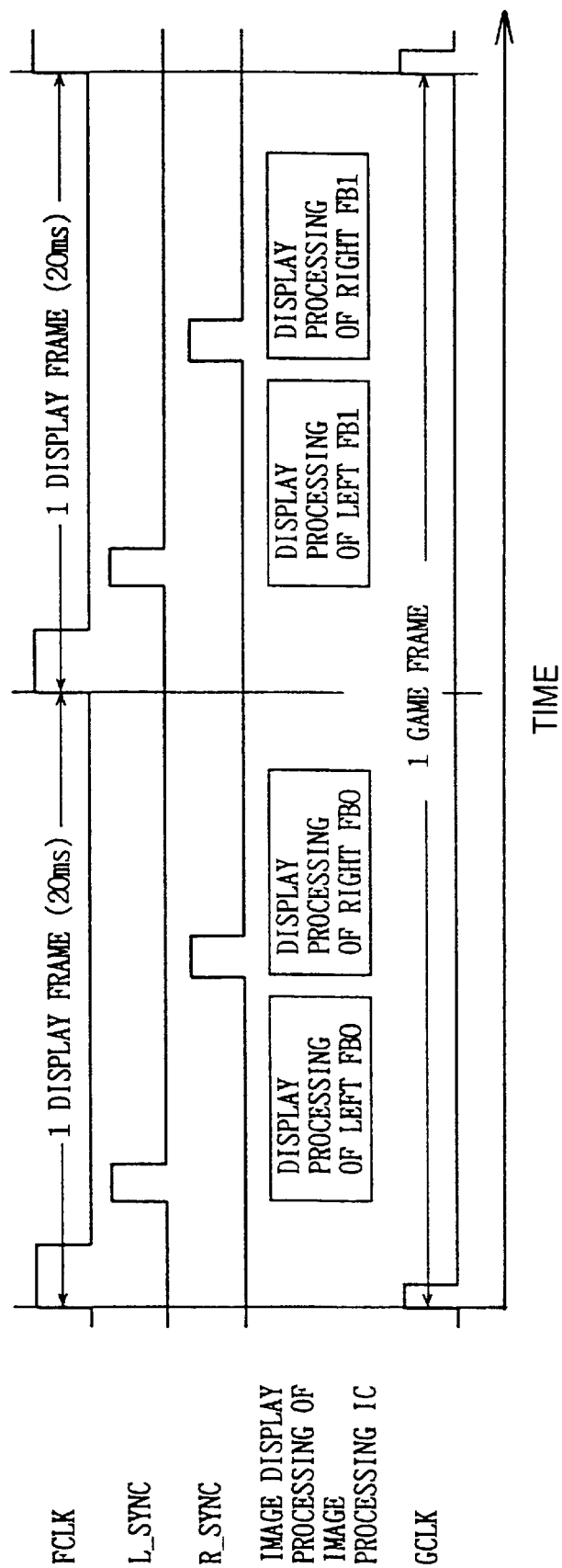
FIG. 52 is a timing chart showing the operation of the entire display system when a plurality of display frames are included in one game frame.

As is clear from the description above, also as shown in FIG. 51, the display processing for the left eye image and the display processing for the right eye image are performed while being shifted in time in one display frame. Therefore, the load on the image processing IC 223 is reduced. Also, the peak power consumption is distributed and the maximum power consumption is reduced. Hence, as permission ability for current and voltage can be set low, designing is easy and the cost can be reduced.

Subsequently, the image processing IC 223 returns to the operation in the Step S702. When the next display frame comes and the synchronous clock FCLK rises (Step S702), the image processing IC 223 determines whether the count value of the counter G is 0 or not. (Step S703) If the count value of the counter G is 0, the image processing IC 223 performs the operations in and after the Step S704 again. On the other hand, if the count value of the counter G is not 0, the image processing IC 223 decrements the counter G by 1. (Step S711) Subsequently, the image processing IC 223 repeats the operations in and after the Step S707. At this time, as the frame buffer which is an object to display is not switched, the same picture as the previous time is displayed in the left and right display systems. That is to say, in this embodiment, as shown in FIG. 52, if a plurality of display frames are included in one game frame (defined by the game clock GCLK), the same picture is displayed in respective display frames. This is due to the fact that the picture drawing processing by the image processing IC 223 may not finish in one display frame when drawing an image with heavy load (with a large amount of data), as stated hereinbefore. Subsequently, the image processing IC 223 circulatively repeats the operations in Steps S702–S711.

Now, in this embodiment, the CPU 221 can rewrite the column table in the image work memory 225 in the course of the game in accordance with instructions from the game program. This enables display of a special picture, such as waving, in the image display unit 21. Data for rewriting the column table may be stored in the program memory in advance, or the CPU 221 may rewrite the data in the column table by calculation on the basis of calculation expressions provided on the game program. In this way, in this embodiment, it is possible to process a picture into a special picture according to instructions from the game soft while using usual picture data as they are, so that the variation of representable pictures can be increased without increasing the amount of data.

Figure 53:
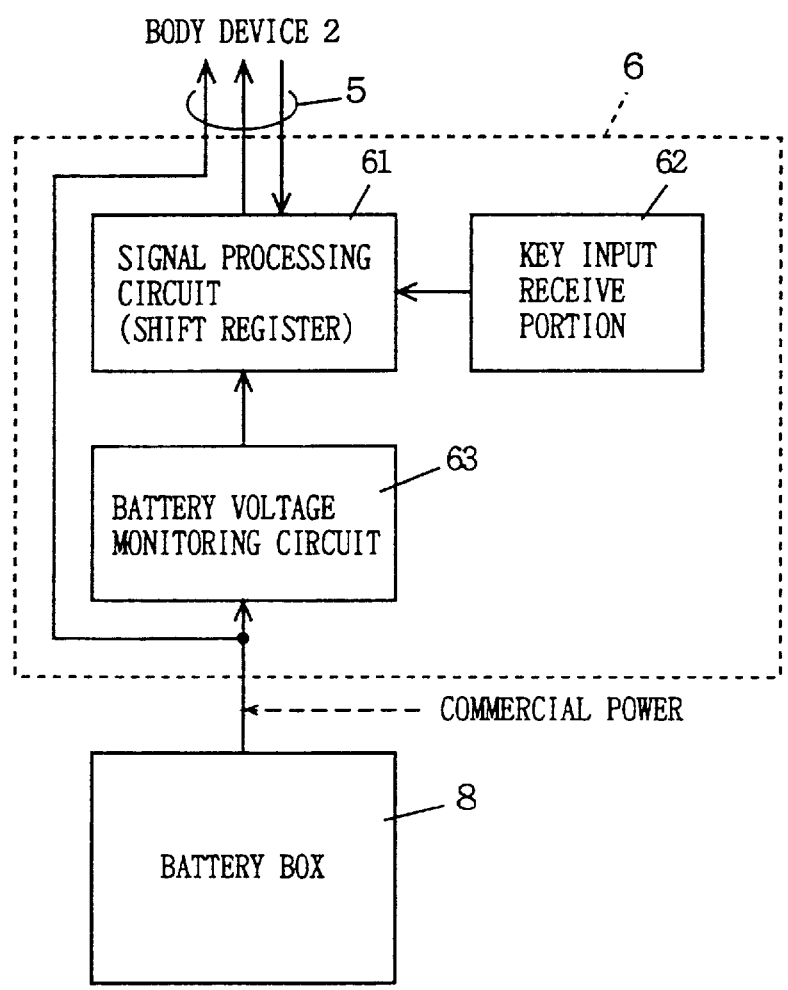
FIG. 53 is a block diagram showing an example of structure of a controller having a power-supply voltage monitoring function.

FIG. 53 shows one example of structure in which the controller 6 has a voltage monitoring function. In FIG. 53, the controller 6 includes a signal processing circuit 61 formed of shift register, a key input receiving portion 62, and a battery voltage monitoring circuit 63. The controller 6 includes a plurality of keys operated by a player, and the key input portion 62 produces key operation signals in correspondence with the operation of these keys. The signal processing circuit 61 captures the key operation signals for respective keys accepted at the key input receiving portion 62 when an instruction for reading the key input is provided from the CPU 221 in the body device 2, and outputs the signals serially to the CPU 221. The power-supply voltage monitoring circuit 63 always monitors reduction of output voltage of the battery box 8, and activates a 1-bit warning signal (to a high level, for example) when the value of the output voltage decreases to a predetermined value or lower. This warning signal is provided to the signal processing circuit 61. The signal processing circuit 61 outputs the provided warning signal to the CPU 221 together with the key operation signals. The CPU 221 performs certain warning operation when the warning signal from the controller 6 attains an active state. For example, it displays a message or a figure for prompting exchange of a battery on the screen. Also, it generates warning for prompting exchange of a battery from a speaker 228. Or, an indicator for warning may be provided in the body device 2, which will emit light or may be driven.

Although the above embodiment has been described as an electronic game device, the image display device of the present invention is not restricted to the same, but can widely be applied to devices with display, such as training devices, educational equipments, guiding devices, etc.

Although the embodiment above is constructed as a device displaying stereoscopic images provided with parallax, the present invention is also applicable to devices for displaying two-dimensional (planar) images without parallax.

Further, in the embodiment above, since the display unit is disposed in the vicinity of both eyes of a player, only one player can enjoy the displayed image. Accordingly, left and right image data read from the image memory 224 may be provided to and displayed in a television receiver or a projector so that a plurality of people can enjoy it. In this embodiment, however, since the image data is read from the image memory 224 in the vertical direction, it can not be intactly displayed in a television receiver or a projector. Accordingly, the image data read from the image memory 224 may be stored once in a frame buffer (not shown) and provided to a television receiver or a projector with its read direction changed from the vertical direction into the transverse direction. It is also necessary to convert the 2-bit digital value of each dot into a difference in intensity of television signals. A circuit for converting the image data read from the image memory 224 into signals displayable on a television receiver or a projector may be provided inside the body device 2, or may be connected between the electronic game device 1 and a television receiver or a projector, or may be provided inside the television receiver or the projector.

As stated above, when displaying left and right images in a television receiver or a projector, stereoscopic vision is enabled by displaying the left and right images at shifted timings, or displaying with different colors, or by displaying with differed polarization angles. When displaying with shifted timings, a player will watch the left and right images while wearing glasses with a shutter mechanism (a liquid crystal shutter, for example). In this case, in the glasses, left and right lenses perform ON/OFF operation alternately in synchronization with the timing of switching left and right images on the television receiver. When displaying with different colors on the left and right images, the player will wear glasses with color filters. In this case, the glasses will be equipped with a color filter which transmits only the left image on the left lens, and a color filter which transmits only the right image on the right lens. When displaying with changed polarization angles of left and right images, a player will wear glasses with a polarization filter. In this case, the glasses are equipped with a polarization filter which transmits only the left image on the left lens and a polarization filter which transmits only the right image on the right lens.

While the invention has been described in detail, the foregoing description is in all aspects illustrative and not restrictive. It is understood that numerous other modifications and variations can be devised without departing from the scope of the invention.

I claim:

1. An image display device for displaying an image on the basis of stored program data and image data, comprising:

an image display unit including a light emitting element array in which a plurality of light emitting elements are regularly arranged along a first direction, a mirror for reflecting light emitted from said light emitting element array so that it can be visually recognized by an eye of a user and for reciprocatively moving at high speed in a certain range to project a planar image in a second direction almost perpendicular to said first direction, and a mirror driving circuit for causing said mirror to reciprocatively move;

program data storage locations for storing said program data;

image data storage locations for storing said image data;

a display image processor for producing display data corresponding to an image to be displayed by said image display unit on the basis of the program data stored in said program data storage locations and the image data stored in said image data storage locations;

display data storage locations for temporarily storing the display data provided from said display image processor;

timing data storage locations for writably/readably storing timing data related to intervals of light emission of said light emitting element array;

an information processor which operates on the basis of the program data stored in said program data storage locations to cause said timing data storage locations to store arbitrary timing data for changing the displayed dot width prior to displaying an image; and a light emission driving circuit for causing said light emitting element array to emit light on the basis of the timing data stored in said timing data storage locations and the display data stored in said display data storage locations to thereby control the displayed dot width as a function of said timing data.

2. An image display system including an image display device body for displaying an image on the basis of stored program data and image data and an external memory attachably/detachable connected to the image display device body, wherein said image display device body comprises;

an image display unit including a light emitting element array in which a plurality of light emitting elements are regularly arranged along a first direction, a mirror for reflecting light emitted from said light emitting element array so that it can be visually recognized by an eye of a user and for reciprocatively moving at high speed in a certain range to project a planar image in a second direction almost perpendicular to said first direction, and a mirror driving circuit for causing said mirror to reciprocatively move, said external memory comprising;

program data storage locations for storing said program data;

image data storage locations for storing said image data, and first timing data storage locations for storing timing data related to intervals of light emission of said light emitting element array, and said image display device body further comprises;

an image processor producing display data corresponding to an image to be displayed by said image display unit on the basis of the program data stored in said program data storage locations and the image data stored in said image data storage locations;

display data storage locations for temporarily storing the display data provided from said image processor;

second timing data storage locations for writably/readably storing timing data related to intervals of light emission of said light emitting element array;

an information processor which operates on the basis of the program data stored in said program data storage locations to read said timing data from said first timing data storage locations and cause said second timing data storage location to store the timing data prior to displaying an image; and a light emission driving circuit for causing said light emitting element array to emit light on the basis of the timing data stored in said second timing data storage locations and the display data stored in said display data storage locations.

3. The image display system according to claim 2, wherein one image display unit is provided for the left eye and one image display unit is provided for the right eye.

4. The image display system according to claim 3, wherein said image display unit for the left eye and said image display unit for the right eye display a stereoscopic image with parallax.

5. The image display system according to claim 2, wherein said light emission driving circuits causes the respective light emitting element arrays to emit light so that said image display unit for the left eye and said image display unit for the right eye display an image with timing shifted in time.

6. The image display system according to claim 2, wherein said image display device body further comprises a timing data rewriting circuit for rewriting the timing data stored in said second timing data storage locations according to instructions from the program data stored in said program data storage locations.

7. The image display system according to claim 6, wherein said timing data rewriting circuit operates on the timing data stored in said second timing data storage location according to a conversion expression embodied in said program data to obtain new timing data and writes the new timing data into said second timing data storage locations.

8. The image display system according to claim 7, wherein said external memory further comprises third timing data storage locations for storing timing data related to intervals of light emission of said light emitting element array, and said timing data rewriting circuit reads the timing data stored in said third timing data storage locations and writes the timing data into said second timing data storage locations.

9. The image display system according to claim 2, wherein said mirror is caused to reciprocatively move in a certain angel range, and a part in the certain angle range in which angular velocity of the mirror is stable is used for image scanning.

10. The image display system according to claim 9, wherein said first timing data storage locations stores timing data capable of covering an angle range larger than said angle range used for the image scanning, and said information processor reads all the timing data from said first timing data storage locations and causes said second timing data storage locations to store the data.

11. The image display system according to claim 10, wherein said image display device body further comprises an offset amount detector for detecting the amount of offset of the reciprocative movement of said mirror with respect to said certain angle range, and said light emission driving circuit causes said light emitting element array to emit light on the basis of a range of timing data referred to from said second timing data storage locations changed according to the amount of offset of the mirror detected by said offset amount detector.

12. An image displaying system according to claim 2, wherein said external memory is a program cartridge housing at least one semiconductor memory.

13. An image display system according to claim 2, wherein said external memory includes a CD ROM.

14. An external memory attachably/detachably connected to an image display device comprising an image display unit including a light emitting element array in which a plurality of light emitting elements are regularly arranged in a first direction, a mirror for reflecting light emitted from said light emitting element array so that it can be visually recognized by an eye of a user and for reciprocatively moving at high speed in a certain range to project a planar image in a second direction almost perpendicular to said first direction, and a mirror driving circuit for causing said mirror to reciprocatively move, for displaying a certain image in said image display unit on the basis of stored program data and image data, said external memory comprising:

program data storage locations for storing said program data;

image data storage locations for storing said image data; and first timing data storage locations storing timing data related to intervals of light emission of said light emitting element array;

said image display device further comprising display data storage locations and writable/readable second timing data storage location, and an image processor for executing the program data stored in said program data storage locations and for accessing the image data stored in said image data storage locations and being operable to control:

generating display data corresponding to an image to be displayed by said image display unit, temporarily storing said generated display data in said display data storage locations, reading said timing data from said first timing data storage locations and storing the data into said second timing data storage locations prior to displaying the image, and causing said light emitting element array to emit light on the basis of the timing data stored in said second timing data storage locations and the display data stored in said display data storage locations.

15. An external memory according to claim 14, wherein said external memory is a program cartridge housing at least one semiconductor memory.

16. An external memory according to claim 14, wherein said external memory includes a CD ROM.

* * * * *